(12) United States Patent
Moon et al.

(10) Patent No.: US 12,464,155 B2
(45) Date of Patent: Nov. 4, 2025

(54) METHOD AND APPARATUS FOR ENCODING/DECODING VIDEO SIGNAL

(71) Applicant: KONINKLIJKE PHILIPS N.V., Eindhoven (NL)

(72) Inventors: Joo Hee Moon, Seoul (KR); Sung Won Lim, Seoul (KR); Dong Jae Won, Goyang-si (KR)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/351,706

(22) Filed: Jul. 13, 2023

(65) Prior Publication Data

US 2023/0353773 A1 Nov. 2, 2023

Related U.S. Application Data

(63) Continuation of application No. 17/684,607, filed on Mar. 2, 2022, now Pat. No. 11,785,244, which is a
(Continued)

(30) Foreign Application Priority Data

Apr. 29, 2016 (KR) .......................... 10-2016-0052697
Apr. 29, 2016 (KR) .......................... 10-2016-0052710

(Continued)

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/105* (2014.11); *H04N 19/176* (2014.11); *H04N 19/593* (2014.11)

(58) Field of Classification Search
CPC .. H04N 19/105; H04N 19/176; H04N 19/513; H04N 19/593
(Continued)

(56) References Cited

U.S. PATENT DOCUMENTS

2008/0219352 A1* 9/2008 Tokumitsu ............. H04N 19/46
375/E7.262
2008/0240245 A1* 10/2008 Lee ....................... H04N 19/147
375/E7.125
(Continued)

FOREIGN PATENT DOCUMENTS

CN 101223783 A 7/2008
CN 101325715 A 12/2008
(Continued)

OTHER PUBLICATIONS

Tsukuba, Takeshi et al., "Implicit derivation of weight factor for Generalized Residual Prediction", Joint Collaborative Team on Video Coding (JCT-VC) of ITU-T SG 16 WP 3 and ISO/IEC JTC1/SC29/WG11, 13 Meeting: Incheon, KR, Apr. 18-26, 2013, (pp. 1-5).

(Continued)

*Primary Examiner* — Jeffery A Williams

(57) ABSTRACT

A method of decoding a video signal according to the present invention may include: determining whether or not change in brightness is present between a current video including a current block and a reference video of the current video; when it is determined that change in brightness is present between the current video and the reference video, determining weight prediction parameter candidates of the current block; determining a weight prediction parameter of the current block on the basis of index information specifying any of the weight prediction parameter candidates; and (Continued)

performing prediction for the current block on the basis of the weight prediction parameter.

3 Claims, 50 Drawing Sheets

Related U.S. Application Data continuation of application No. 17/038,260, filed on Sep. 30, 2020, now Pat. No. 11,297,343, which is a continuation of application No. 16/097,354, filed as application No. PCT/KR2017/004569 on Apr. 28, 2017, now Pat. No. 10,834,420.

(30)  Foreign Application Priority Data

| Apr. 29, 2016 | (KR) | ......................... 10-2016-0052712 |
| Apr. 29, 2016 | (KR) | ......................... 10-2016-0052947 |
| Apr. 29, 2016 | (KR) | ......................... 20-2016-0052940 |

(51) Int. Cl.
*H04N 19/176* (2014.01)
*H04N 19/593* (2014.01)

(58) Field of Classification Search
USPC .................................................... 375/240.16
See application file for complete search history.

(56) References Cited

U.S. PATENT DOCUMENTS

| 2010/0119169 | A1  | 5/2010  | Haddad et al. |
| 2012/0300850 | A1  | 11/2012 | Yie et al. |
| 2013/0114709 | A1  | 5/2013  | Shima |
| 2014/0003522 | A1  | 1/2014  | Park et al. |
| 2014/0072041 | A1* | 3/2014  | Seregin .................. H04N 19/30 |
|              |     |         | 375/240.13 |
| 2014/0185680 | A1  | 7/2014  | Li et al. |
| 2014/0198846 | A1  | 7/2014  | Guo et al. |
| 2016/0219302 | A1* | 7/2016  | Liu ....................... H04N 19/583 |

FOREIGN PATENT DOCUMENTS

| CN | 102763418 A     |   | 10/2012 |             |
| CN | 102792697 A     |   | 11/2012 |             |
| CN | 103561263 A     |   | 2/2014  |             |
| CN | 105144719 A     |   | 12/2015 |             |
| KR | 20100106811 A   | * | 10/2010 | ........... H04N 19/182 |
| KR | 10-14499696 B1  |   | 10/2014 |             |
| KR | 20140140006 A   |   | 12/2014 |             |
| KR | 10-2015-0038296 A |  | 4/2015  |             |
| KR | 10-2015-0042268 A |  | 4/2015  |             |
| KR | 10-2015-0141177 A |  | 12/2015 |             |
| KR | 20160037110 A   |   | 4/2016  |             |
| WO | 2011/096770 A2  |   | 8/2011  |             |
| WO | 2014/047881 A1  |   | 4/2014  |             |
| WO | 2014050971 A1   |   | 4/2014  |             |

OTHER PUBLICATIONS

Ikai, Tomohiro et al., "ARP simplification", Joint Collaborative Team on 3D Video Coding Extensions of ITU-T SG 16 WP 3 and ISO/IEC JTC 1/SC 29/WG 11, 5th Meeting: Vienna, AT, Jul. 27-Aug. 2, 2013 (pp. 1-7).

Chen, Chun-Chi et al., "Generalized bi-prediction for inter coding", Joint Video Exploration Team (JVET) of ITU-T SG16 WP 3 and ISO/IEC JTC 1/SC29/WG11, 3rd Meeting: Geneva, CH, May 26-Jun. 1, 2016 (pp. 1-4).

International Search Report issued on Aug. 9, 2017 in corresponding International Paten Application No. PCT/KR2017/004569 (3 pages in English and 3 Pages in Korean).

David Flynn et al., "High Efficiency Video Coding (HEVC)Range Extensions text specification: Draft 2 (for PDAM)", Joint collaborative Tean of Video Coding(JCT-VC) of ITU-T SG 16 WP 3 and ISO/IEC JTC 1/SC 29/WG 11, 12th meeting: Geneva, CH, Jan. 14-23, 2013 (313 pages).

\* cited by examiner

[FIG. 1]
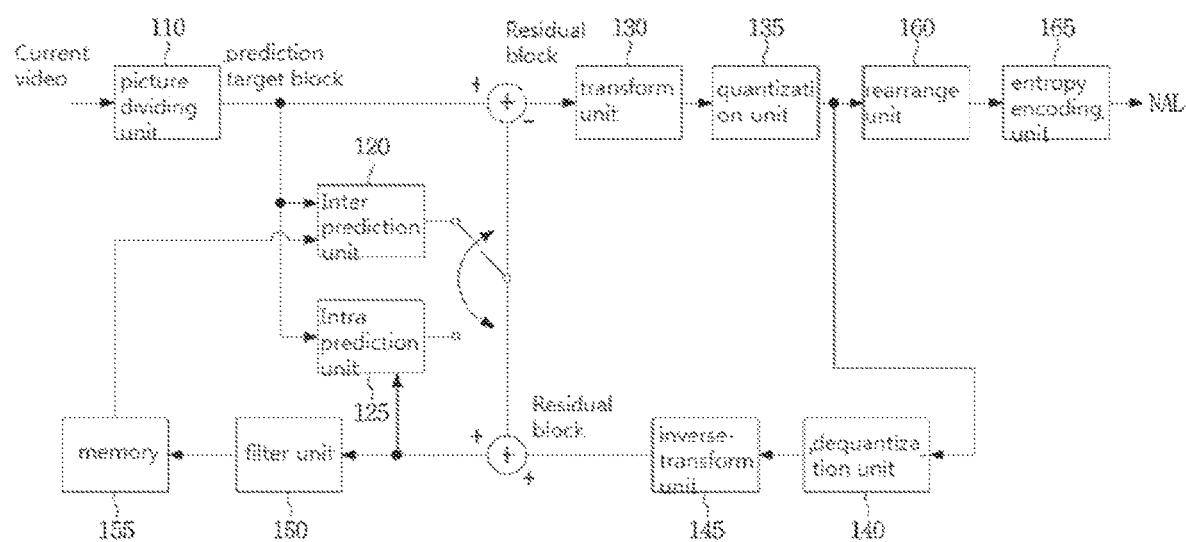
[FIG. 2]
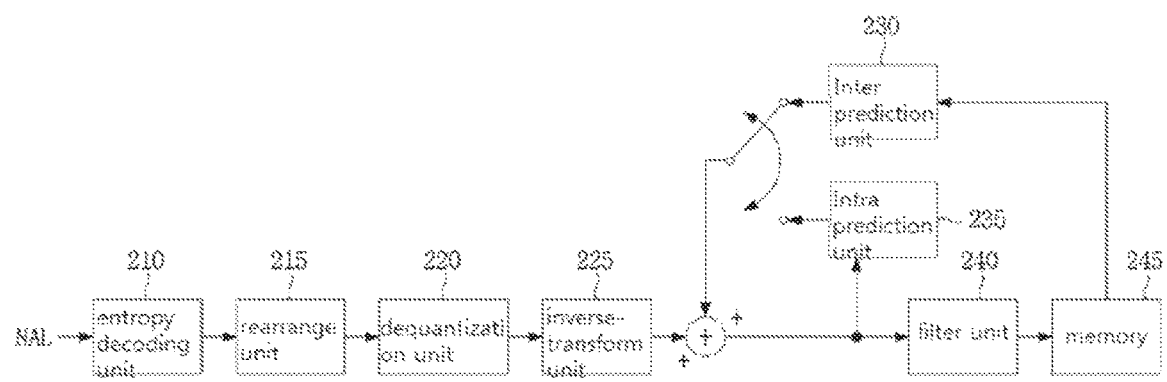

[FIG. 3]
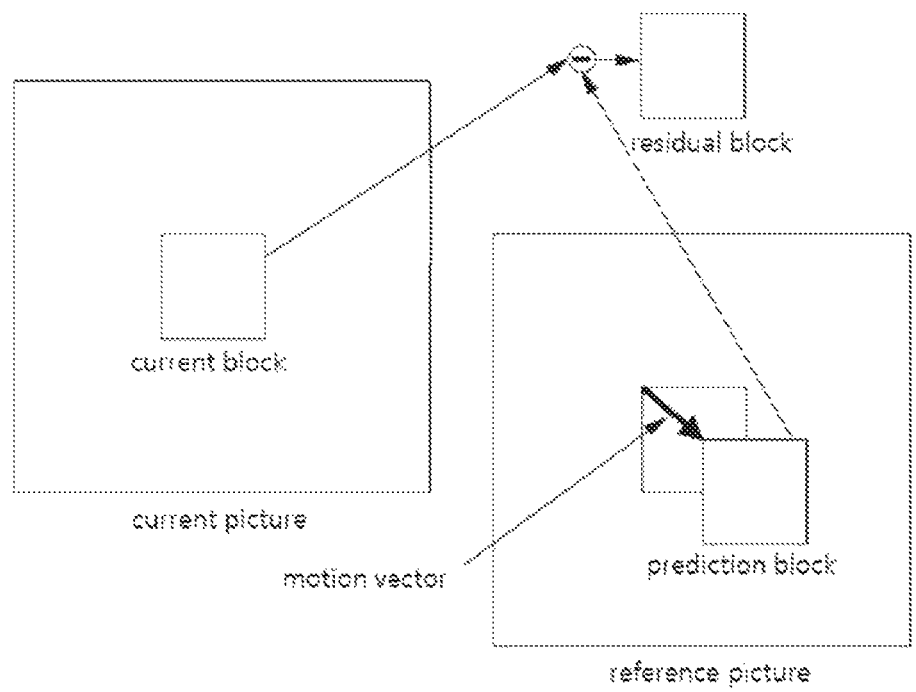
[FIG. 4]
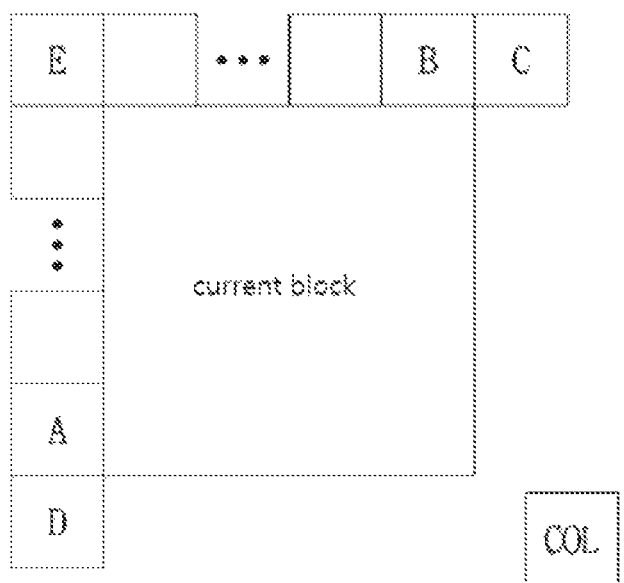

[FIG. 5]
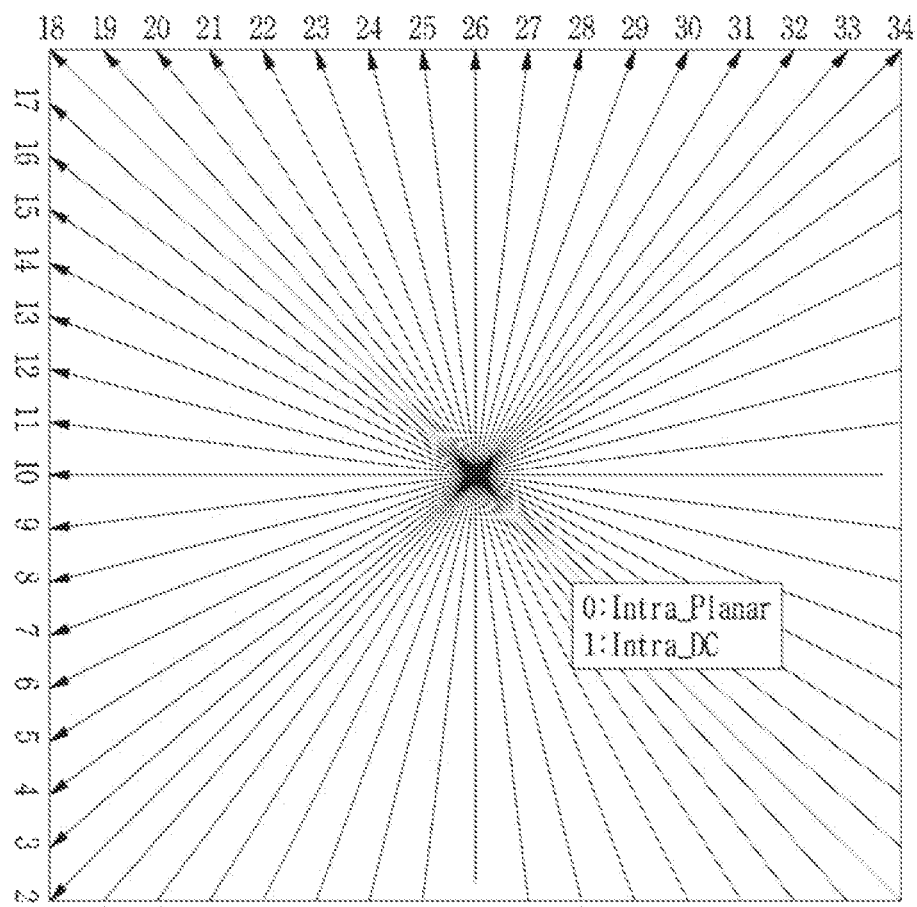

[FIG. 6]
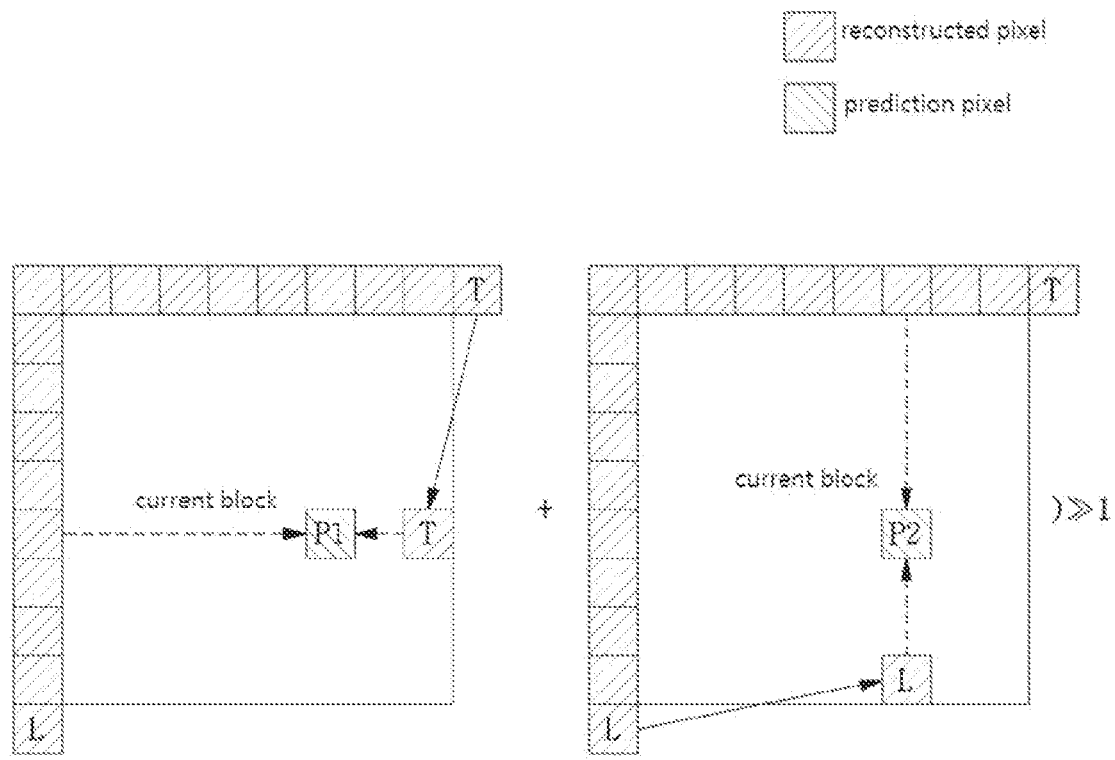
[FIG. 7]
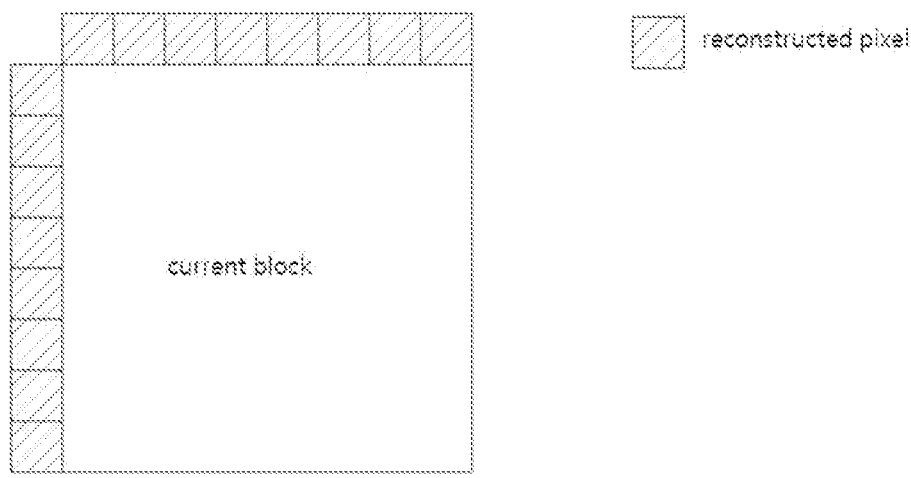

[FIG. 8]
prediction block generated by using mode 10    prediction block generated by using mode 26
[FIG. 9]
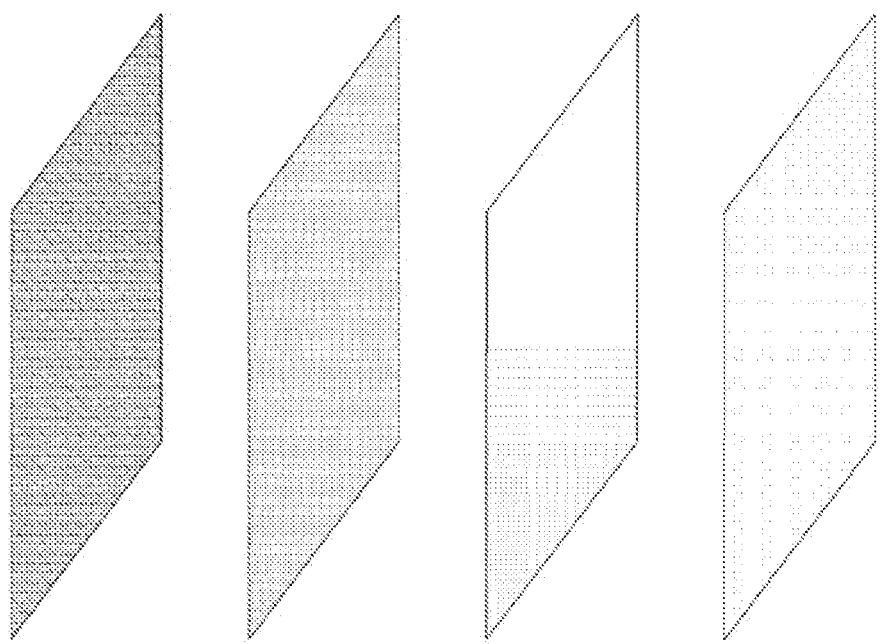

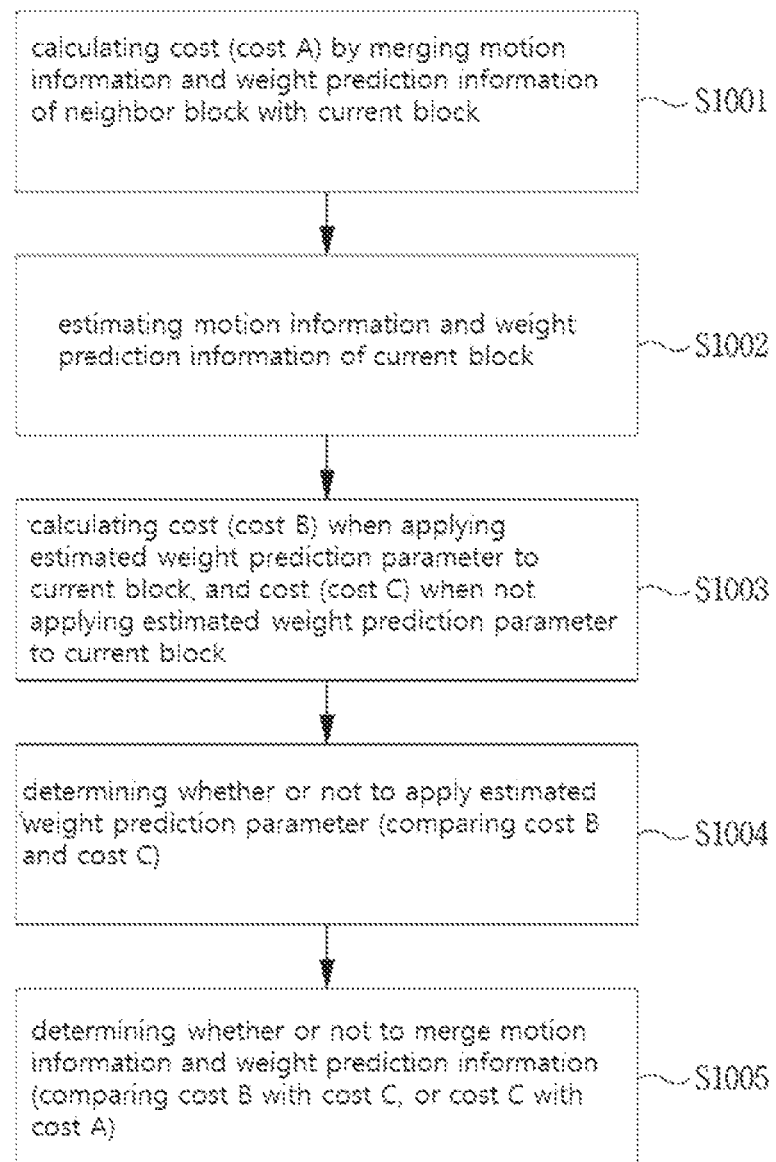
[FIG. 10]

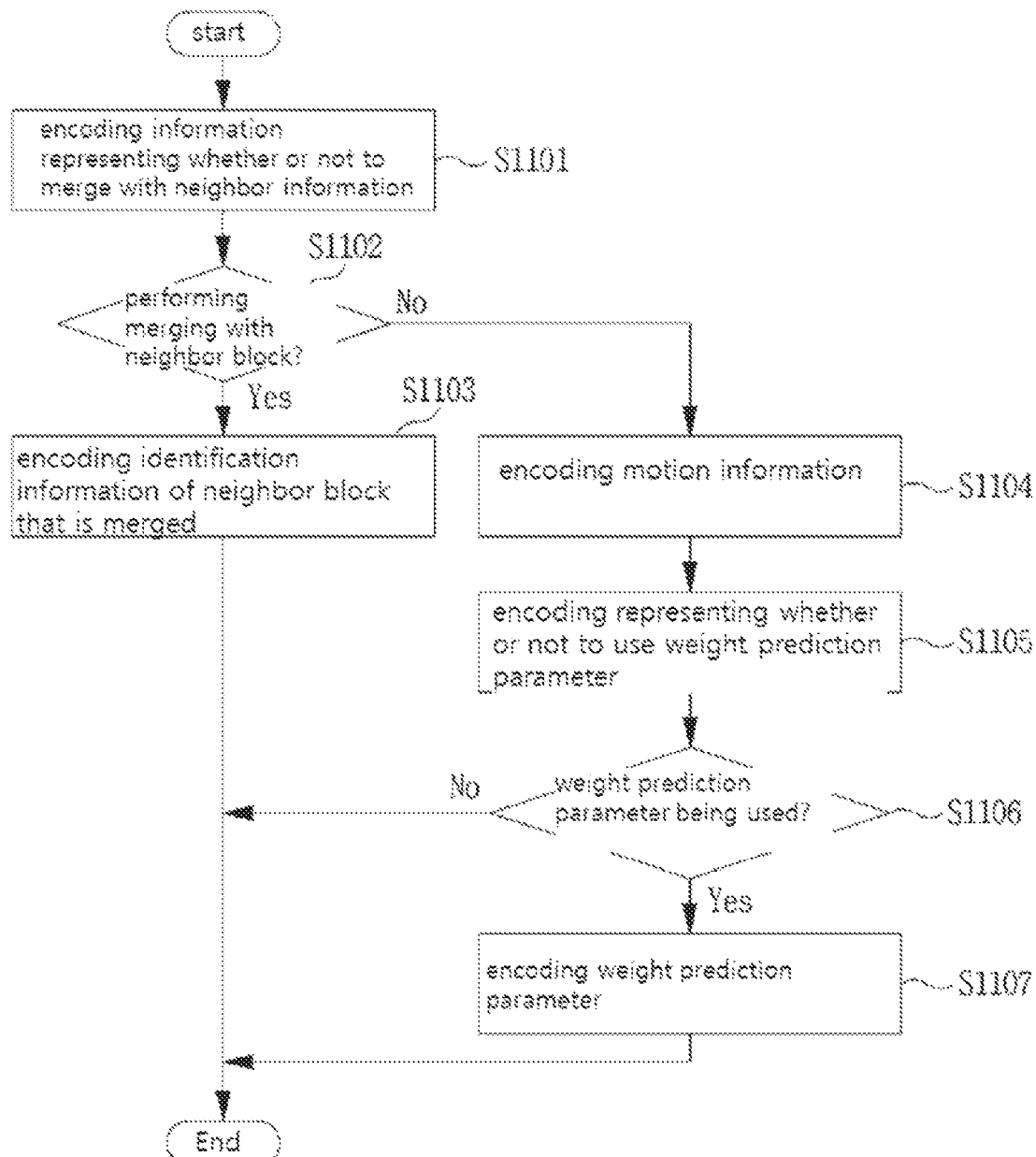
[FIG. 11]

[FIG. 12]
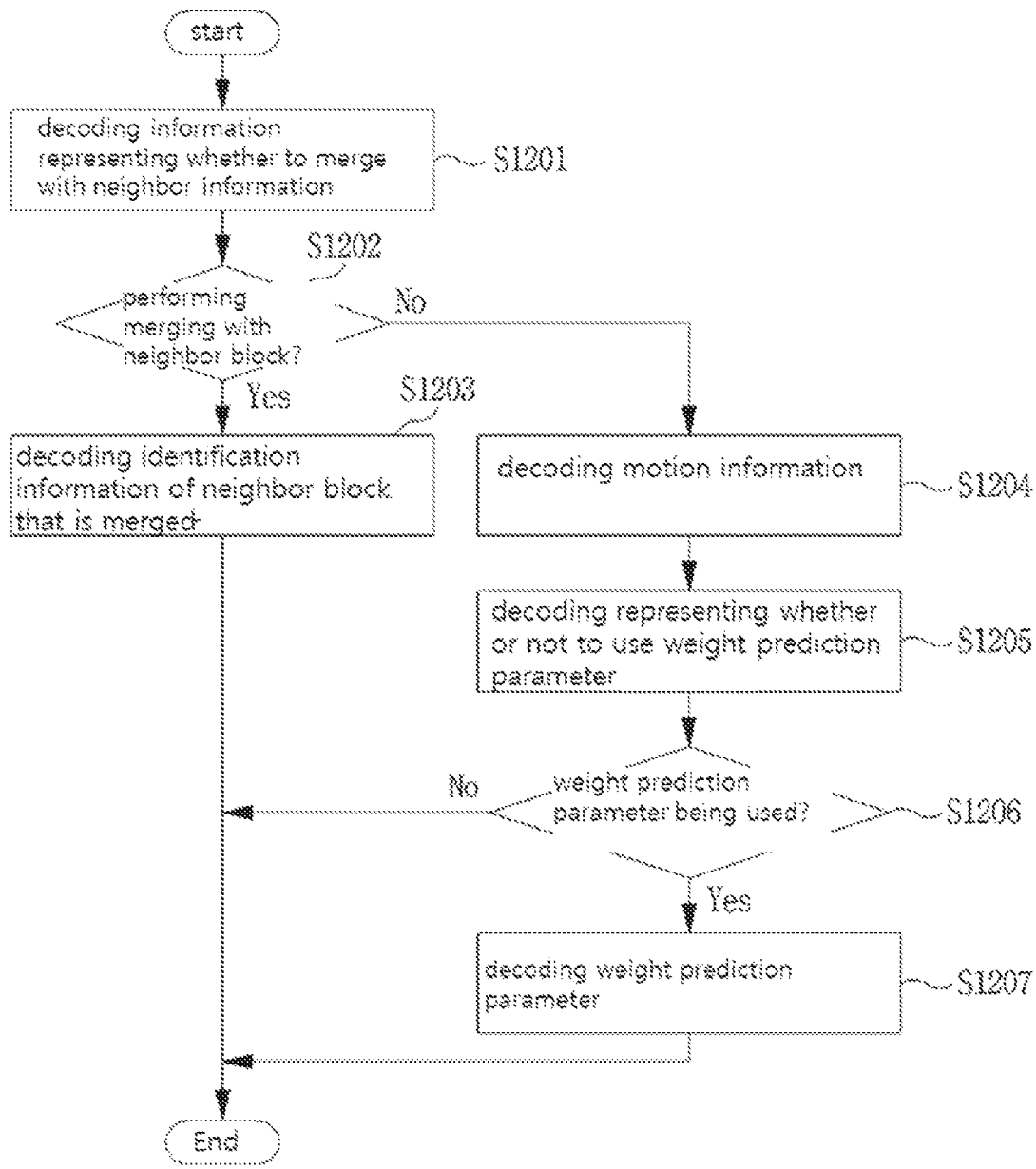

[FIG. 13]
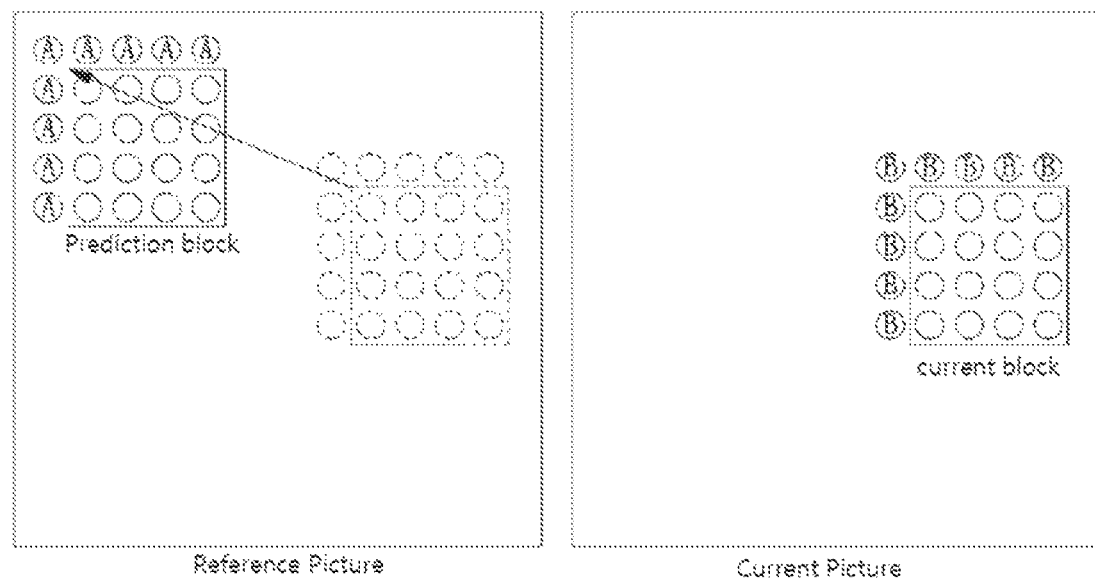
[FIG. 14]
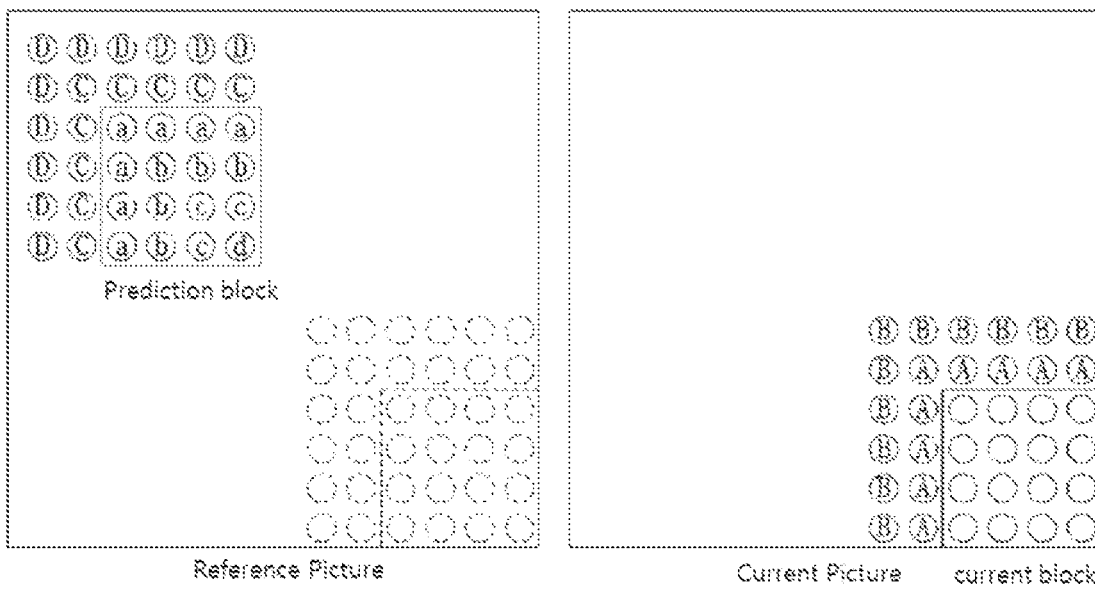

[FIG. 15]
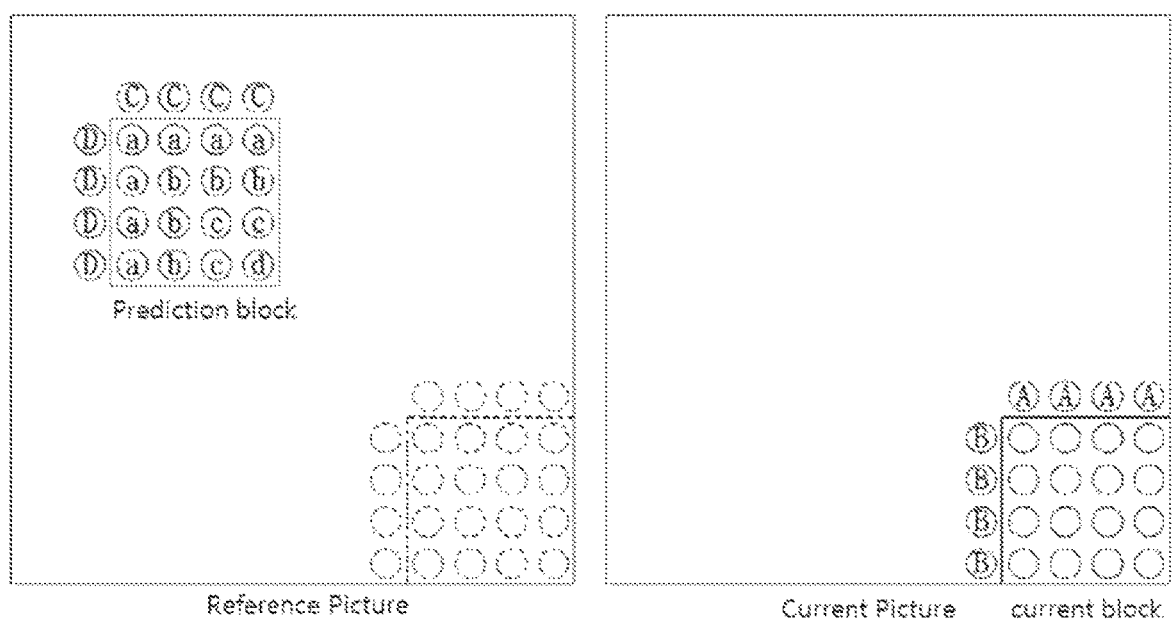

[FIG. 16]

|  | $(w,o)$ | $(w+a,o)$ | $(w-a,o)$ | $(w,o+\beta)$ | $(w,o-\beta)$ | $(w+a,o+\beta)$ | ... |
|---|---|---|---|---|---|---|---|
| candidate | (65,-1) | (66,-1) | (64,-1) | (65,0) | (65,-2) | (66,0) | ... |
| index | 0 | 1 | 2 | 3 | 4 | 5 | ... |

[FIG. 17]
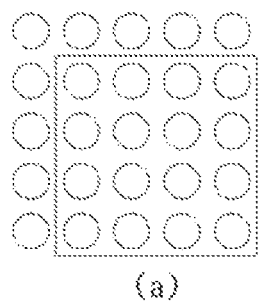
(a)
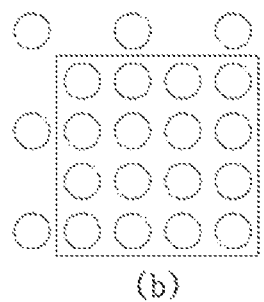
(b)
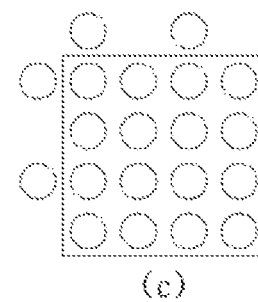
(c)

[FIG. 18]
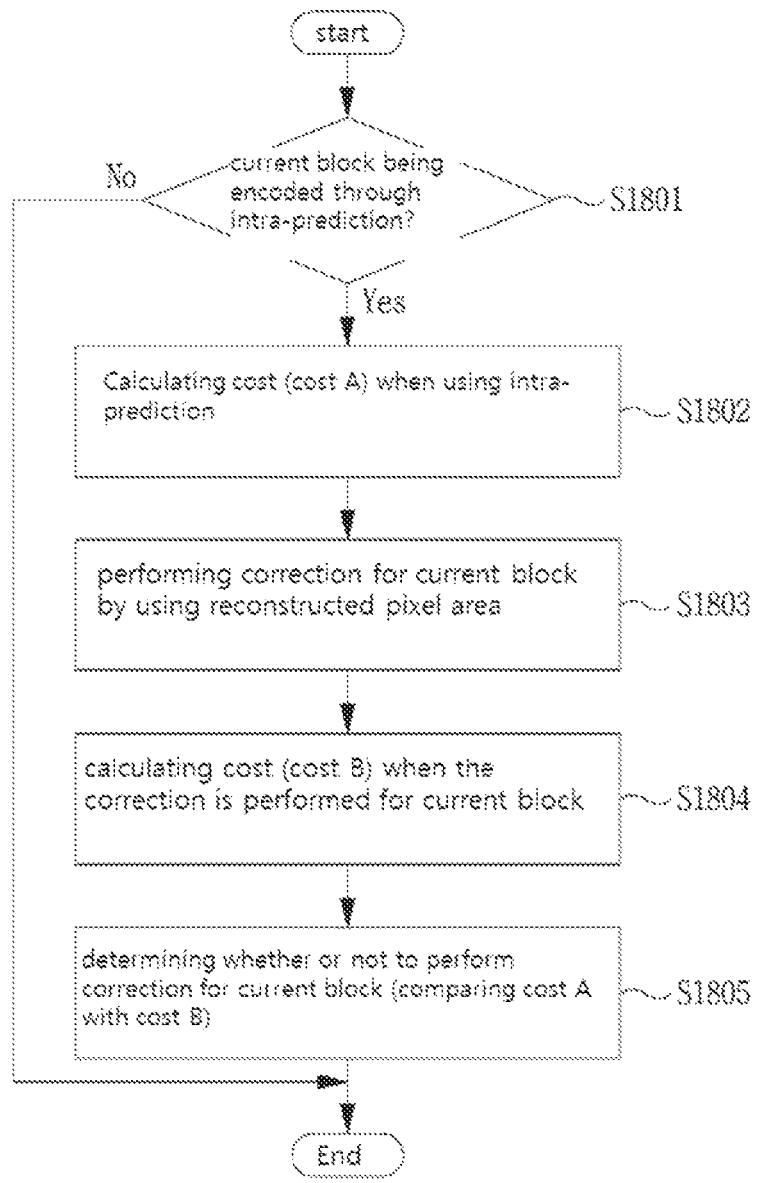

[FIG. 19]
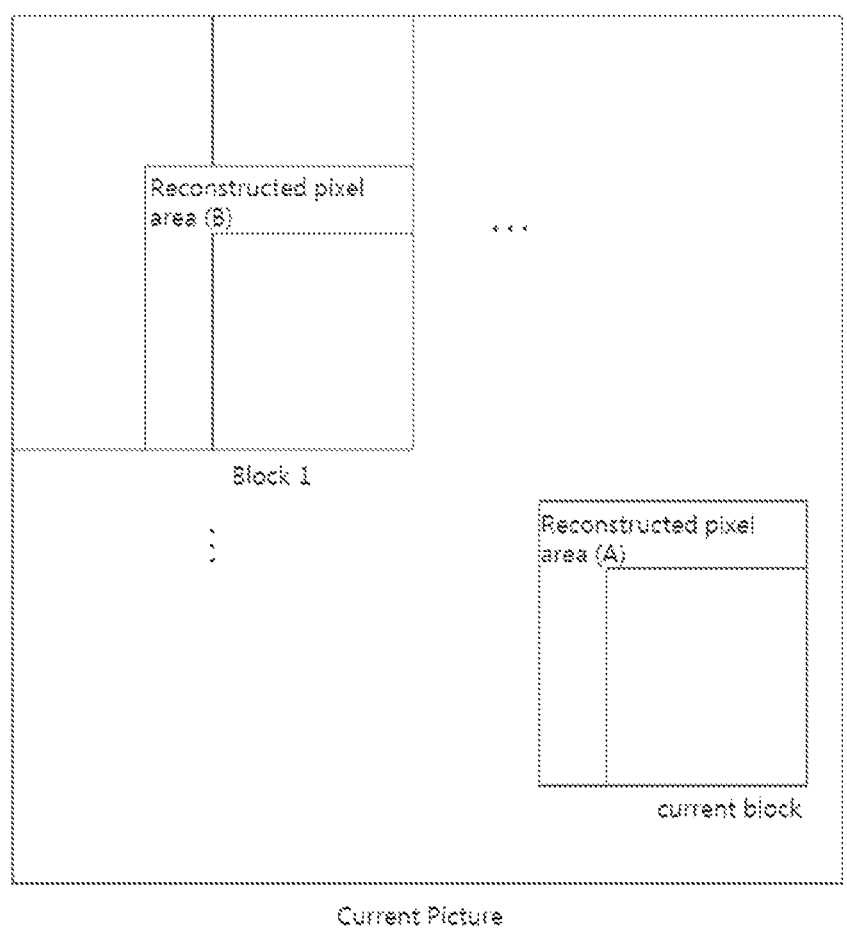

[FIG. 20]
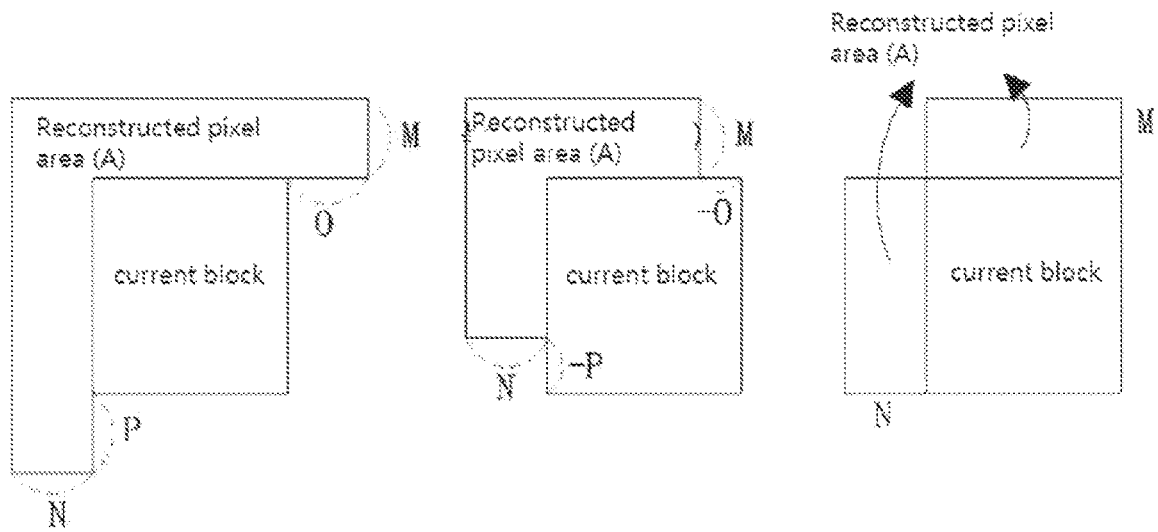

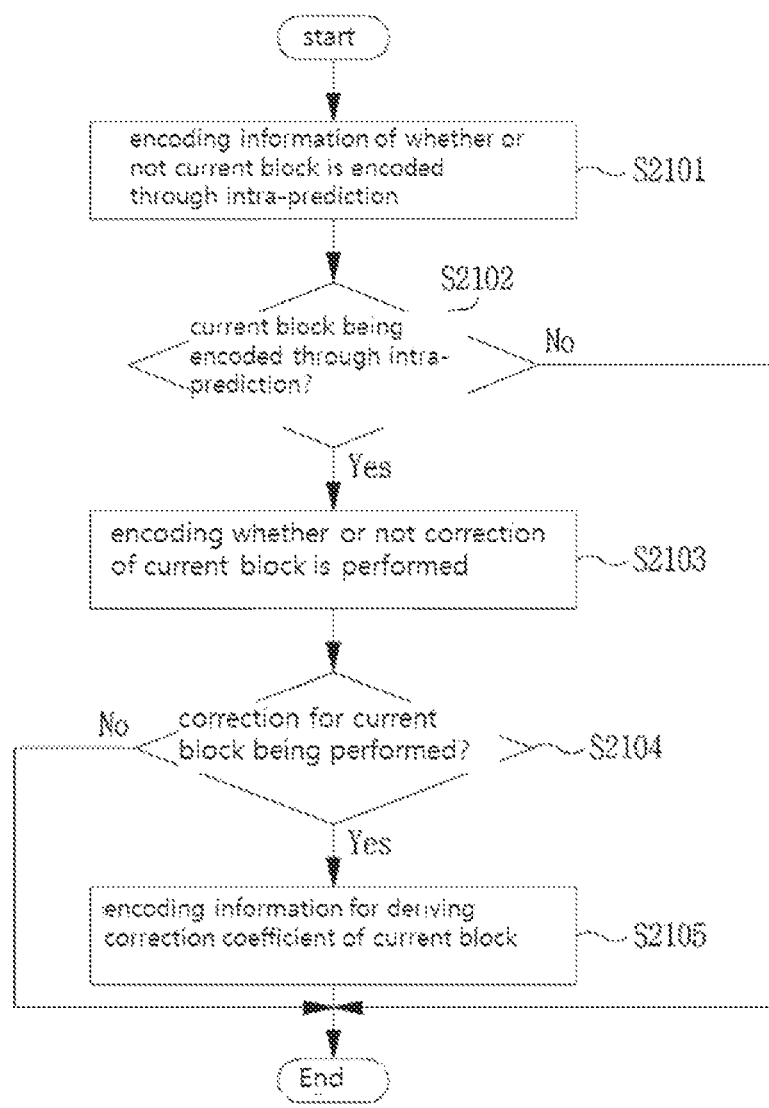
[FIG. 21]

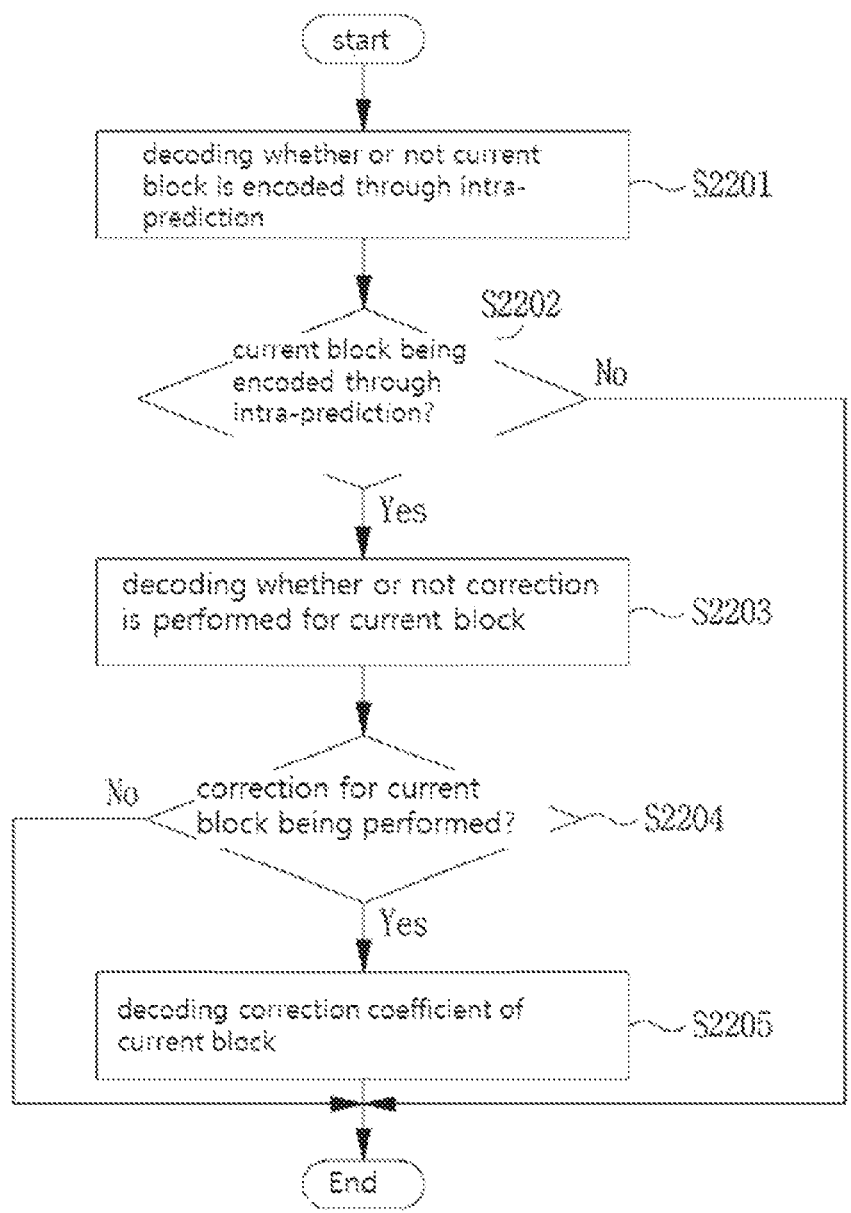
[FIG. 22]

[FIG. 23]
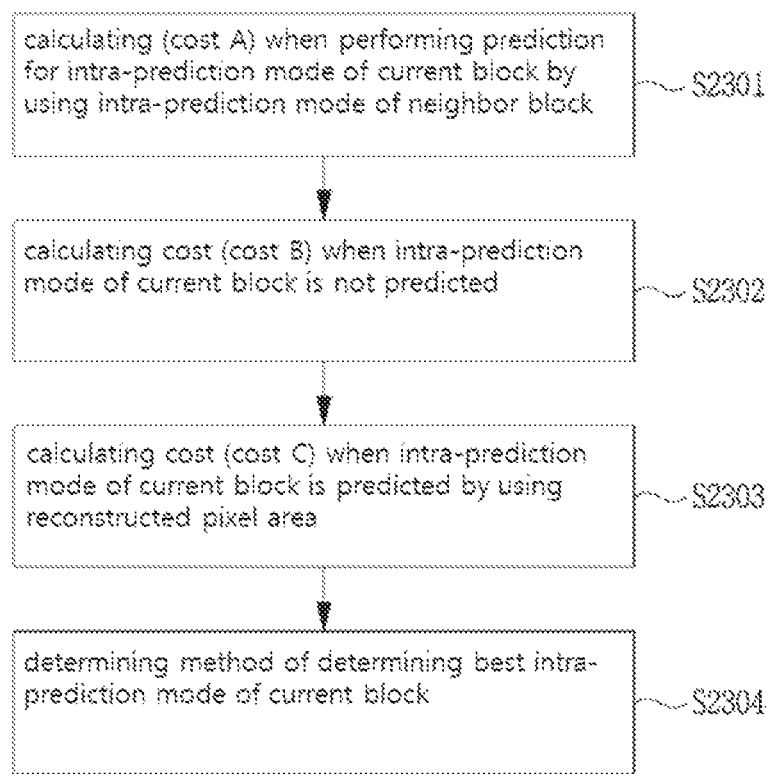
[FIG. 24]
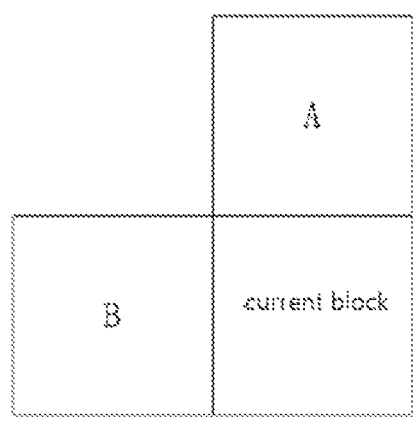

[FIG. 25]
| residual intra-prediction mode | 1 | 2 | 4 | 5 | 6 | 7 | 8 | 9 |
|---|---|---|---|---|---|---|---|---|
| newly assigned mode | 0 | 1 | 2 | 3 | 4 | 5 | 6 | 7 |
[FIG. 26]
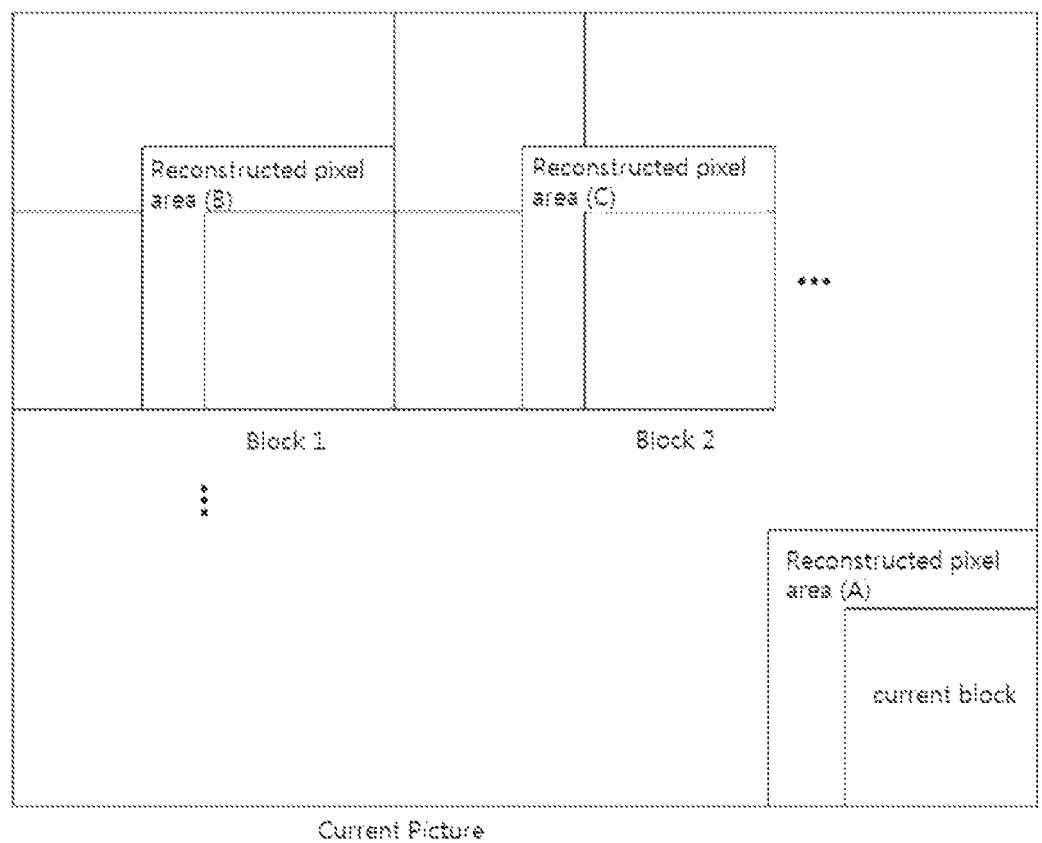

[FIG. 27]
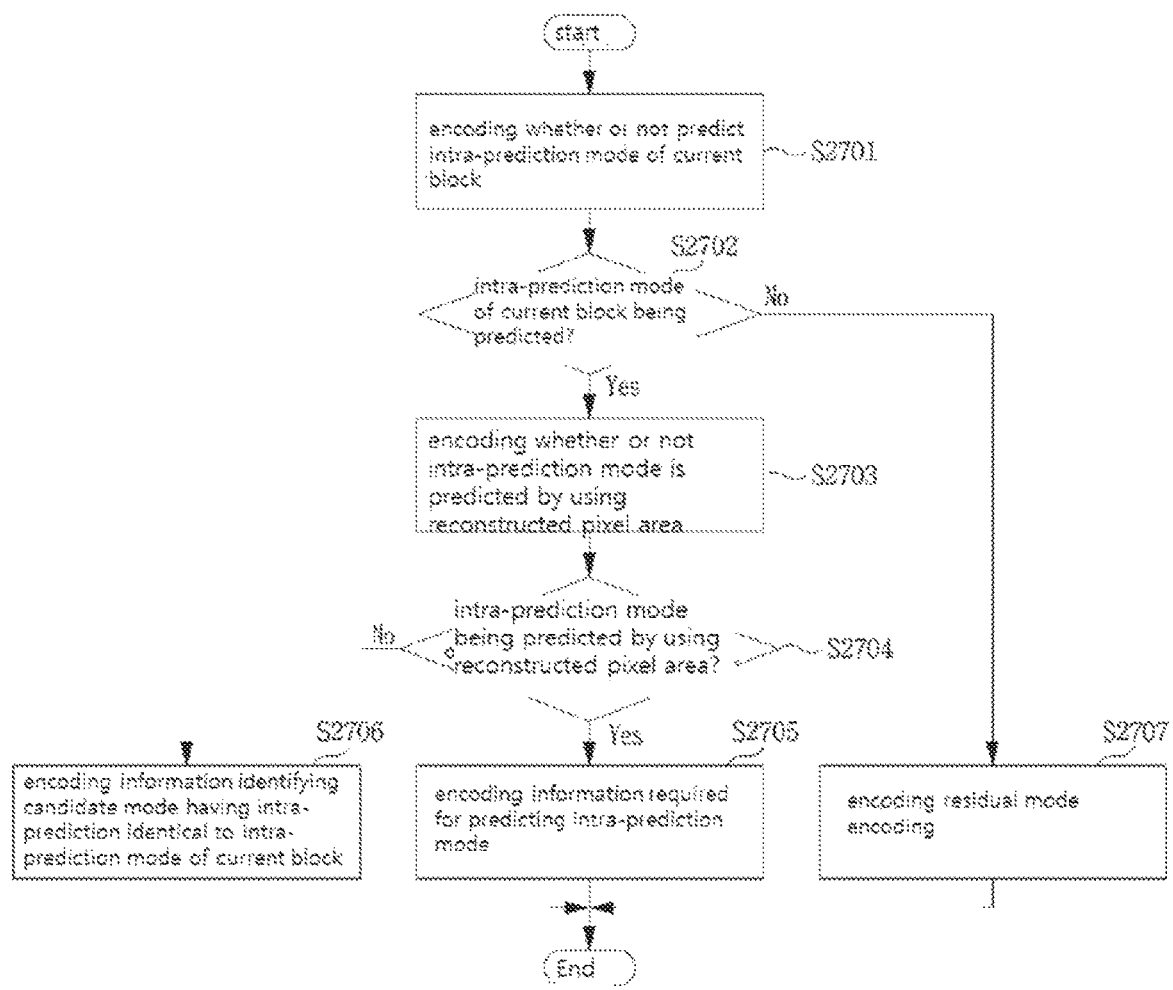

[FIG. 28]
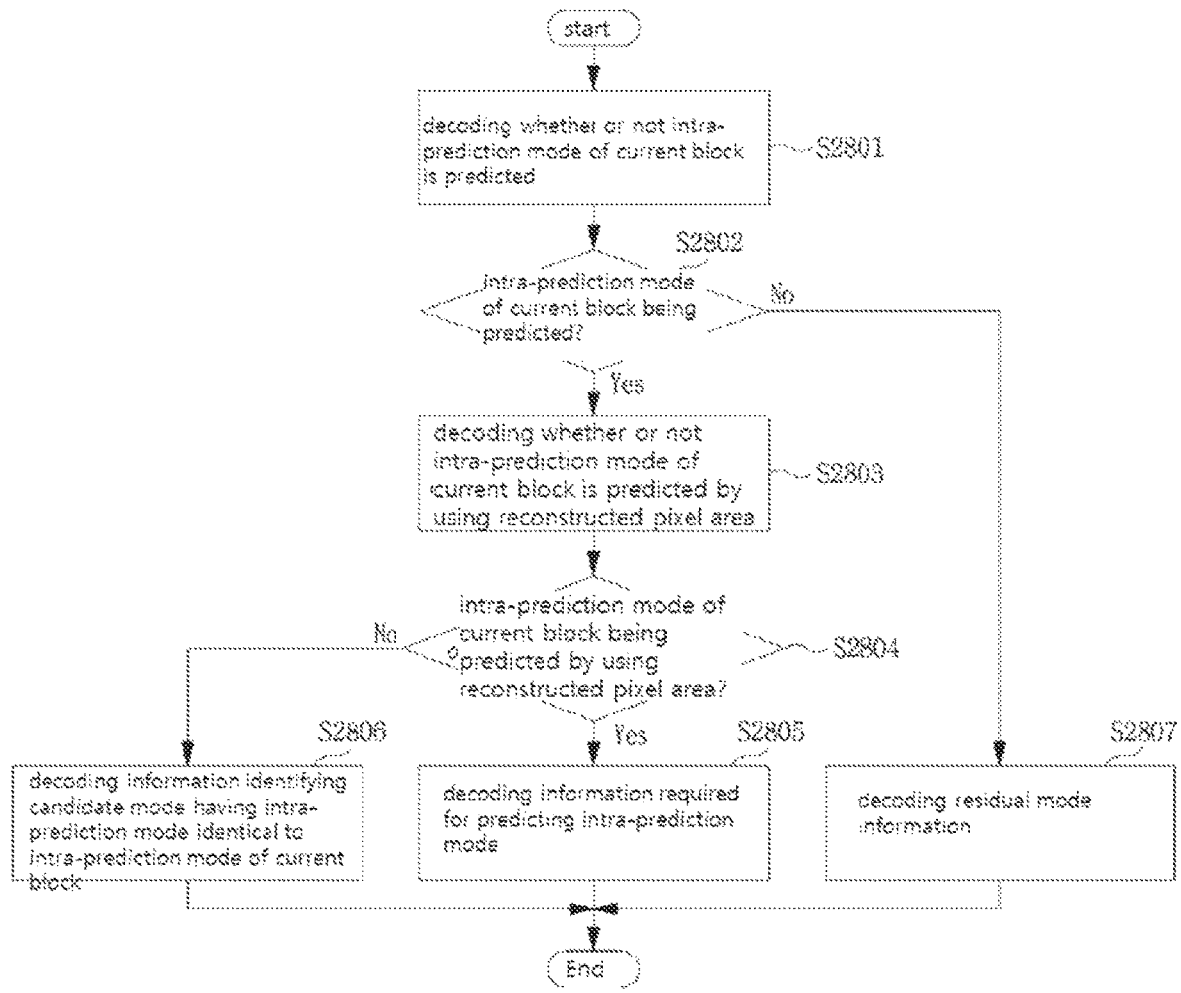

[FIG. 29]
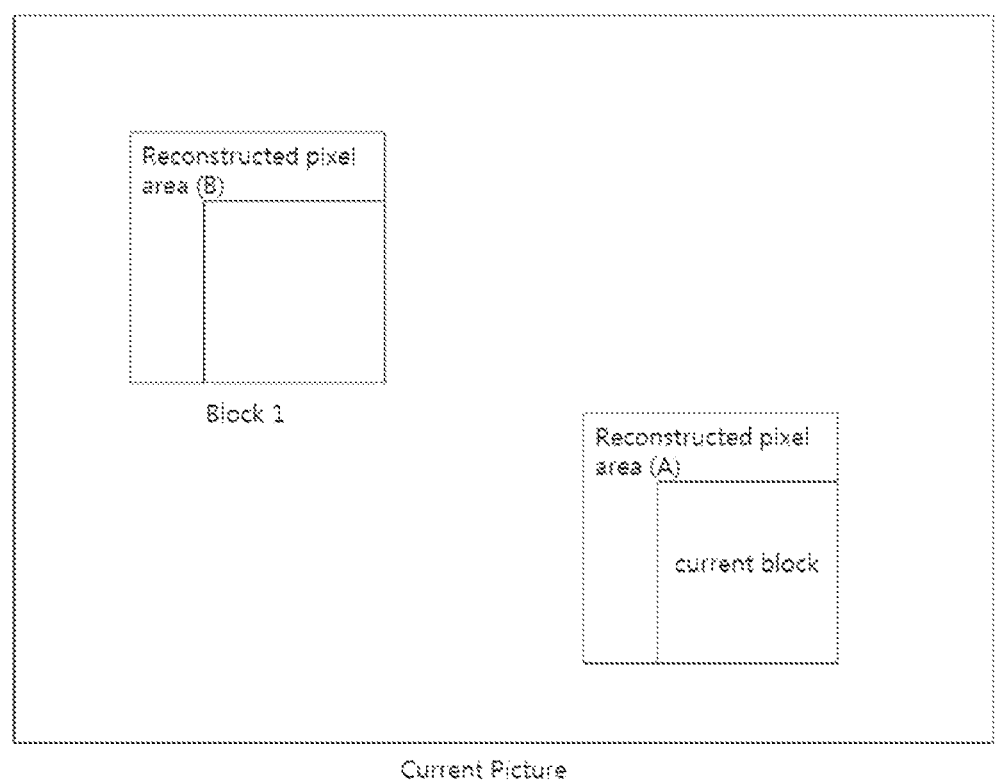

[FIG. 30]
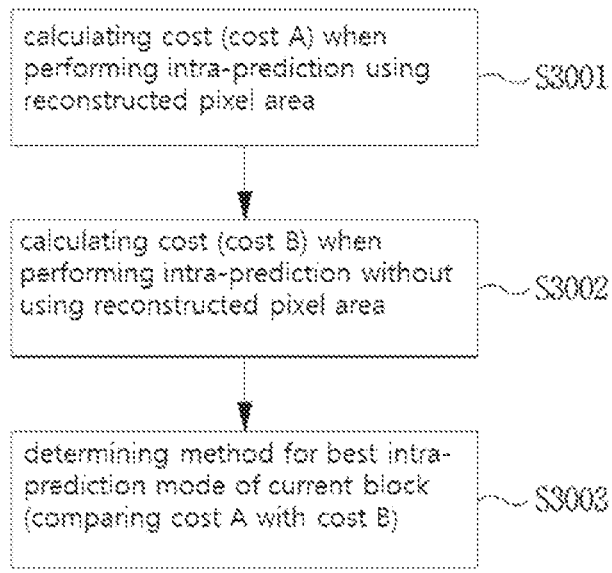
[FIG. 31]
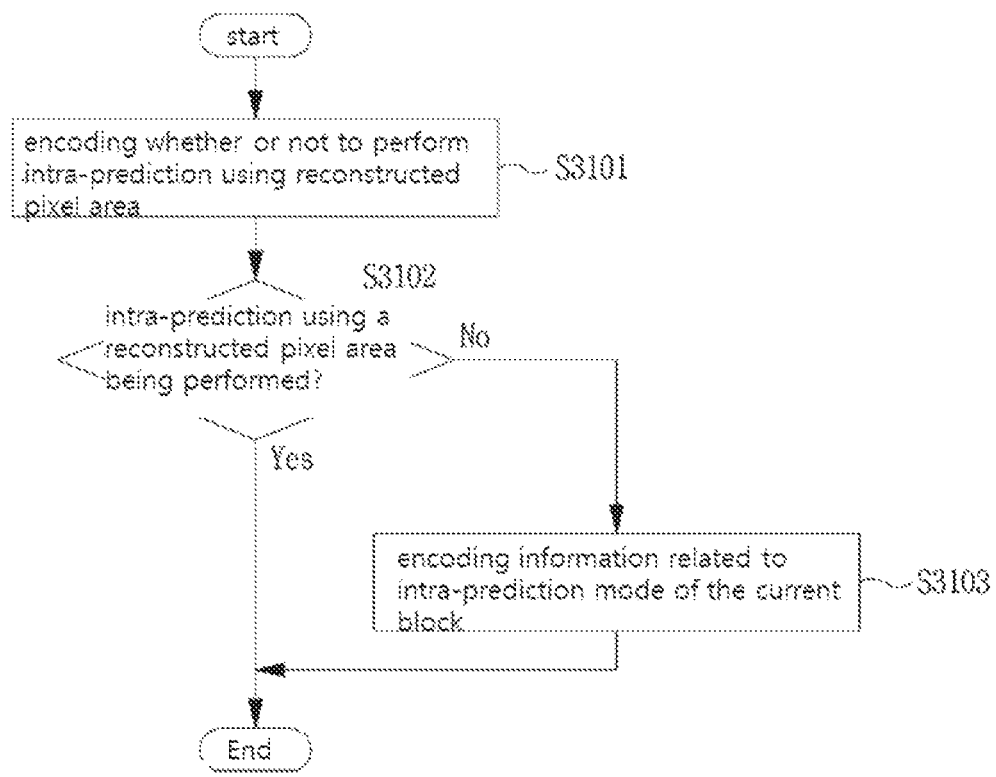

[FIG. 32]
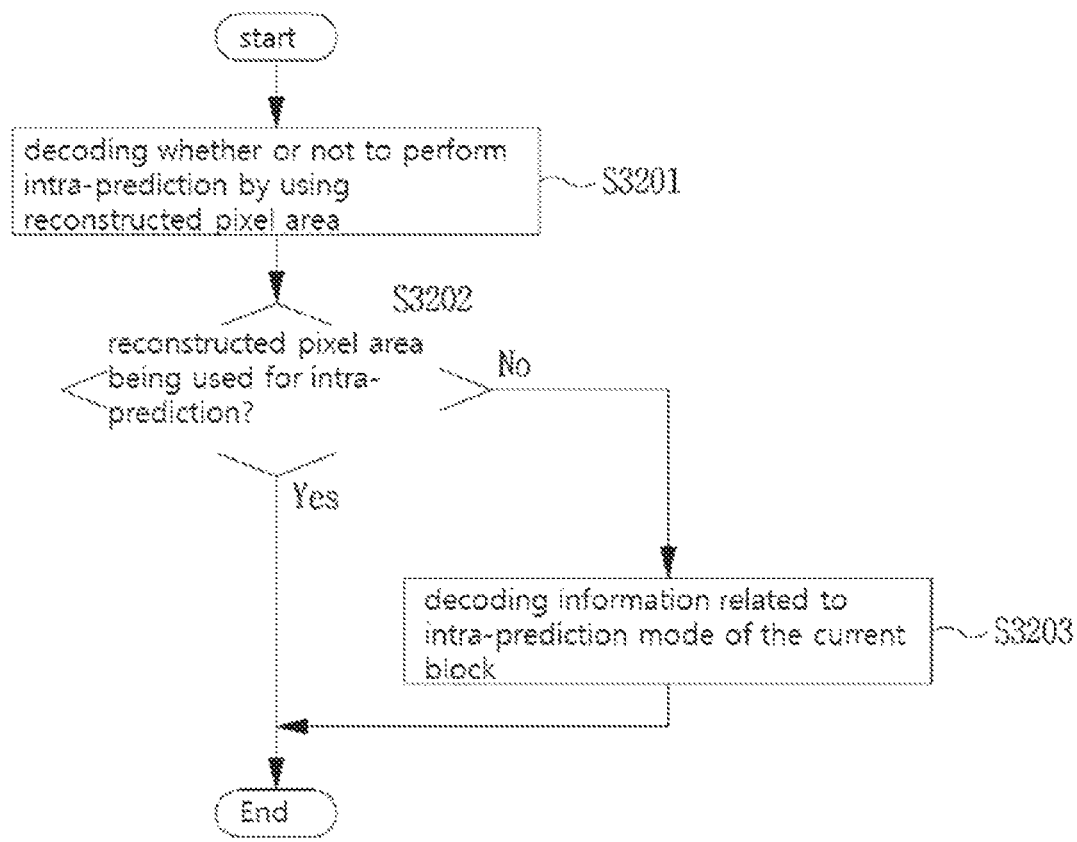

[FIG. 33]
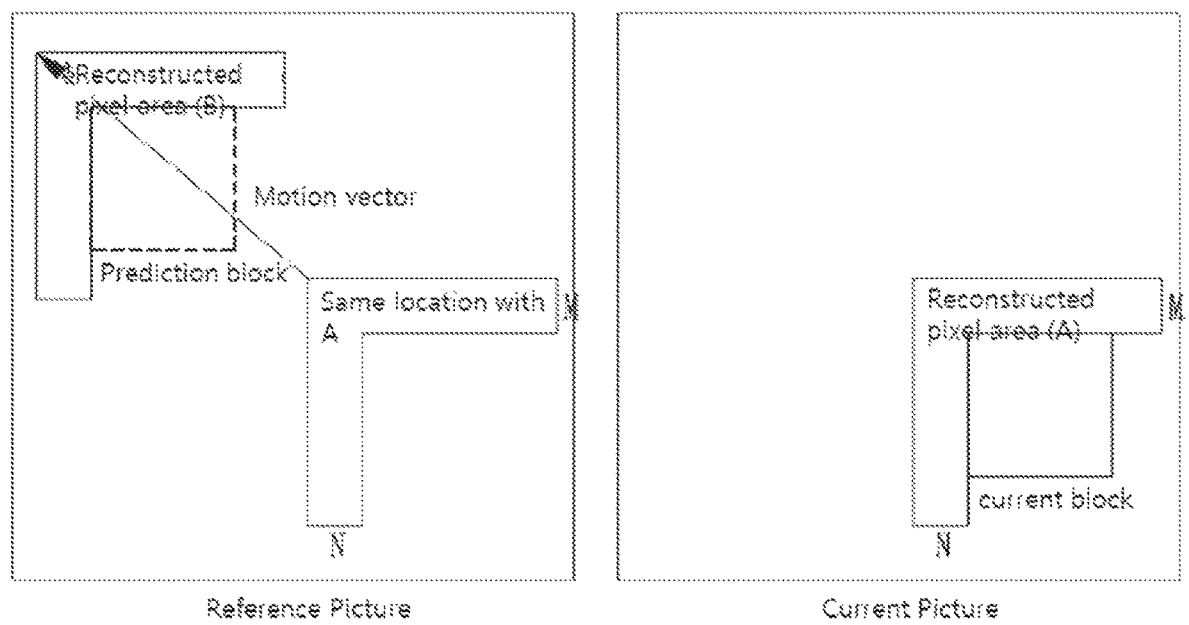

[FIG. 34]
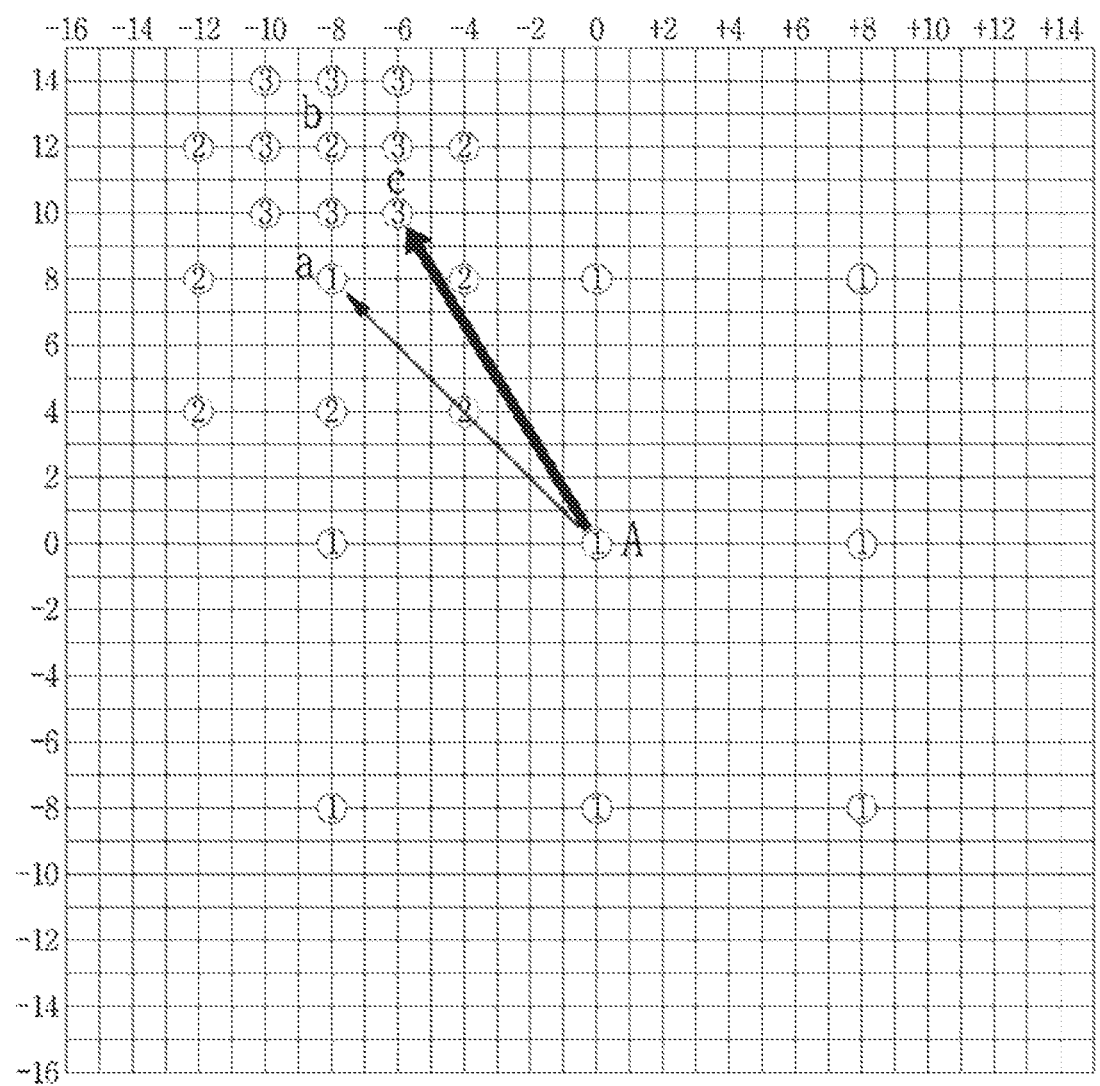

[FIG. 35]
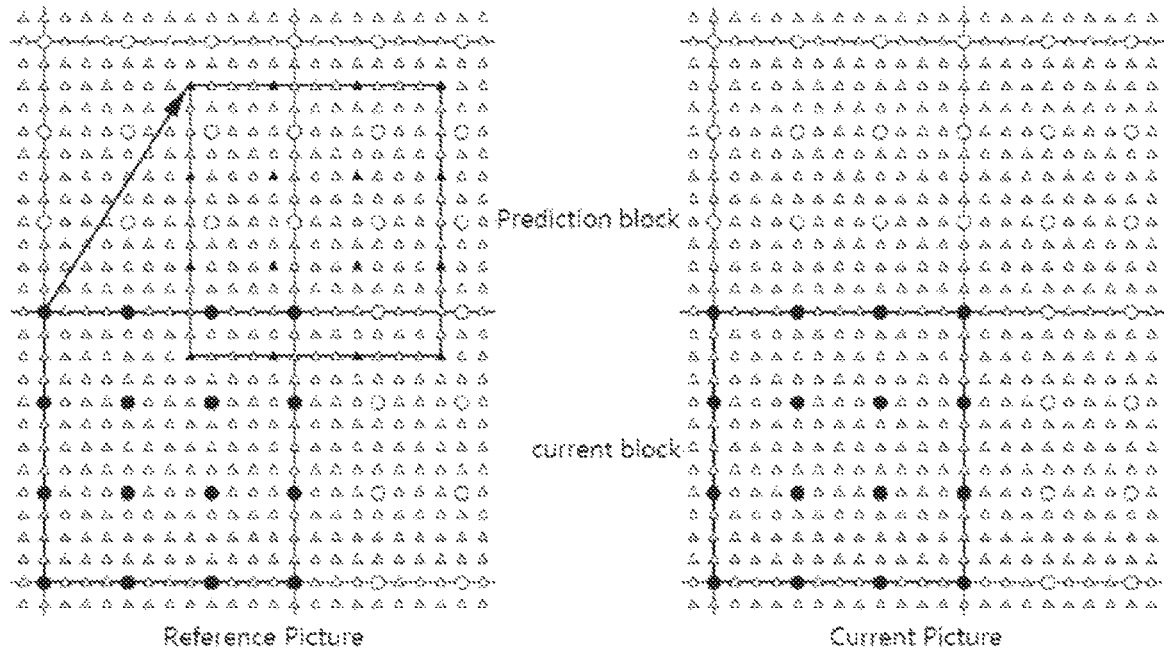
[FIG. 36]
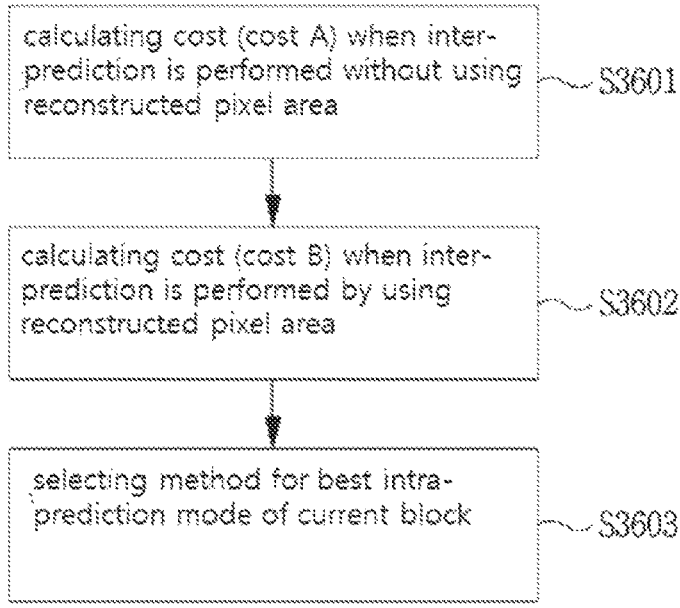

[FIG. 37]
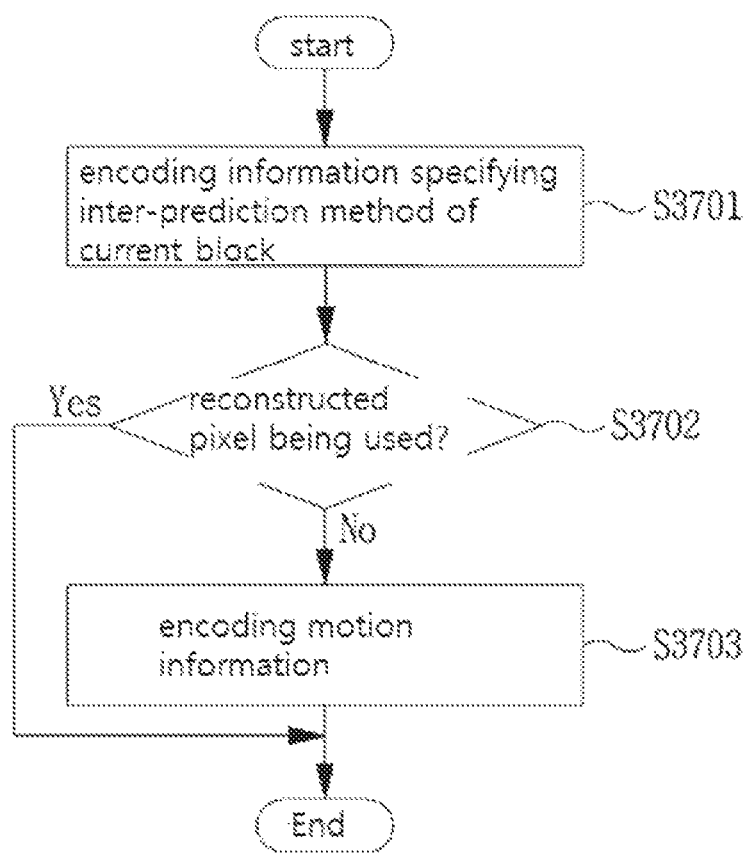

[FIG. 38]
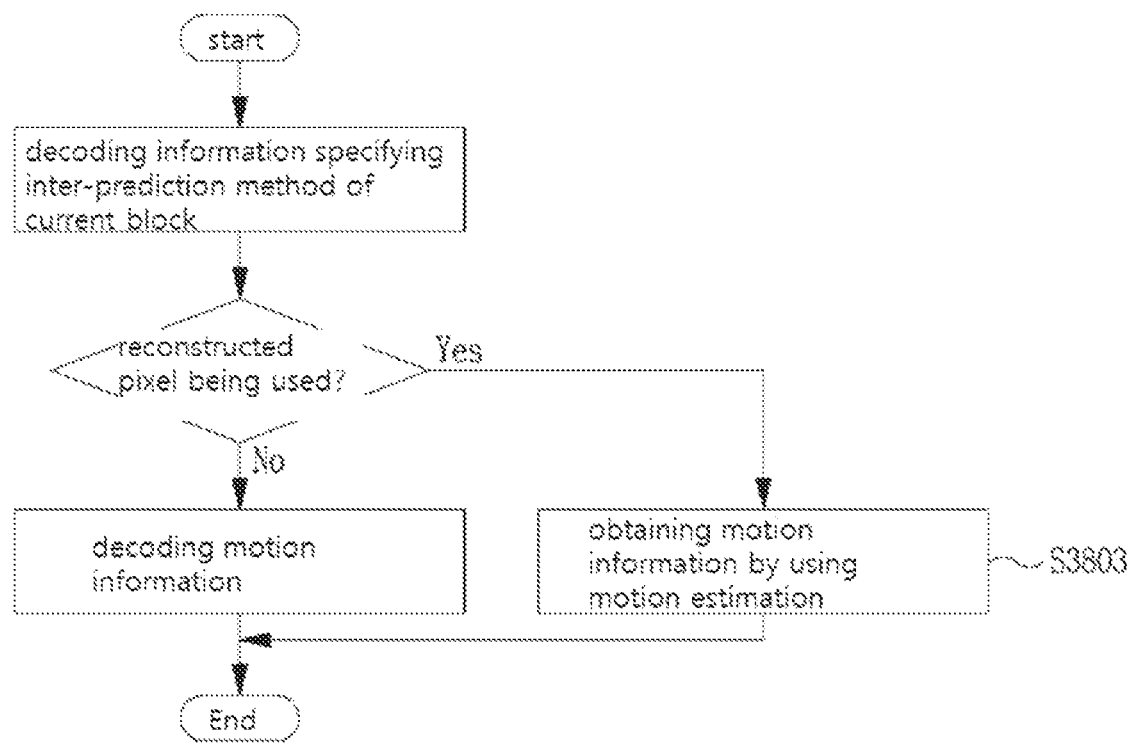

[FIG. 39]
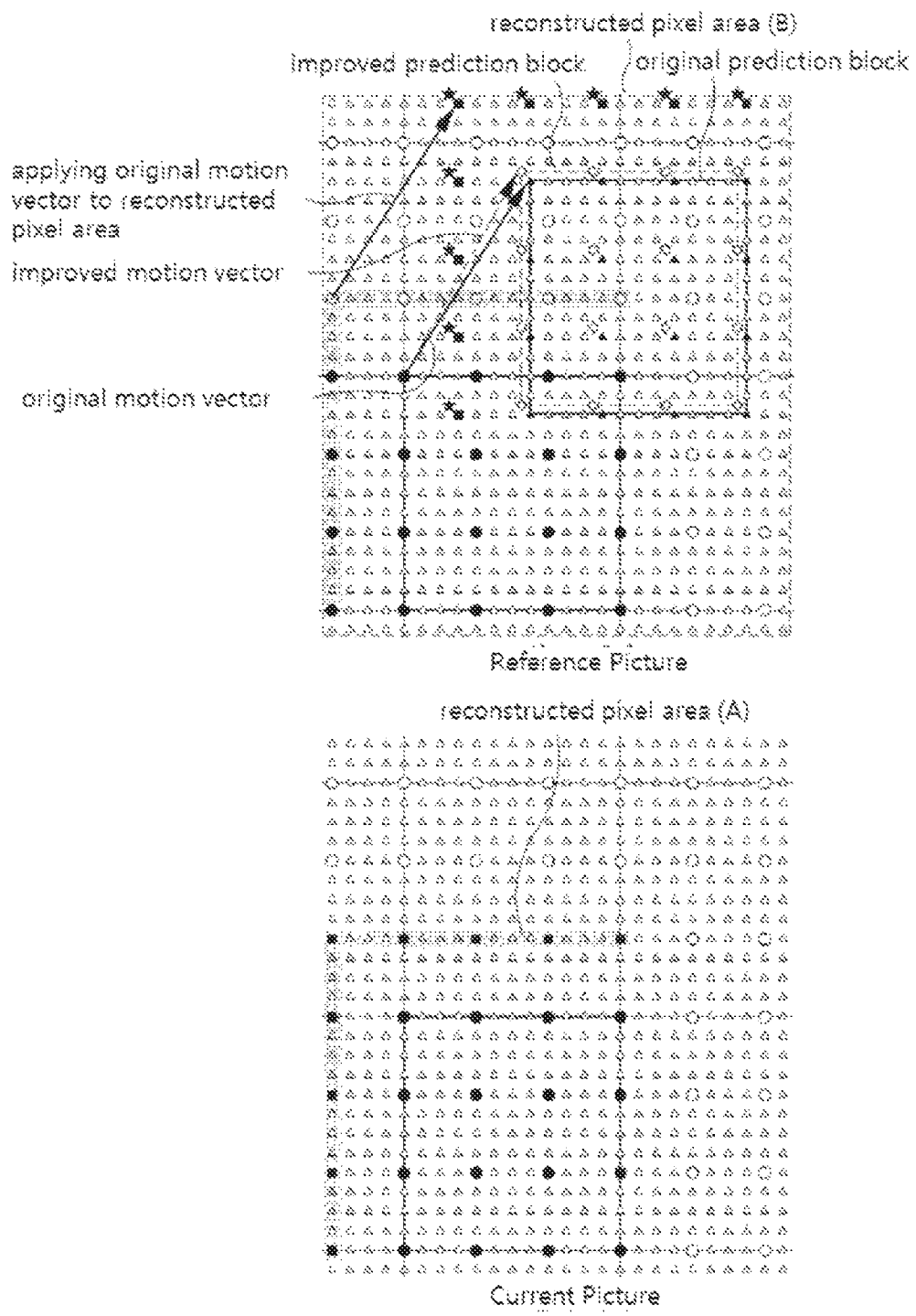

[FIG. 40]
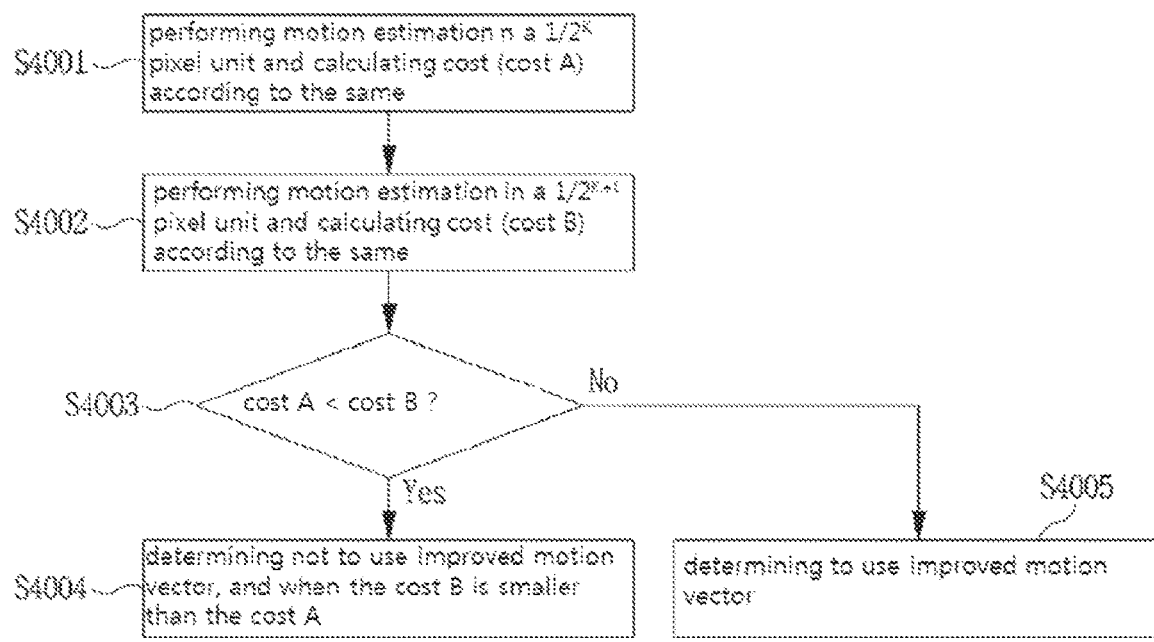

[FIG. 41]
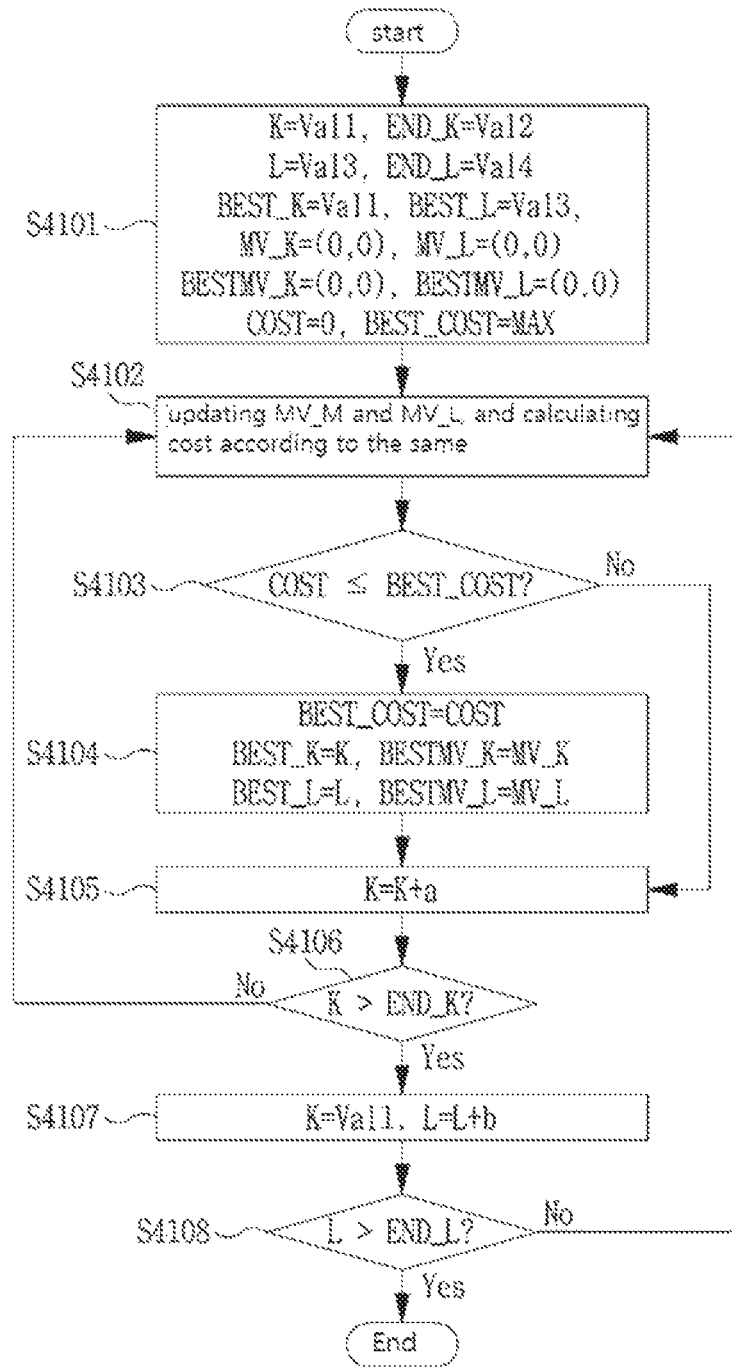

[FIG. 42]
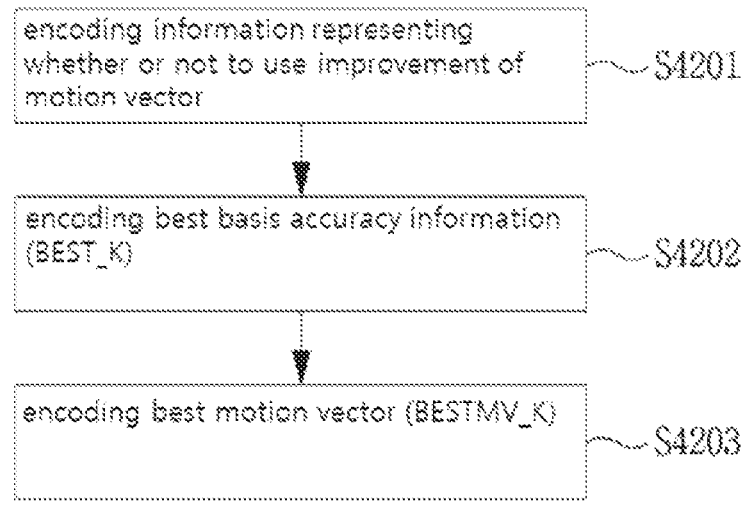
[FIG. 43]
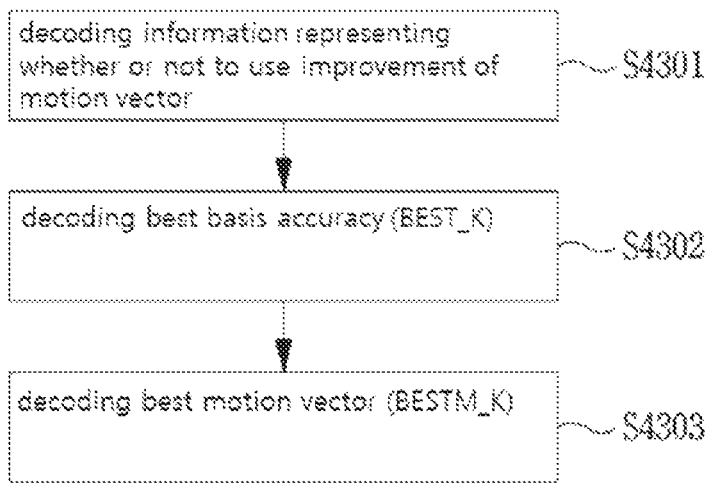

[FIG. 44]
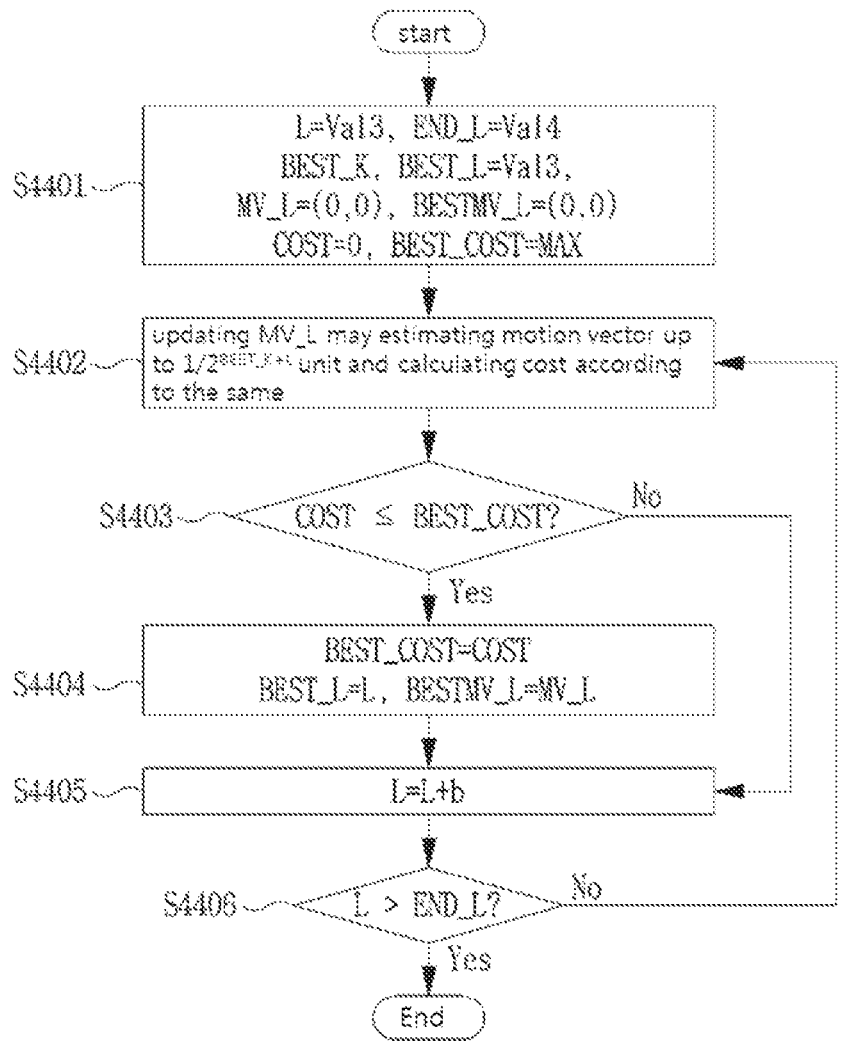

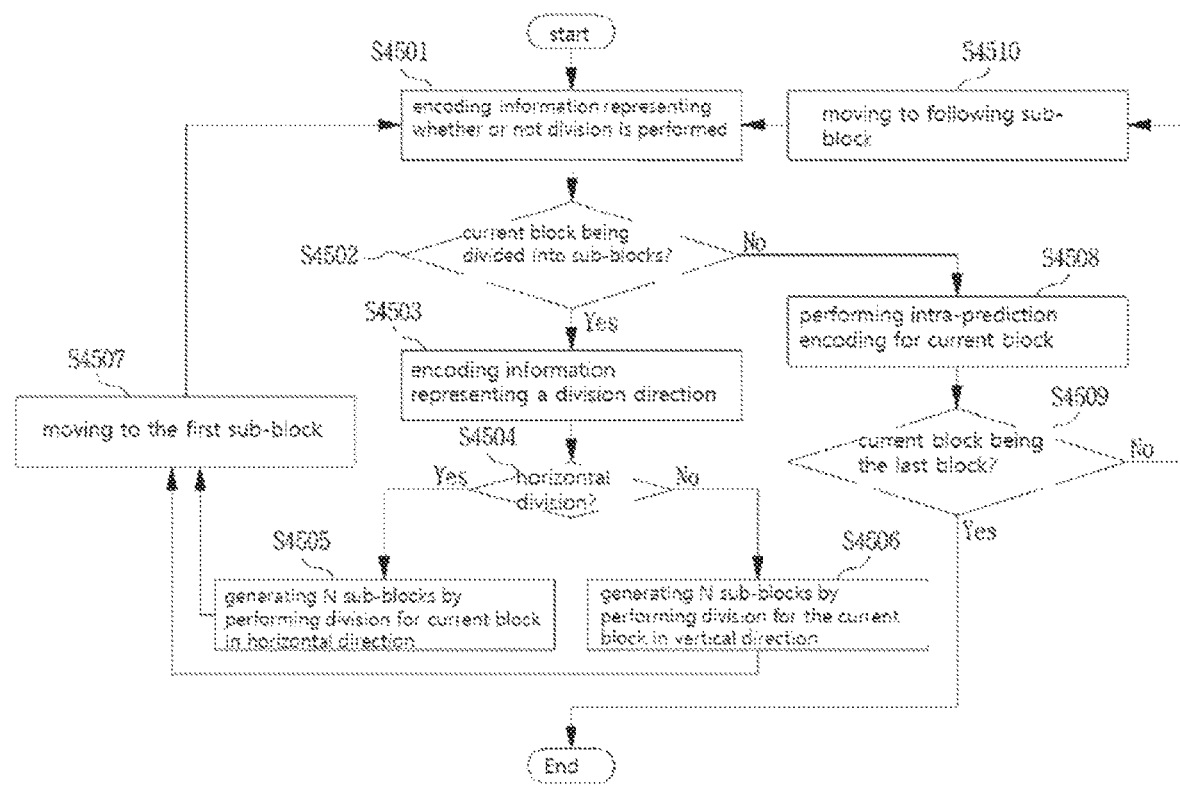
[FIG. 45]

[FIG. 46]
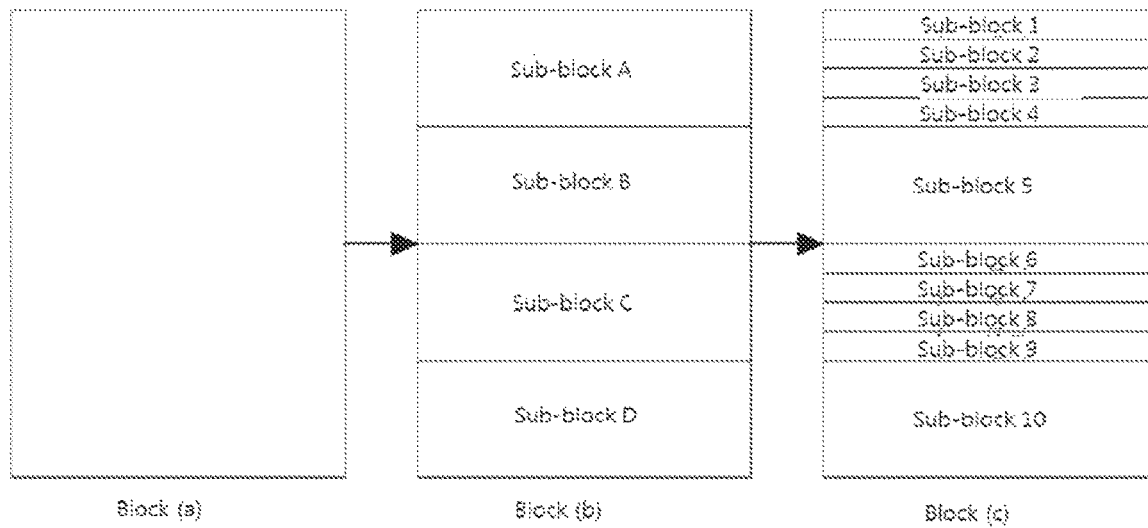
[FIG. 47]
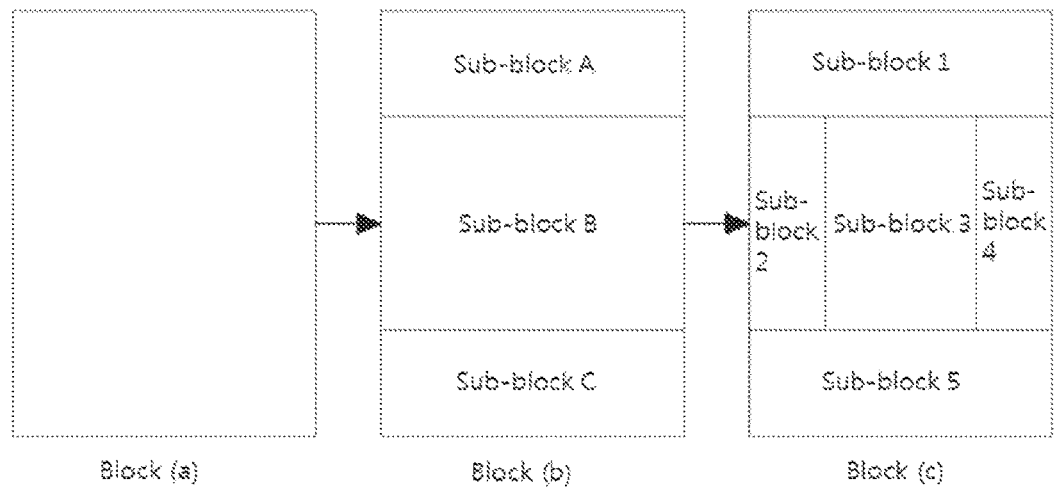

[FIG. 48]
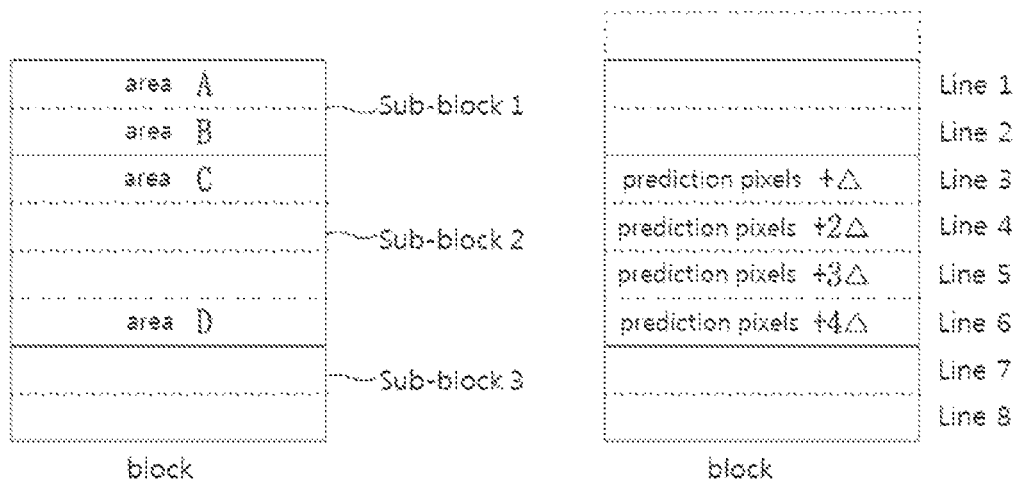
[FIG. 49]
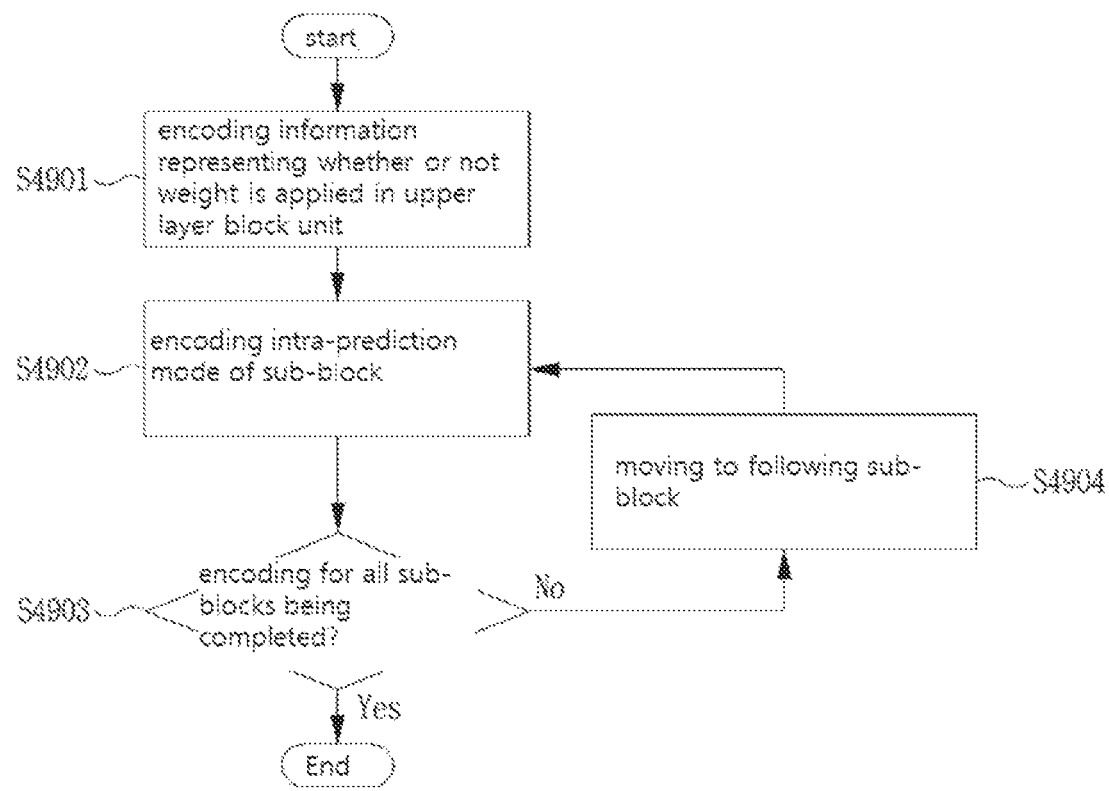

[FIG. 50]

| 3 | 2 | 1 | 1 | 1 | 1 | 0 | 2 |
|---|---|---|---|---|---|---|---|

| 0 | |
|---|---|
| 0 | block |
| 3 | |
| 4 | |

[FIG. 51]

| intra-prediction mode | 2 | 3 | 4 | 5 | 6 | 7 | 8 | ... |
|---|---|---|---|---|---|---|---|---|
| newly assigned index | 0 | 1 | 2 | 3 | 4 | 5 | 6 | ... |

[FIG. 52]
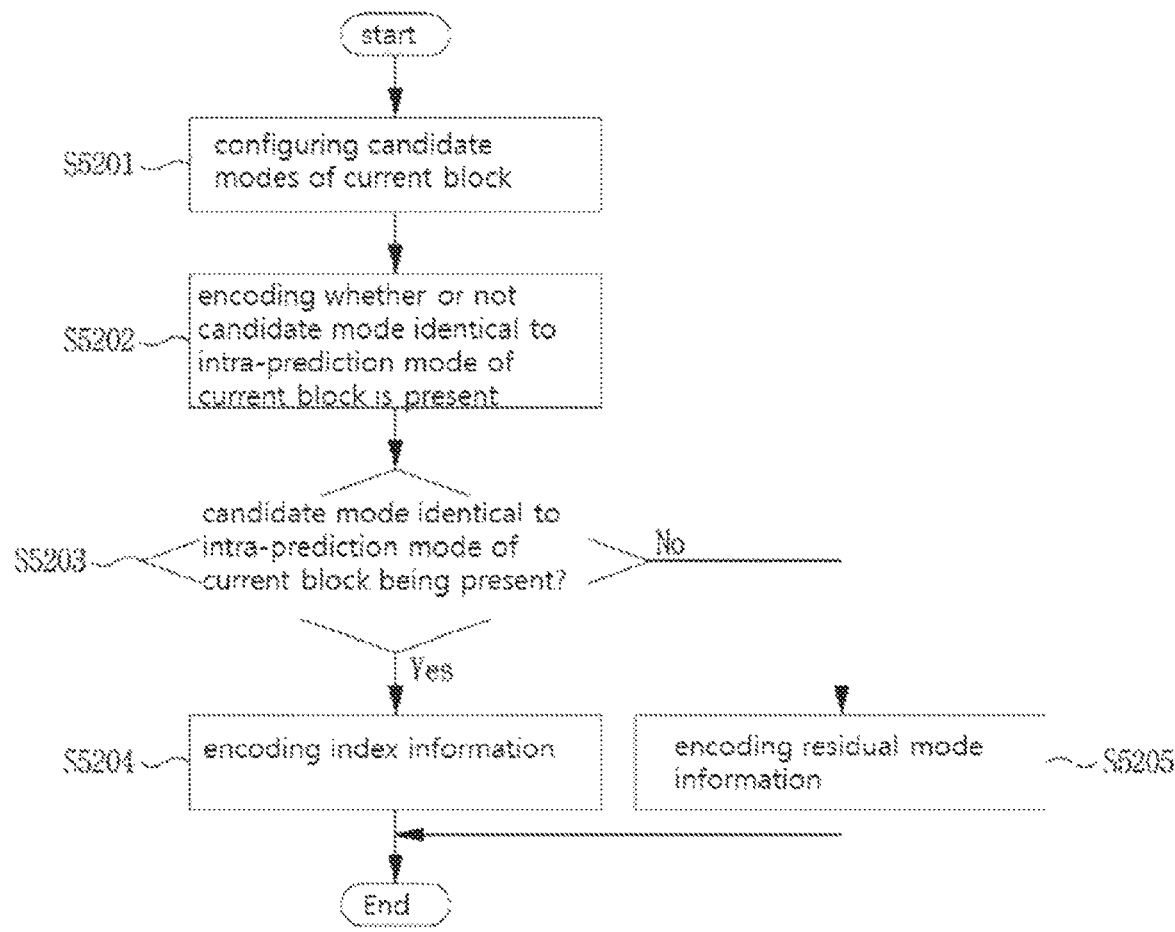

[FIG. 53]
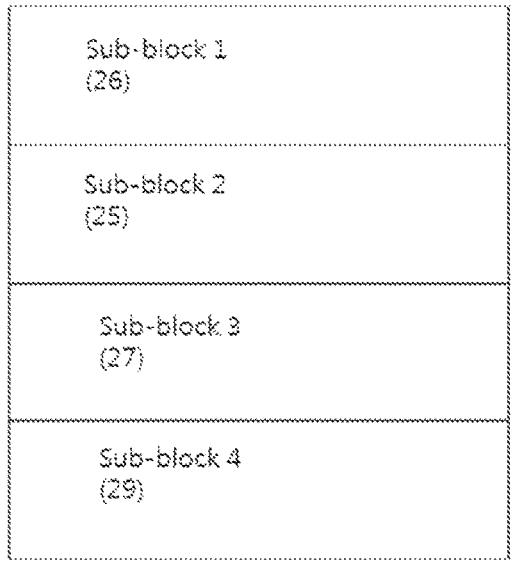
[FIG. 54]
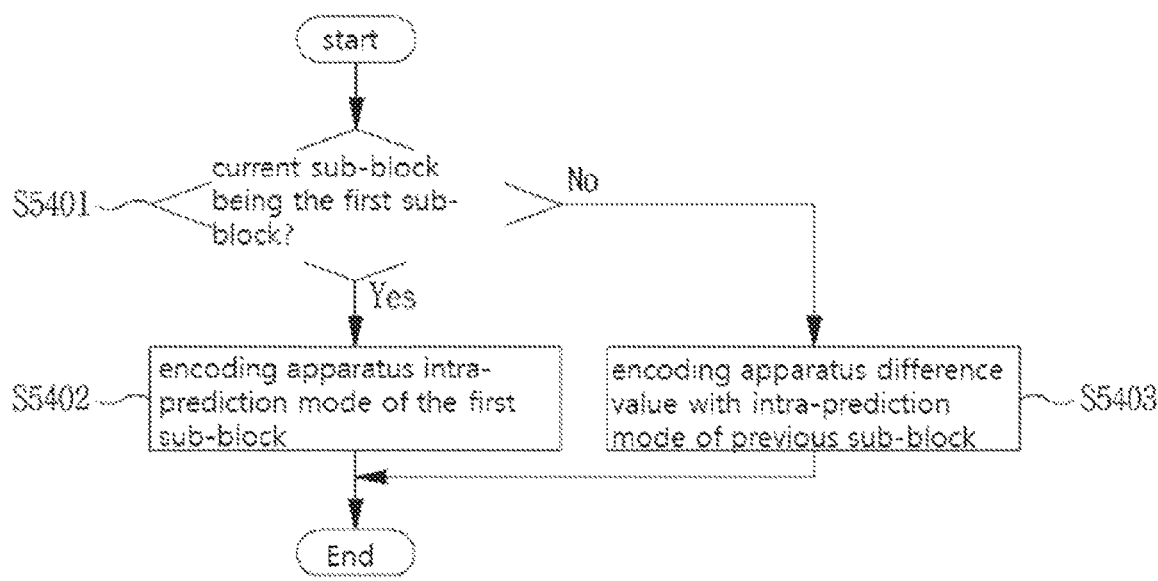

[FIG. 55]
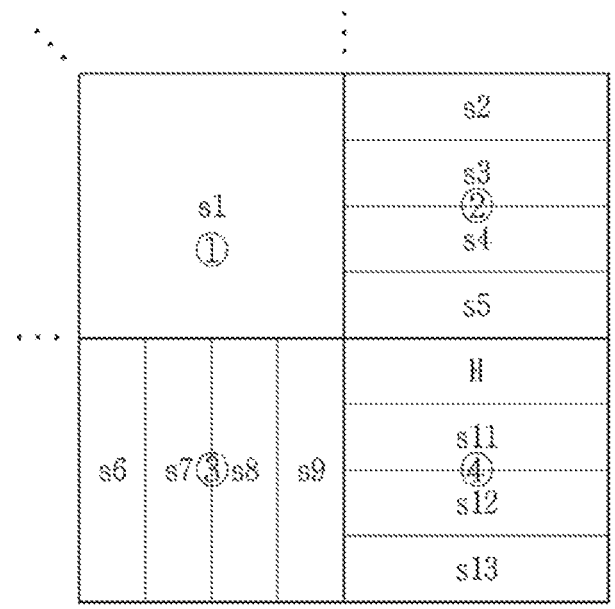

[FIG. 56]
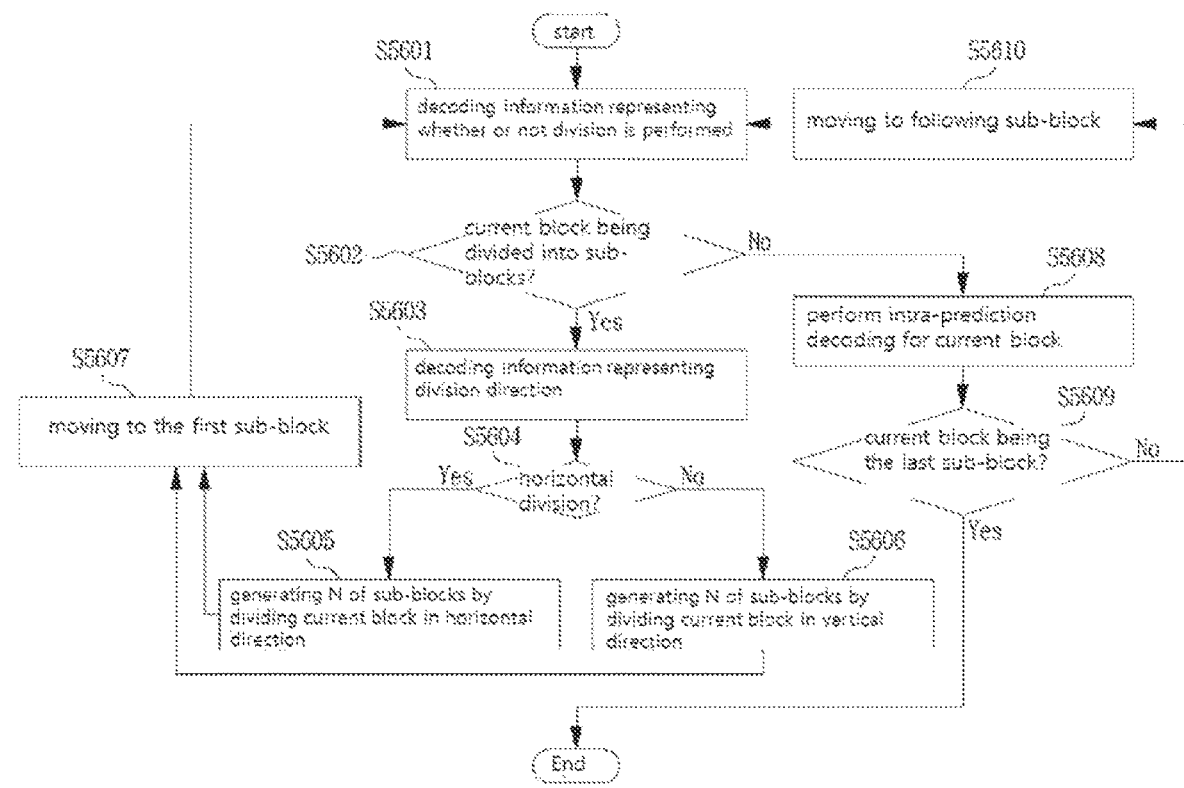

[FIG. 57]
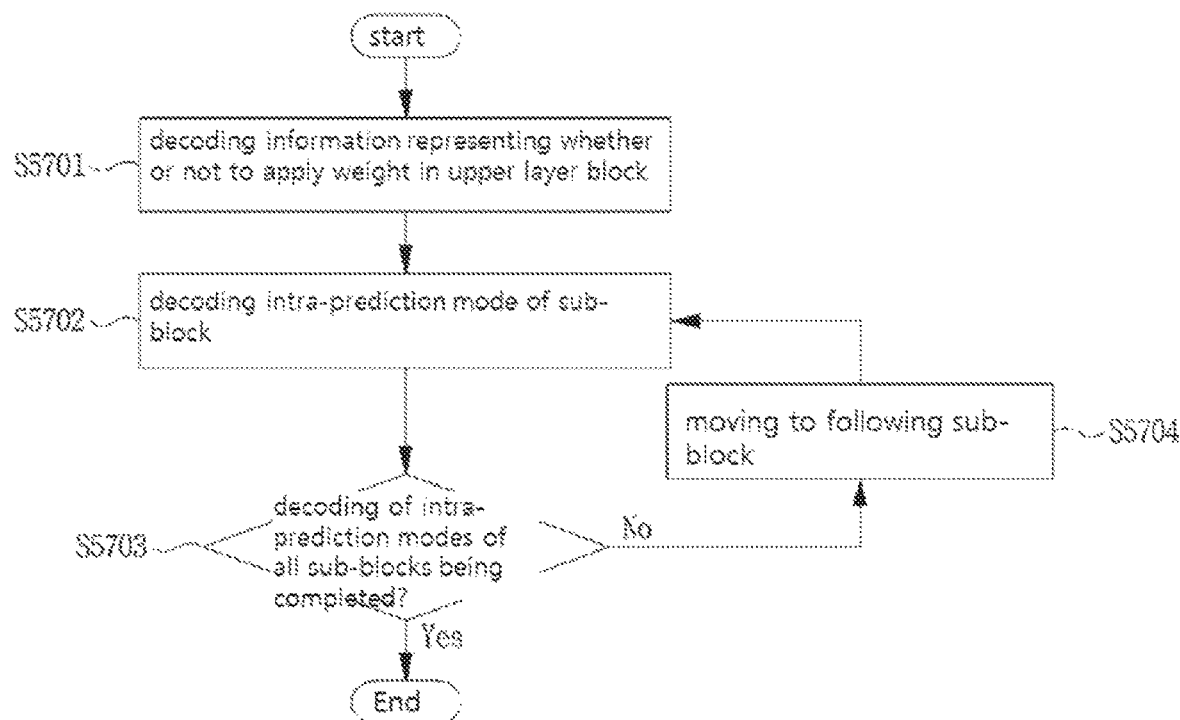

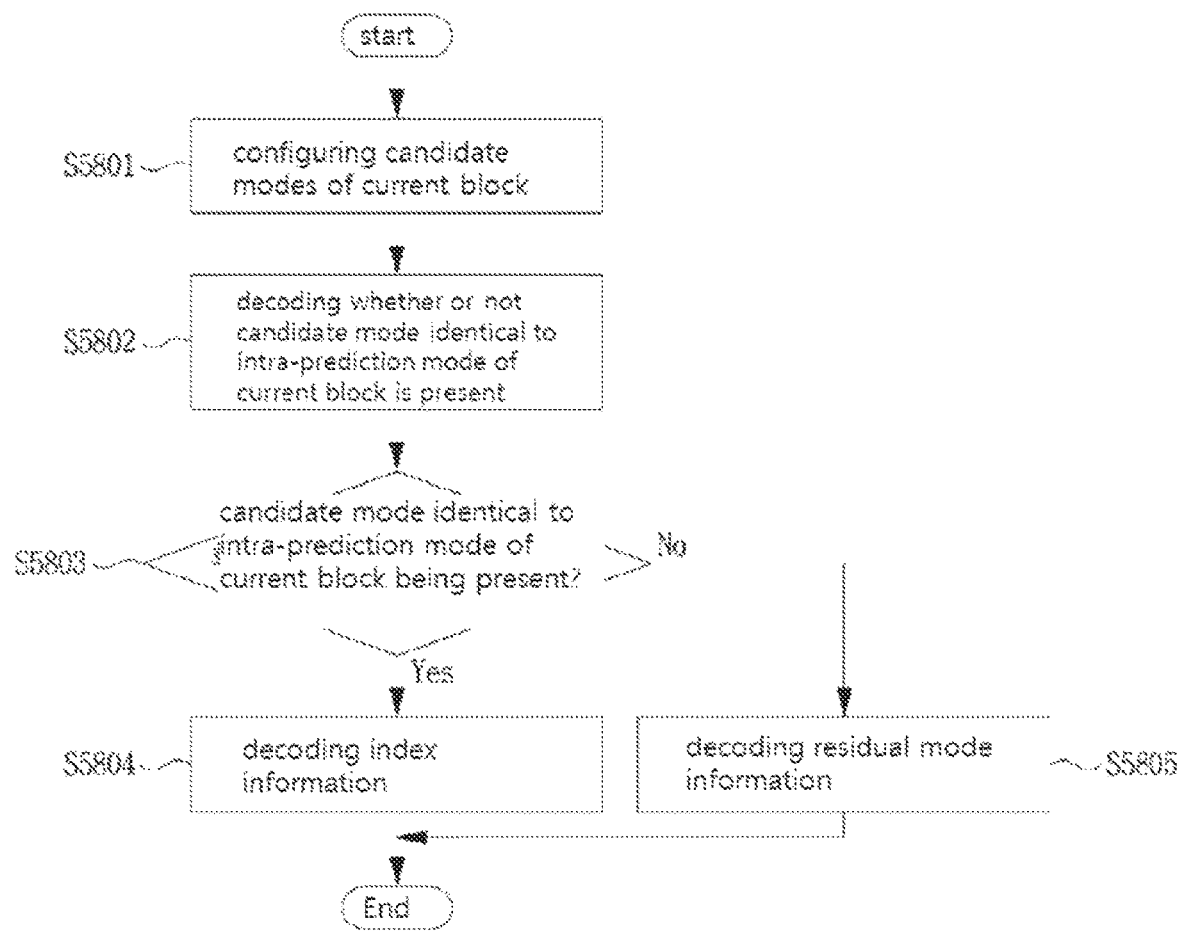
[FIG. 56]

[FIG. 59]
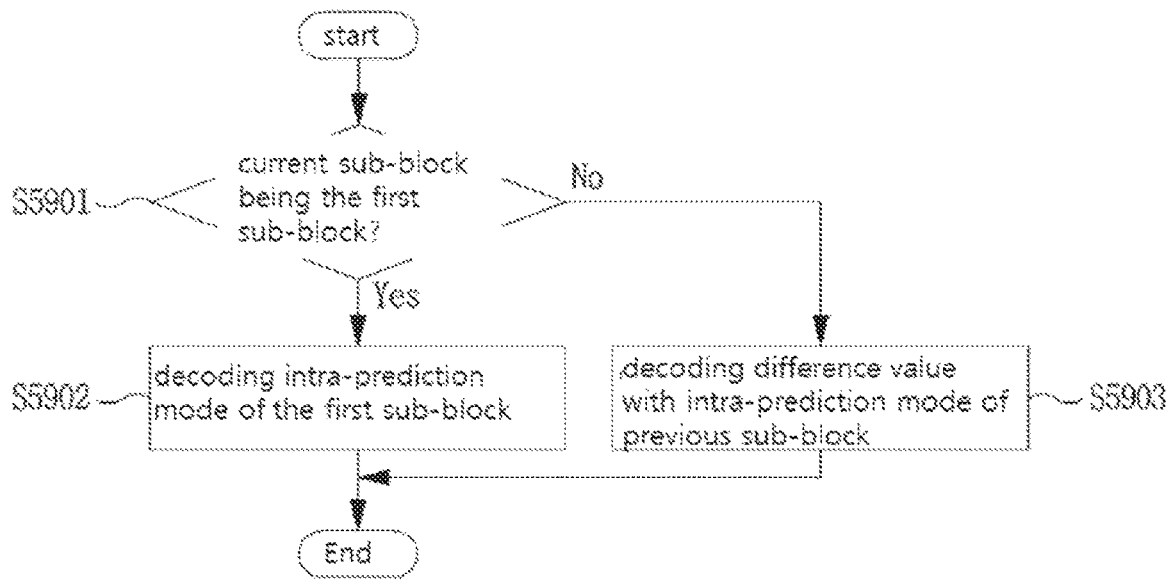
[FIG. 60]
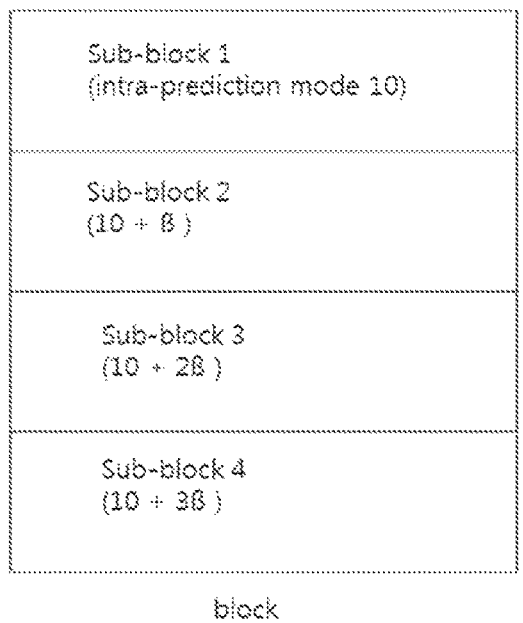

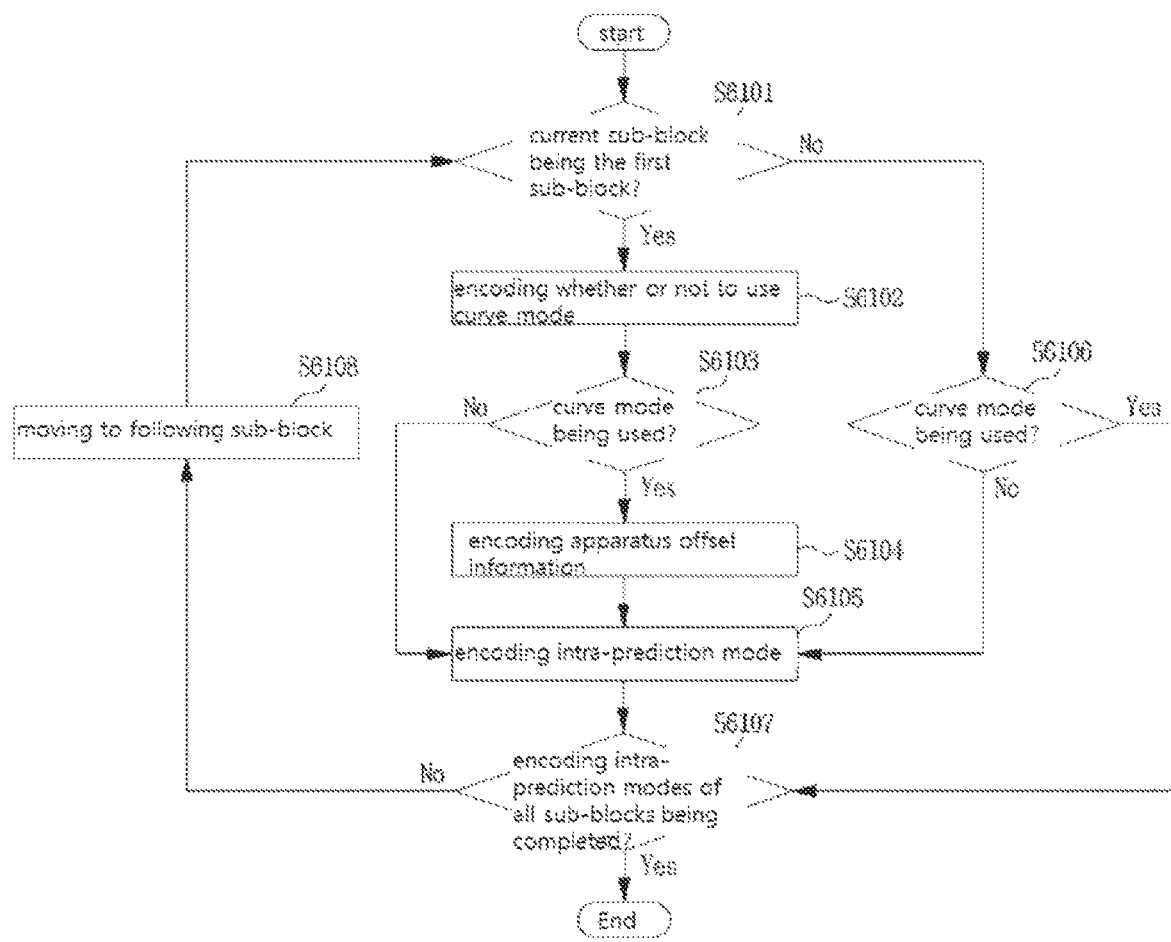
[FIG. 61]

[FIG. 62]
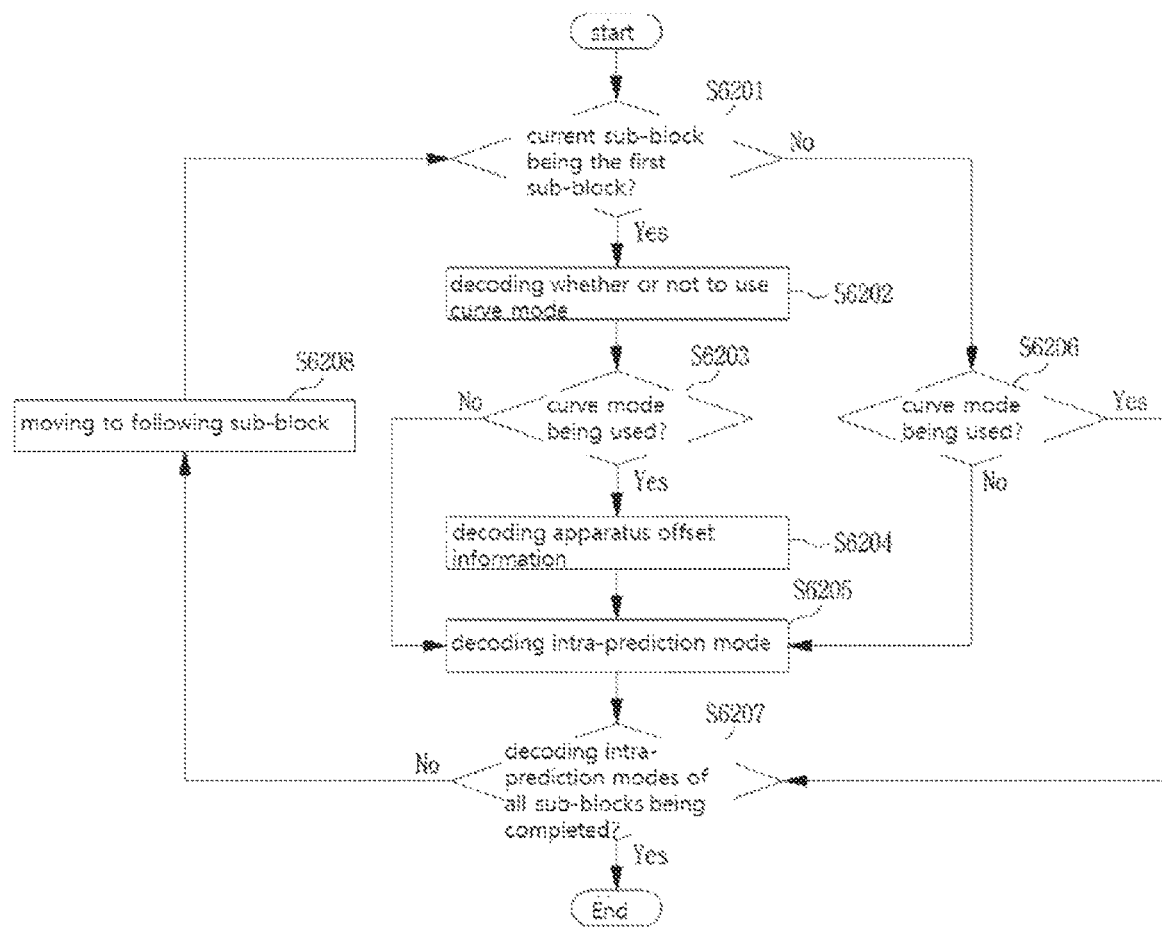

METHOD AND APPARATUS FOR ENCODING/DECODING VIDEO SIGNAL

CROSS REFERENCE TO RELATED APPLICATIONS

This application is a continuation of U.S. application Ser. No. 17/684,607 filed Mar. 2, 2022, which is continuation application of U.S. application Ser. No. 17/038,260 filed Sep. 30, 2020, which is a continuation of U.S. application Ser. No. 16/097,354 filed Oct. 29, 2018, which is a U.S. national stage application of International Application No. PCT/KR2017/004569 filed on Apr. 28, 2017, which claims the benefit of Korean Patent Application No. 10-2016-0052697 filed on Apr. 29, 2016, Korean Patent Application No. 10-2016-0052710 filed on Apr. 29, 2016, Korean Patent Application No. 10-2016-0052712 filed on Apr. 29, 2016, Korean Patent Application No. 10-2016-0052940 filed on Apr. 29, 2016, and Korean Patent Application No. 10-2016-0052947 filed on Apr. 29, 2016, in the Korean Intellectual Property Office, the entire disclosures of which are incorporated by reference for all purposes.

TECHNICAL FIELD

The present invention relates to a method and apparatus for encoding/decoding a video signal.

BACKGROUND ART

Recently, demand for multimedia data such as videos is rapidly increasing on the Internet. However, the speed at which the bandwidth of a channel evolves is a situation that is hard to follow is hard to follow the amount of multimedia data that is rapidly increasing. Accordingly, the video coding expert group (VCEG) of the international organization for standardization (ITU-T) and the MPEG (moving picture expert group) of ISO/IEC established the HEVC (high efficiency video coding) version 1 in February 2014.

In HEVC, methods of intra-prediction, inter-prediction, transform, quantization, entropy encoding, and in-loop filter are defined. Among then, inter-prediction means performing prediction by using reconstructed videos, and notion information such as a notion vector, a reference video index, a prediction direction (inter prediction indicator), etc.

Inter-prediction may obtain high prediction efficiency when correlation between videos is high. However, an inter-prediction result may be incorrect when correlation between videos becomes low as change in brightness is present such as during fade-in or fade-out.

In addition, in order to obtain high encoding efficiency through inter-prediction or intra-prediction, more accurate notion information or more precise intra-prediction mode is required. Herein, an amount of data to be transmitted to a decoding apparatus increases.

Accordingly, efforts for improving precision in inter-prediction and reducing an amount of overhead to be transmitted form an encoding apparatus to a decoding apparatus has been made.

DISCLOSURE

Technical Problem

Accordingly, an object of the present invention is to improve intra-prediction/inter-prediction efficiency when encoding/decoding a video.

In addition, another object of the present invention is to improve inter-prediction efficiency by using a weight when encoding/decoding a video.

In addition, still another object of the present invention is to improve precision of a motion vector by using reconstructed information adjacent to a current block.

In addition, still another object of the present invention is to improve encoding/decoding efficiency by correcting an intra-prediction result when encoding/decoding a video.

In addition, still another object of the present invention is to effectively encode an intra-prediction mode when encoding/decoding a video.

In addition, still another object of the present invention is to improve encoding/decoding efficiency by dividing a current block into a plurality of sub-blocks and performing prediction for each sub-block.

Technical Solution

A video signal decoding method and apparatus according to the present invention may determine whether or not a current block is merged with a neighbor block adjacent to the current block; obtain motion information and a weight prediction parameter of the current block based on the determination result; select a reference block of the current block based on the motion information; and generate a prediction block of the current block by applying the weight prediction parameter to the reference block.

In the video signal decoding method and apparatus according to the present invention, when the current block is determined to be merged with the neighbor block, the weight prediction parameter of the current block may be set to be identical to a weight prediction parameter of the neighbor block.

In the video signal decoding method and apparatus according to the present invention, when the current block is determined not to be merged with the neighbor block, the weight prediction parameter of the current block is obtained from information decoded from a bitstream.

In the video signal decoding method and apparatus according to the present invention, the motion information may include a motion vector, wherein a precision of the motion vector may be upwardly adjusted based on reconstruct pixels adjacent to the current block.

A video signal decoding method and apparatus according to the present invention may: decoding information of an intra-prediction mode of a current block; performing intra-prediction for the current block by using the intra-prediction mode of the current block; determining whether or not to correct a prediction sample generated as a result of performing the intra-prediction; and correcting the prediction sample according to the determination result.

In the video signal decoding method and apparatus according to the present invention, the decoding of the information of the intra-prediction mode of the current block may include: generating candidate modes of the current block; determining whether or not a candidate mode identical to the intra-prediction mode of the current block is present; and determining the intra-prediction mode of the current block based on the determination result.

In the video signal decoding method and apparatus according to the present invention, the candidate mode may be determined based on a frequency of use of at least one of an upper neighbor block adjacent to an upper part of the current block and a left neighbor block adjacent to a left side of the current block.

In the video signal decoding method and apparatus according to the present invention, the decoding of the information of the intra-prediction mode of the current block may include: decoding a difference value between an intra-prediction modes of the current block and a previous block; and determining the intra-prediction mode of the current block based on the intra-prediction mode of the previous block and the difference value.

A video signal encoding method and apparatus according to the present invention may: determine motion information and a weight prediction parameter of a current block; and encode information representing whether or not the motion information and the weight prediction parameter of the current block are merged with a neighbor block adjacent to the current block. A prediction block of the current block may be generated by applying the weight prediction parameter to a reference block selected based on the motion information.

In the video signal encoding method and apparatus according to the present invention, when the current block is merged with the neighbor block, the weight prediction parameter of the current block may be set to be identical to a weight prediction parameter of the neighbor block.

In the video signal encoding method and apparatus according to the present invention, when the current block is not merged with the neighbor block, the method may further include encoding information related to the weight prediction parameter of the current block.

In the video signal encoding method and apparatus according to the present invention, the motion information may include a motion vector, and the method may further include: encoding information representing whether or not to upwardly adjust a precision of the motion vector based on reconstruct pixels adjacent to the current block.

A video signal encoding method and apparatus according to the present invention may: determine an intra-prediction mode of a current block; correct a prediction sample generated based on the intra-prediction mode; and encode information representing whether or not to correct the prediction sample based on the prediction sample and the corrected prediction sample.

The video signal encoding method and apparatus according to the present invention may further: generate a candidate mode of the current block; determine whether or not a candidate mode identical to the intra-prediction mode of the current block is present; and encode information representing whether or not the candidate mode identical to the intra-prediction mode of the current block is present based on the determination result.

In the video signal encoding method and apparatus according to the present invention, the candidate mode may be determined based on a frequency of use of at least one of an upper neighbor block adjacent to an upper part of the current block and a left neighbor block adjacent to a left side of the current block.

The video signal encoding method and apparatus according to the present invention may further encode a difference value between intra-prediction modes of the current block and a previous block.

Advantageous Effects

The present invention can improve intra-prediction/inter-prediction efficiency when encoding/decoding a video.

In addition, the present invention can improve inter-prediction efficiency by using a weight when encoding/decoding a video.

In addition, the present invention can improve precision of a notion vector by using reconstructed information adjacent to a current block.

In addition, the present invention can improve an encoding/decoding efficiency by correcting an intra-prediction result when encoding/decoding a video.

In addition, the present invention can effectively encode an intra-prediction mode when encoding/decoding a video.

In addition, the present invention can improve encoding/decoding efficiency by dividing a current block into a plurality of sub-blocks, and performing prediction for each sub-block.

DESCRIPTION OF DRAWINGS

FIG. 1 is a view of a block diagram showing a video encoding apparatus according to an embodiment of the present invention.

FIG. 2 is a view of a block diagram showing a video decoding apparatus according to an embodiment of the present invention.

FIG. 3 is a configuration diagram schematically showing a notion estimating method according to an embodiment of the present invention.

FIG. 4 is a view of an example showing a position of a neighbor block from which motion information for applying to a block to be currently is obtained according to an embodiment of the present invention.

FIG. 5 is a view of an example of an aspect in change in brightness between a current video including a current block and a current block.

FIG. 6 is a view showing an example of performing intra-prediction by using a planar mode.

FIG. 7 is a view showing an example of performing intra-prediction by using a DC mode.

FIG. 8 is a view showing an example of performing intra-prediction by using a horizontal directional prediction mode and a vertical directional prediction mode.

FIG. 9 is a view showing an example of an aspect in change in brightness between a current video including a current block ad a reference video.

FIG. 10 is a view of a flowchart showing a method of applying a weight prediction parameter to a current block in a video encoding apparatus.

FIG. 11 is a view of a flowchart of encoding a weight prediction parameter.

FIG. 12 is a view of a flowchart of decoding a weight prediction parameter in a decoding apparatus.

FIG. 13 is a view of showing an example of deriving a weight prediction parameter of a current block.

FIG. 14 is a view of showing another example of deriving a weight prediction parameter of a current block.

FIG. 15 is a view showing an example of deriving a weight prediction parameter by using at least one of a left reconstructed pixel area and an upper reconstructed pixel area.

FIG. 16 is a view showing a weight prediction parameter set.

FIG. 17 is a view showing a pixel positions used for regression analysis.

FIG. 18 is a view of a flowchart showing determining whether or not to use a correction coefficient of a current block.

FIG. 19 is a view of showing an example of determining a correction coefficient of a current block.

FIG. 20 is a view showing various forms of a reconstructed pixel area.

FIG. 21 is a view of a flowchart showing a method of encoding information related to a correction coefficient.

FIG. 22 is a view of a flowchart showing determining whether or not to perform correction for a current block in a decoding apparatus.

FIG. 23 is a view of a flowchart showing determining whether or not to perform prediction of an intra-prediction mode for a current block by using a reconstructed pixel area of a current block in an encoding apparatus.

FIG. 24 is a view showing a method of performing prediction of an intra-prediction mode using an index.

FIG. 25 is a view of showing an example of determining an intra-prediction mode of a current block rather than using a method performing prediction of an intra-prediction mode.

FIG. 26 is a view of showing a method of predicting an intra-prediction mode of a current block by using a reconstructed pixel area of the current block.

FIG. 27 is a view of a flowchart showing encoding information related to a method of determining an intra-prediction mode of a current block.

FIG. 28 is a view of a flowchart showing decoding an intra-prediction mode of a current block.

FIG. 29 is a view of showing a method of performing intra-prediction by using a reconstructed pixel area.

FIG. 30 is a view of a flowchart showing a method of determining an intra-prediction method of a current block by using a reconstructed pixel area.

FIG. 31 is a view of a flowchart showing a method of encoding information related to performing or nor not performing intra-prediction using a reconstructed pixel area.

FIG. 32 is a view of a flowchart showing a method of decoding information related whether or not to perform intra-prediction using a reconstructed pixel area.

FIG. 33 is a view of showing a method of performing inter-prediction for a current block by using a reconstruction pixel adjacent to a current block.

FIG. 34 is a view showing an example of motion estimation that may be performed in an encoding apparatus or decoding apparatus.

FIG. 35 is a view showing determining a prediction block of a 4×4 size by using a notion vector estimated in a ¼ position pixel unit.

FIG. 36 is a view of a flowchart showing determining whether or not to perform inter-prediction by using a reconstructed pixel area.

FIG. 37 is a view of a flowchart showing encoding an inter-prediction method of a current block.

FIG. 38 is a view of a flowchart showing decoding an inter-prediction method of a current block.

FIG. 39 is a view of showing an example of improving a notion vector of a current block by using a reconstructed pixel area.

FIG. 40 is a view of a flowchart showing determining a notion vector in an encoding apparatus.

FIG. 41 is a view of a flowchart showing selecting a best notion vector in an encoding apparatus when values of a basis precision K and an additional precision L are adaptively selected in a block unit.

FIG. 42 is a view showing encoding a best notion vector of a current block.

FIG. 43 is a view showing decoding a best notion vector of a current block.

FIG. 44 is a view of a flowchart showing obtaining an improved notion vector in a decoding apparatus.

FIG. 45 is a view of a flowchart showing encoding intra-prediction information of each sub-block when a current block is divided into a plurality of sub-blocks.

FIGS. 46 ad 47 are views showing an example of dividing a current block into a plurality of sub-blocks.

FIG. 48 is a view showing an example of determining a weight of a sub-block.

FIG. 49 is a view of a flowchart showing encoding information related to a weight to be applied to each sub-block.

FIG. 50 is a view of showing encoding an intra-prediction mode of a sub-block that is currently encoded.

FIG. 51 is a view showing an example of sub-block residual intra-prediction modes.

FIG. 52 is a view of a flowchart showing encoding an intra-prediction mode of a current block.

FIG. 53 is a view of showing an example of determining an intra-prediction in a sub-block unit.

FIG. 54 is a view of a flowchart showing encoding an intra-prediction mode of a sub-block.

FIG. 55 is a view of showing in detail an example of encoding an intra-prediction mode for each sub-block.

FIG. 56 is a view of a flowchart showing decoding intra-prediction information of a sub-block in a decoding apparatus.

FIG. 57 is a view of a flowchart showing decoding information related to a weight.

FIG. 58 is a view of a flowchart showing decoding an intra-prediction mode of a sub-block that is currently decoded.

FIG. 59 is a view of showing another example of decoding an intra-prediction mode of a sub-block.

FIG. 60 is a view of showing an example of determining whether or not to use a curve mode.

FIG. 61 is a view of a flowchart showing encoding an intra-prediction mode of each sub-block by using information of a curve mode.

FIG. 62 is a view of a flowchart showing decoding an intra-prediction mode of each sub-block by using information of a curve mode.

FIGS. 63 to 65 are view of showing a method of performing an intra-prediction for a sub-block when transform is performed in upper layer block unit.

MODE FOR INVENTION

The preferred embodiments of the present invention will be explained below with reference to accompanied drawings. While the invention can have a variety of modifications and configurations, certain embodiments have been illustrated and explained herein. However, this should not be construed as limiting the invention to any specific disclosed configuration, but rather understood as including all the modifications, equivalents or replacements that may be included under the concept and technical scope of the present invention.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises", "comprising", "includes", and "including" when used herein, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the attached drawings. In order to facilitate a thorough understanding of the present invention, the same reference numerals designate the same components in the drawings, and repeated description of the same components will be omitted.

FIG. 1 is a block diagram showing a video encoding apparatus according to an embodiment of the present invention.

Referring to FIG. 1, a video encoding apparatus 100 may include a video dividing unit 110, prediction units 120 and 125, a transform unit 130, a quantization unit 135, a rearrange unit 160, an entropy encoding unit 165, a dequantization unit 140, an inverse-transform unit 145, a filter unit 150, and a memory 155.

Each configuration component shown in FIG. 1 is independently shown in order to indicate different and characteristic functions in the video encoding apparatus, but this does not mean that each of the element units is formed of a separate piece of hardware or software. That is, the element units are arranged and included for convenience of description, and at least two of the element units may form one element unit or one element unit may be divided into a plurality of element units to perform their own functions. An embodiment in which the element units are integrated and an embodiment in which the element units are separated are included in the scope of the present invention, unless it departs from the essence of the present invention.

Furthermore, some elements may not serve as necessary elements to perform an essential function in the present invention, but may serve as selective elements to improve performance. The present invention may be embodied by including only necessary elements to implement the spirit of the present invention excluding elements used to improve performance, and a structure including only necessary elements excluding selective elements used to improve performance is also included in the scope of the present invention.

The video dividing unit 110 may divide an input video into at least one block. Herein, the block may mean a coding unit (CU), a prediction unit (PU) or a transform unit (TU). The division may be performed on the basis of quad tree and binary tree. Quad tree division is a method of dividing an upper layer block into four lower layer blocks having a width and a height to be half of the upper layer block. Binary tree division is a method of dividing an upper layer block into two lower layer blocks having a width or a height to be half of the upper layer block. By performing quad tree or binary tree based division described above, the block may have a square or a non-square form.

Hereinafter, in an embodiment of the present invention, a coding unit may be used as a unit of performing encoding or may be used as a unit of performing decoding.

The prediction units 120 and 125 may include an inter-prediction unit 120 performing inter-prediction, and an intra-prediction unit 125 performing intra-prediction. Whether or not to use inter-prediction or to perform intra-prediction for a prediction unit may be determined, and detailed information according to each prediction method (for example, intra-prediction mode, motion vector, reference video, etc.) may be determined. Herein, a processing unit for which prediction is perform may differ from a processing unit determined by a prediction method and detailed content. For example, a prediction method and a prediction mode may be determined in a prediction unit, and performing of prediction may be performed in a transform unit.

A residual value (residual block) between a prediction block and an original block may be input to the transform unit 130. In addition, prediction mode information used for prediction, notion vector information, etc. may be transferred to the decoder with a residual value by being encoded in the entropy encoding unit 165. When a specific encoding mode is used, a prediction block may not be generated by the prediction units 120 and 125, and an original block may be encoded as it is and transmitted to the decoding unit.

The inter-prediction unit 120 may predict a prediction unit on the basis of information of one of previous and following videos of a current video, or predict a prediction unit on the basis of information of a partial area for which encoding is completed within the current video when necessary. The inter-prediction unit 120 may include a reference video interpolation unit, a motion information generating unit, and a motion compensation unit.

In the reference video interpolation unit, reference video information may be provided from the memory 155 and information of a pixel equal to or smaller than an integer pixel may be generated from a reference video. In case of a luma pixel, in order to generate information of a pixel equal to or smaller than an integer pixel in a ¼ pixel unit, a DCT-based 8-tab interpolation filter differing in a filter coefficient may be use. In case of a chroma signal, in order to generate information of a pixel equal to or smaller than an integer pixel in a ⅛ pixel unit, a DCT-based 4-tab interpolation filter differing in a filter coefficient may be used.

The notion information generating unit may generate notion information on the basis of a reference video interpolated by the reference video interpolation unit. Herein, notion information means a notion vector, a reference video index, a prediction direction, etc. As a method of estimating a notion vector, various methods may be used such as full search-based block matching algorithm (FBMA), three step search (TSS), new three-step search algorithm (NTS), etc. In addition, a notion vector may have a notion vector value in a ½ or ¼ pixel unit on the basis of an interpolated pixel. During inter-prediction, a current prediction unit may be predicted by using a method differing from a method of generating notion information. As a method of generating motion information, various methods may be used such as a merge method using a motion vector of a neighbor block, a motion estimation method (for example, AMVP (adaptive notion vector prediction)), etc.

In an embodiment, FIG. 3 is a view showing an example of generating motion information by motion estimation. Motion estimation is to determine a motion vector of a current block, a reference video index, and an inter-prediction direction according to determination when a reference block identical or similar to a prediction block within a reference video or which encoding and decoding have been completed is determined.

In case of using an AMVP method, the encoding apparatus may be generate a notion vector prediction (MV) by predicting a motion vector estimated in a current block, and encode a difference value between the notion vector and the generated prediction notion vector (MVD: notion vector difference).

A method of using a notion vector of a neighbor block is to apply notion information of a neighbor block adjacent to a current block to the current block. Herein, the neighbor block may include a spatial neighbor block adjacent to the current block and a temporal neighbor block present at a position identical to the current block included in a reference video. In an embodiment, FIG. 4 is a view of an example of a neighbor block of a current block. The encoding apparatus may determine notion information of a current block by applying to the current block motion information of a neighbor block (spatial neighbor block: A~E, temporal neighbor block: Col) of the current block shown in FIG. 4. Herein, Col means a block at a position identical or similar to the current block present in a reference video.

The intra-prediction unit 125 may generate a prediction unit on the basis of information of a reference pixel adjacent to a current block, and which is pixel information within the current video. When a neighbor block of a current prediction unit is a block for which inter-prediction is performed so that a reference pixel is a pixel reconstructed by performing inter-prediction, a reference pixel included in a block for which inter-prediction is performed may be used as reference pixel information of the neighbor block for which intra-prediction is performed by replacing the same. In other words, when a reference pixel is not available, information of a reference pixel that is not available may be used by replacing the same with at least one reference pixel among available reference pixels.

During intra-prediction, a prediction mode may include a directional prediction mode using reference pixel information according to a prediction direction, and a non-directional mode that does not use directional information when performing prediction. A mode for predicting luma information may differ from a mode for predicting chroma information. In order to predict chroma information, intra-prediction mode information used for predicting luma information or predicted luma signal information may be used.

In an embodiment, FIG. 5 is a view of an example of intra-prediction modes.

In FIG. 5, 35 intra-prediction modes are shown. Herein, modes 0 and 1 may be a non-directional prediction mode (or non-angular prediction mode), and respectively represent a planar mode and a DC mode. Modes from 2 to 34 represent a directional prediction mode (or angular prediction mode).

In FIG. 5, 35 intra-prediction modes are shown, but a larger number of intra-prediction modes may be used, or a smaller number of intra-prediction modes may be used. In an embodiment, 67 intra-prediction modes may be used for encoding a current block, or 19 intra-prediction modes may be used for encoding a current block.

Alternatively, a number of intra-prediction modes that may be used for a block to be encoded may vary according to a size or form of the block to be encoded.

FIG. 6 is a view of showing an example of performing intra-prediction by using a planar mode.

Under a planar mode, a prediction pixel may be generated on the basis of a vertical directional prediction pixel and a horizontal directional prediction pixel.

Herein, a horizontal directional prediction pixel P1 may be generated by performing linear interpolation for a reconstructed pixel at a position identically to P1 in a Y axis, and a reconstructed pixel T present in an upper right of a current block.

A vertical directional prediction pixel P2 may be generated by performing linear interpolation for a reconstructed pixel at a position identically to a P2 in an X axis, and a reconstructed pixel L present in a left lower of the current block.

A prediction pixel may be generated on the basis of an average value of the horizontal directional prediction pixel P1 and the vertical directional prediction pixel P2.

FIG. 7 is a view of showing an example of performing intra-prediction by using a DC mode.

Under a DC mode, a prediction pixel may be generated on the basis of an average value of reconstructed pixels adjacent to a current block. As the prediction pixel is generated by using an average value of reconstructed pixels adjacent to the current block, prediction pixels within a prediction block have a uniform pixel value.

FIG. 8 is a view showing an example of performing intra-prediction by using a horizontal directional prediction mode and a directional direction prediction mode.

Under a horizontal directional prediction mode (mode 10 shown in FIG. b), a prediction pixel may be generated by copying a reference pixel value positioned in a horizontal direction (that is, reference pixel adjacent to the left of the current block).

Under a vertical directional prediction mode (mode 26 shown in FIG. 5), a prediction pixel may be generated by copying a reference pixel value positioned in a vertical direction (that is, reference pixel adjacent to the upper of the current block).

As descried above, under a directional prediction mode, a reference pixel positioned in a direction indicated by the directional prediction mode may be generated as a prediction pixel. When at least two reference pixels are present in a direction indicated by a directional prediction mode, a prediction pixel may be generated by performing interpolation for at least two reference pixels.

An intra-prediction method may generate a prediction block after applying an AIS (adaptive intra smoothing) filter to a reference pixel according to a prediction mode. Types of the AIS filter applied to the reference pixel may vary. In order to perform an intra-prediction method, an intra-prediction mode of a current prediction unit may be predicted from an intra-prediction mode of a prediction unit present adjacent to the current prediction unit. When the intra-prediction mode of the current prediction unit is predicted by using information of an intra-prediction mode predicted from a neighbor prediction unit, and intra-prediction modes of the current prediction unit and the neighbor prediction unit are identical, information indicating that prediction modes of the current prediction unit and the neighbor prediction unit are identical may be transmitted by using predetermined flag information. Alternatively, when prediction modes of the current prediction unit and the neighbor prediction unit are different, prediction mode information of the current block may be encoded by performing entropy encoding.

In addition, based on a prediction unit generated in the prediction units 120 and 125, a residual block including residual value information that is a difference value between a prediction unit for which prediction is performed and an original block of the prediction unit. The generated residual block may be input to the transform unit 130.

In the transform unit 130, a residual block including residual data may be transformed by using a transform method such as DCT, DST, KLT (karhunen loeve transform), etc. Herein, the transform method may be determined on the basis of an intra-prediction mode of a prediction unit used for generating a residual block. For example, according to an intra-prediction mode, DCT may be used for a horizontal direction, and DST may be used for a vertical direction.

The quantization unit 135 may perform quantization for values transformed from a frequency area in the transform unit 130. According to a block or significance of a video, a quantization coefficient may vary. The value calculated in the quantization unit 135 may be provided to the dequantization unit 140 and the rearrange unit 160.

The transform unit 130 or the quantization unit 135 or both may be selectively included in the video encoding apparatus 100. In other words, the video encoding apparatus 100 may perform at least one of transform and quantization for residual data of a residual block, or may encode the residual block by skipping both of transform and quantization. In the video encoding apparatus 100, at least one of transform and quantization may not be performed, and a block for which transform and quantization are not performed and input to entropy encoding unit 165 is generally called a transform block.

The rearrange unit 160 rearranges coefficient values of quantization residual values.

The rearrange unit 160 may change a two-dimensional block form coefficients to a one-directional vector form by using a coefficient scanning method. For example, in the rearrange unit 160, scanning is performed from a DC coefficient to a coefficient of a high frequency area by using a predetermined scanning type so as to change to a 1D vector form.

The entropy encoding unit 165 may perform entropy encoding on the basis of values calculated by the rearrange unit 160. The entropy encode may use various encoding methods, for example, exponential golomb, context-adaptive variable length coding (CAVLC), context-adaptive binary arithmetic coding (CABAC), etc.

The entropy encoding unit 165 may encode various types of information such as residual value coefficient information of a coding unit and block type information input from the rearrange unit 160 and the prediction units 120 and 125, prediction mode information, division unit information, prediction unit information, and transmission unit information, motion vector information, reference video information, block interpolation information, filtering information, etc. The entropy encoding unit 165 may encode flag representing whether or not coefficients of a transform block are 0 in a partial block unit within the transform block, a flag representing whether or not an absolute value of a coefficient is greater than 1, a flag representing whether or not an absolute value of a coefficient is greater than 2, etc. The entropy encoding unit 165 encodes a sign of the coefficient for a coefficient other than 0. In addition, for a coefficient having an absolute value greater than 2, a remaining value obtained by subtracting 2 from an absolute value may be encoded.

In the entropy encoding unit 165, a coefficient value of a coding unit input from the rearrange unit 160 may be entropy encoded.

In the dequantization unit 140 and the inverse-transform unit 145, values quantized in the quantization unit 135 are dequantized, and values transformed in the transform unit 130 are inverse-transformed. A residual value generate in the dequantization unit 140 and the inverse-transform unit 14t may be combined with a prediction block generated for each prediction unit by using the prediction units 120 and 125 such that a reconstructed block may be generated.

The filter unit 150 may include at least one of a deblocking filter, an offset correction unit, and an ALF (adaptive loop filter).

A deblocking filter may remove block distortion generated by boundaries between blocks in a reconstructed video. In order to determine whether or not to apply a deblocking filter, whether or not to apply a deblocking filter to a current block may be determined on the basis of pixels include in some rows or columns included in the block. When a deblocking filter is applied to the block, a strong filter or a weak filter may be applied according to strength of deblocking filtering. In addition, when applying a deblocking filter, horizontal directional filtering and vertical directional filtering may be performed in parallel when performing vertical filtering and horizontal filtering.

The offset correction unit may correct an offset in a pixel unit for a video for which deblocking is performed with an original video. In order to perform offset correction for a specific video, pixels included in the video may be divided by an arbitrary area, an area for which offset correction will be performed may be determined, and then a method of applying an offset to the corresponding area or a method of applying an offset in consideration of edge information of each pixel may be used.

ALF (adaptive loop filtering) may be performed on the basis of a value compared between a filtered reconstructed video and an original video. Different filtering may be performed for each group by dividing pixels included in the video by a predetermined group, and determining a single filter to be applied to each group. Information related whether or not to apply ALF may be transmitted for each coding unit (CU) in case of a luma signal, and a form and a filter coefficient of an ALF filter to be applied may vary according to each block. In addition, an identical form (fixed form) of an ALF filter may be applied regardless of a feature of a target block to be applied.

The memory 155 may store a reconstructed block or video calculated by using the filter unit 150, and provide the stored reconstructed block or video to the prediction units 120 and 125 when performing inter-prediction.

FIG. 2 is a block diagram showing video decoding apparatus according to an embodiment of the present invention.

Referring to FIG. 2, a video decoder 200 may include an entropy decoding unit 210, a rearrange unit 215, a dequantization unit 220, an inverse-transform unit 225, prediction units 230 and 2315, a filter unit 240, and a memory 245.

When a video bitstream is input from a video encoder, the input bitstream may be decoded by reversely performing processing of the video encoder.

The entropy decoding unit 210 may perform entropy decoding by reversely performing entropy encoding performed in the entropy encoding unit of the video encoder. For example, in association with a method performed in the video encoder, various methods may be applied such as exponential golomb, context-adaptive variable length coding (CAVLC), Context-adaptive binary arithmetic coding (CABAC), etc. The entropy decoding unit 210 may decode a flag representing whether or not coefficients of a transform block are 0 in a partial block unit within the transform block, a flag representing whether or not an absolute value of a coefficient is greater than 1, a flag representing whether or not an absolute value of a coefficient is greater than 2, etc. In addition, the entropy decoding unit 210 may decode a signal of a coefficient for a coefficient other than 0. For a coefficient having an absolute value greater than 2, a remaining value obtained by subtracting 2 from an absolute value may be decoded.

In the entropy decoding unit 210, information related to intra-prediction and inter-prediction performed in the encoded may be decoded.

The rearrange unit 215 may rearrange the bitstream entropy decoded in the entropy decoding unit 210 on the basis of a rearranging method used in the encoding unit. Rearranging may be performed by reconstructing coefficients represented in a 1D vector form to coefficients of a 2D block form. In the rearrange unit 215, information related to coefficient scanning performed in the encoding unit may be provided, and rearranging may be performed by using a scanning method that is reverse to a scanning order performed in the corresponding encoding unit.

The dequantization unit 220 may perform dequantization on the basis of a quantization parameter provided from the encoder, and a coefficient value of a rearranged block.

The inverse-transform unit 225 may perform inverse-transform for a dequantized transform coefficient by using a predetermined transform method. Herein, the transform method may be determined on the basis of information of a prediction method (inter/intra-prediction), a size/form of a block, an intra-prediction mode, etc.

The prediction units 230 and 235 may generate a prediction block on the basis of information related to generating a prediction block which is provided from the entropy decoding unit 210, and a previously decoded block provided or video information which is provided from the memory 245.

The prediction units 230 and 235 may include a PU NJ determining unit, an inter-prediction unit, and an intra-prediction unit. The PU determining unit may: receive various types of information such as prediction unit information input from the entropy decoding unit 210, prediction mode information of an intra-prediction method, motion prediction related information of an inter-prediction method; determine a prediction unit in a current coding unit; and determine whether or not to perform inter-prediction for a prediction unit or to perform intra-prediction. The inter-prediction unit 230 may perform inter-prediction for a current prediction unit on the basis of information included in one video among previous or following videos of a current video in which the current prediction unit is included by using information required for inter-prediction of the current prediction unit provided from the video encode. Alternatively, inter-prediction may be performed on the basis of information of a partial area that has been reconstructed within the current video in which the current prediction unit is included.

In order to perform inter-prediction, which one of a merge method and a notion estimation method is used as a method of generating notion information of a prediction unit included in a corresponding coding unit may be determined based on the coding unit.

The intra-prediction unit 235 may generate a prediction block on the basis of pixel information within a current video. When a prediction unit is a prediction unit for which intra-prediction is performed, intra-prediction may be performed on the basis of intra-prediction mode information of the prediction unit provided from the video encoder. The intra-prediction unit 235 may include an AIS (adaptive intra smoothing) filter, a reference pixel interpolation unit, and a DC filter. The AIS filter performs filtering for a reference pixel of a current block, and may be applied by determining whether or not to apply a filter according to a prediction mode of a current prediction unit. AIS filtering may be performed for a reference pixel of a current block by using a prediction mode of a prediction unit provided from the video encoder, and AIS filter information. When a prediction mode of a current block is a mode for which AIS filtering is not performed, the AIS filter may not be applied.

The reference pixel interpolation unit may generate a reference pixel having a pixel unit equal to or smaller than an integer value by performing interpolation for the reference pixel when a prediction mode of a prediction unit is a prediction unit performing intra-prediction on the basis of a pixel value obtained by performing interpolation for the reference pixel. When a prediction mode of a current prediction unit is a current prediction unit that generates a prediction block rather than performing interpolation for a reference pixel, the reference pixel may not be interpolated. The DC filter may generate a prediction block by filtering when a prediction mode of the current block is a DC mode.

The reconstructed block or video may be provided to the filter unit 240. The filtering unit 240 may include a deblocking filter, offset correction unit, and ALF.

From the video encoder, information may be provided whether or not a deblocking filter is applied to a corresponding block or video, and if so, information of whether a strong filter or a weak filter is applied may be provided. In the deblocking filter of the video decoder, information related to a deblocking filter may be provided from the video encoder, and deblocking filtering for a corresponding block may be performed in the video decoder.

The offset correction unit may perform offset correction for a reconstructed video on the basis of an offset correction type applied to the video when performing encoding, and offset value information.

ALF may be applied to a coding unit on the basis of information of whether or not ALF is applied, ALF coefficient information, etc. which are provided from the encoder. Such ALF information may be provided by being included in a specific parameter set.

The memory 245 may store a reconstructed video or block so as to be used as a reference video or reference block. In addition, the memory 245 may provide the reconstructed video to an output unit.

In an embodiment described below, "current block" may mean a target block to be encoded/decoded. Further, the current block may mean a coding tree block, a coding block, a prediction block, or a transform block according to a process of encoding/decoding.

FIG. 9 is a view showing an aspect of change in brightness between a current video including a current block and a reference video.

When inter-prediction is performed for a current block, and change in brightness between the current video and a reference video becomes large, change in brightness between prediction blocks to be selected in the current block and the reference video may also become large. Accordingly, an error due to inter-prediction of the current block increases, and thus energy of a residual signal of the current block may be expected to increase. In addition, as energy of the residual signal increases, an error due to quantization may be expected to increase. As a result, when change in brightness between the current video and the reference video occurs, an error in a residual block will increase compared with a case where change in brightness does not occur.

Accordingly, in the present invention, change in brightness between videos may be estimated to generate a weight prediction parameter, and a method of performing inter-prediction by using the weight prediction parameter is provided. By using a weight prediction parameter during inter-prediction, remarkable energy increase of a residual block may be prevented, and thus prediction efficiency may be improved.

Hereinafter, referring to the figure, performing inter-prediction by using a weight prediction parameter will be described in detail.

FIG. 10 is a view of a flowchart showing a method of applying a weight prediction parameter to a current block in the video encoding apparatus.

In S1001, the encoding apparatus may set motion information and weight prediction information (weight prediction parameter, weight prediction control information) of a neighbor block as motion information and weight prediction information of a current block, and encode the same when performing inter-prediction for the current block. Herein, weight prediction control information represents whether or not to use a weight prediction parameter when performing inter-prediction, and a weight prediction parameter may be a weight value used when performing inter-prediction. Herein, the encoding apparatus may calculate a cost (cost A) when using an inter-prediction block of a current block by using notion information and weight prediction information derived from a neighbor block.

Herein, a neighbor block may include a spatial neighbor block adjacent to the current block, and a temporal neighbor block having a position identical or similar to the current block within a reference video. In an embodiment, spatial neighbor blocks A to E and a temporal neighbor block Col shown in FIG. 4 may be defined as neighbor blocks of the current block.

Subsequently, in S1002, the encoding apparatus may determine best notion information of the current block by performing notion estimation, temporarily generate a prediction block of the current block by using the estimated notion information, and estimate a weight prediction parameter of the current block on the basis of the generated prediction block.

The weight prediction parameter may include at least one of a multiplication parameter multiplied by a prediction pixel, and an addition parameter added to the prediction pixel. Herein, the multiplication parameter and the addition parameter may be derived on the basis of regression analysis. In an embodiment, the Formula 1 below shows an example of a regression analysis model.

$$e^2 = \Sigma[Y-(wX+o)]^2 \quad \text{[Formula 1]}$$

In Formula 1, Y represents original data of a current block, X represents data of a prediction block temporarily generated for the current block, w represents a slope of a regression line, o represents an intercept value of the regression line, and e represents a prediction error of the regression line. In an embodiment, Y is an original pixel value of the current block, and may have a range of the entire or partial area of the current block, and X is a pixel value of a prediction block temporarily generated for the current block, and may have a range to be the entire or partial of the prediction block.

The weight prediction parameter may be obtained by performing partial differentiation for Formula 1 with respect to each of w and o. In an embodiment, when partial differentiation is performed for Formula 1 with respect to each of w and o, w and o for which the square of an error e becomes the minimum may be set as a multiplication parameter and an addition parameter.

The weight prediction parameter value calculated on the basis of Formula 1 may have a real number value. The weight prediction parameter may be set to a real number value calculated on the basis of Formula 1, or may be set to an integer value that is obtained by converting the real number value calculated on the basis of Formula 1 to an integer value. In an embodiment, the weight prediction parameter may be derived as an integer value that is derived by multiplying the real number value calculated on the basis of the Formula 1 by 2N. A parameter N used for converting the weight prediction parameter to an integer value may be encoded in a block unit, an area unit, or an upper layer header. Alternatively, the encoding apparatus and the decoding apparatus may use a preset N. In embodiments described below, it is assumed a weight prediction parameter in an integer value by multiplying 2N is used.

In order to estimate a weight prediction parameter of the current block, a regression analysis modes described with Formula 1 may be used for estimating the weight prediction parameter of the current block, but the method of estimating the weight prediction parameter of the current block is not limited to the above described example. The weight prediction parameter of the current block may be estimated by using methods other than a regression analysis model.

In S1003, when the weight prediction parameter of the current block has been estimated, the encoding apparatus may calculate a cost (cost B) when the estimated weight prediction parameter is applied to the prediction block temporarily generated for the current block, and a cost (cost C) when the estimated weight prediction parameter is not applied.

The encoding apparatus may determine whether or not to use weight prediction information for the current block, and whether or not to use the weight prediction information of the current block in combination of a neighbor block by comparing the two costs.

In an embodiment, in S1004, first, the encoding apparatus may determine whether or not applying the estimated weight prediction parameter to the current block is the best case by comparing the cost (cost B) when the estimated weight prediction parameter is applied to the current block and the cost (cost B) when the estimated weight prediction parameter is not applied.

In addition, in S100*b*, the encoding apparatus may: compare the best case of the cost B and the cost C with the cost (cost A) when applying a weight prediction parameter and notion information of a neighbor block; and determine whether to use notion information estimated in the current block and the estimated weight prediction information, or to use the motion information present in the neighbor block in combination of the weight prediction information, or to use the weight prediction information.

Subsequently, encoding weight prediction information in the encoding apparatus will be described.

FIG. 11 is a view of a flowchart showing encoding of weight prediction information.

In S1101, the encoding apparatus may encode information representing whether or not notion information and weight prediction information of a current block is merged with a neighbor block. The information may be a flag of 1 bit, but it is not limited thereto.

In S1102, when the notion information and the weight prediction information of the current block is determined to be merged with the neighbor block, in S1103, the encoding apparatus may encode information for identifying the neighbor block that is merged with the current block. Herein, information for identifying the neighbor block may be index information representing an index of the neighbor block that is merged with the current block among neighbor blocks.

Meanwhile, in S1102, when the notion information and the weight prediction information of the current block is determined not to be merged with the neighbor block, in S1104, the encoding apparatus may encode notion information used for encoding the current block, and in S1105, the encoding apparatus may encode information representing whether or not to use a weight prediction parameter of the current block (that is, weight prediction control information). The information may be a flag of 1 bit, but it is not limited thereto.

In S1106, when it is determined not to use the weight prediction parameter of the current block, the encoding apparatus may not encode information related to the weight prediction parameter.

Meanwhile, in S1106, when it is determined to use a weight prediction parameter of the current block, in S1107, the encoding apparatus may encode information of the weight prediction parameter of the current block.

Herein, information of a weight prediction parameter may be a weight prediction parameter, or a difference value of weight prediction parameters. In an embodiment, the encoding apparatus may set 1<<N as a prediction value of the weight prediction parameter according to N that is used for converting the weight prediction parameter to an integer value, and encode a difference value between the weight prediction parameter and the prediction value. Encoding using the prediction value and the difference value may be applied when performing encoding for at least one of a multiplication parameter and an additional parameter of the weight prediction parameter. In an embodiment, the multiplication parameter may be encoded by using a difference value between the multiplication parameter and the prediction value. Meanwhile, the addition parameter may be encoded as it is.

The encoding apparatus may encode a difference value between a weight prediction parameter of the current block and a weight prediction parameter of a neighbor block adjacent to the current block. For example, it is assumed that inter-prediction using a previously used direction is performed for the current block, and a weight prediction parameter according to the same is (59, 4). Herein, w of the weight prediction parameter represented as (w, o) may represent a multiplication parameter, and o may represent an addition parameter. It is assumed that inter-prediction for neighbor blocks A to E, and Col is performed in a previously used direction, and prediction parameters according to the same are (51, 0), (62, 4), (59, 4), (64, −1), (59, 2), and (70, 4).

The encoding apparatus may encode information related to the weight prediction parameter of the current block by using a weight prediction parameter of a neighbor block having the lowest cost among neighbor blocks, using a weight prediction parameter of a neighbor block for which a difference value with the weight prediction parameter of the current block becomes minimum, or using a weight prediction parameter of a neighbor block which is determined to be the best one in consideration of the difference value with the weight prediction parameter of the current block and of overhead of an assigned index. In an embodiment, when the encoding apparatus selects a weight prediction parameter of the C block among weight prediction parameters of the blocks A to E, and Col as the best case, the weight prediction parameter of the C block (that is, (59,4)) may be set as a prediction value, and the difference value of (0,0) with the weight prediction parameter of the current block may be encoded. In addition, the encoding apparatus may encode index information for identifying the selected neighbor block (for example, C). Herein, when calculating a cost for selecting the best candidate, the cost may be determined after calculating by using index information and a difference value with the weight parameter.

In FIGS. 10 and 11, when a current block is merged with a neighbor block, motion information and weight prediction information of the current block may be set for the neighbor block. In another embodiment, the encoding apparatus may determine whether or not each of the notion information and the weight prediction parameter of the current block is merged with the neighbor block. In an embodiment, the motion information of the current block may be identically set to motion information of the neighbor block. Meanwhile, the weight prediction parameter of the current block may be set to an estimated value. Herein, whether or not the motion information of the current block is merged with the neighbor block, whether or not the weight prediction parameter of the current block is merged with the neighbor block, and the weight prediction parameter derived by estimation may be encoded in separate information.

Subsequently, an example of decoding a weight prediction parameter in the decoding apparatus will be described.

FIG. 12 is a view of a flowchart showing decoding a weight prediction parameter in the decoding apparatus.

In S1201, the decoding apparatus may decode information representing whether or not notion information and weight prediction information of a current block is merged with a neighbor block. The information may be a flag of 1 bit, but it is not limited thereto.

In S1202, when the notion information and the weight prediction information of the current block is determined to have been merged with the neighbor block, in S1203, the decoding apparatus may decode information for identifying the neighbor block that is merged with the current block. Herein, information for identifying the neighbor block may be index information representing an index of the neighbor block that is merged with the current block among neighbor blocks. The decoding apparatus may set notion information and weight prediction information of the neighbor block specified by the index information as notion information and weight prediction information of the current block.

Meanwhile, in S1202, when the notion information and the weight prediction information of the current block is determined to not have been merged with the neighbor block, in S1204, the decoding apparatus may decode notion information used when decoding the current block, and in S1205, the decoding apparatus may decode information representing whether or not to use a weight prediction parameter of the current block (that is, weight prediction control information). The information may be a flag of 1 bit, but it is not limited thereto.

In S1206, when it is determined not to use the weight prediction parameter of the current block, the decoding apparatus may not decode information related to the weight prediction parameter.

Meanwhile, in S1206, when it is determined to use the weight prediction parameter of the current block, in S1207, the decoding apparatus may decode information of the 3N weight prediction parameter of the current block.

Herein, information of a weight prediction parameter may represent a weight prediction parameter, or a difference value between the weight prediction parameter and a prediction value of the weight prediction parameter. In an embodiment, the decoding apparatus may use 1<<N as a prediction value of the weight prediction parameter on the basis of a parameter N used for converting the weight prediction parameter to an integer value. The decoding apparatus may obtain the weight prediction parameter of the current block by adding the prediction value of the weight prediction parameter and a weight prediction parameter difference value decoded from a bitstream.

Decoding using a prediction value and a difference value may be applied when performing decoding for at least one of a multiplication parameter and an addition parameter of a weight prediction parameter. In an embodiment, the multiplication parameter may be decoded by using a prediction value and a difference value. Meanwhile, the addition parameter may be used a value decoded from the bitstream as it is.

Information related to a weight prediction parameter and which is transmitted through a bitstream may represent a difference value between a weight prediction parameter of a current block and a weight prediction parameter of a neighbor block. Herein, the decoding apparatus may decode identification information identifying a neighbor block, and obtain a weight prediction parameter of the current block by adding a weight prediction parameter of a neighbor block specified by the decoded identification information and the decoded weight prediction parameter difference value.

When a weight prediction parameter of the current block is obtained, inter-prediction for the current block may be performed by using the weight prediction parameter. In an embodiment, the decoding apparatus may perform inter-prediction by applying the weight prediction parameter to a prediction block of the current block. In detail, the decoding apparatus may perform inter-prediction for the current block by multiplying a pixel included in the prediction block by a multiplication parameter, and adding an addition parameter to the multiplication result.

In FIG. 12, when a current block is merged with a neighbor block, notion information and weight prediction information of the current block may be set for the neighbor block. In another embodiment, the decoding apparatus may separately decode information whether or not notion information of a current block is merged with a neighbor block and information whether or not a weight prediction parameter of the current block is merged with the neighbor block. According to each of the information, whether or not to merge notion information of the current block with the neighbor block and whether or not to merge a weight prediction parameter of the current block with the neighbor block may be determined.

In the embodiments described above, obtaining a weight prediction parameter of a current block has been described whereby the encoding apparatus encodes information related to a weight prediction parameter to a bitstream, and the decoding apparatus decodes information related to a weight prediction parameter from a bitstream.

Different to an example described above, the encoding apparatus and the decoding apparatus may derive a weight prediction parameter by using an identical method but without encoding/decoding a weight prediction parameter of a current block. Herein, encoding/decoding of a weight prediction parameter which is previously described with reference to FIGS. 11 and 12 may be omitted.

In an embodiment, FIG. 13 is a view showing an example of deriving a weight prediction parameter of a current block.

A prediction block of a current block may be generated on the basis of a reference block indicated by a motion vector of the current block within a reference video. The encoding apparatus and the decoding apparatus may derive a weight prediction parameter of the current block by using reconstructed pixels adjacent to the current block within a current video (in FIG. 13, pixels marked as "B") and reconstructed pixels adjacent to the reference block within the reference video (that is, a prediction block of the current block) (in FIG. 13, pixels marked as "A").

In an embodiment, a weight prediction parameter of the current block may be derived by, in Formula 1, applying reconstructed pixels B adjacent to the current block to Y, and by applying reconstructed pixels A adjacent to the reference block (that is, a prediction block of the current block) to X. In an embodiment, w and o calculated by applying reconstruct pixels adjacent to a current block and reconstruct pixels adjacent to a reference block may be respectively set as a multiplication parameter and an addition parameter.

In embodiments described above, a weight prediction parameter is derived by using reconstructed pixels included in a line adjacent to a current block and a reference block. Different to an example shown above, a weight prediction parameter may be derived by using reconstructed pixels included in a plurality of lines adjacent to a current block and a reference block. Whether or not to use a plurality of lines or a number of lines used for estimating a weight prediction parameter may be transmitted to the decoding apparatus by being encoded in a block unit or through an upper layer header.

FIG. 14 is a view showing another example of deriving a weight prediction parameter of a current block.

The encoding apparatus and the decoding apparatus may derive a weight prediction parameter of a current block on the basis of trend of neighbor pixels present in each of a current block and a reference block.

In an embodiment, the encoding apparatus and the decoding apparatus may derive a first weight prediction parameter on the basis of neighbor pixels adjacent to a current block or reference block, and derive a second weight prediction parameter on the basis of second neighbor pixels that are not adjacent to the current block or reference block but adjacent to neighbor pixels adjacent to the current block or reference block.

In an embodiment, in an example shown in FIG. 14, the encoding apparatus and the decoding apparatus may generate a first weight prediction parameter on the basis of neighbor pixels A adjacent to a current block and neighbor pixels C adjacent to a reference block (prediction block), and generate a second weight prediction parameter on the basis of neighbor pixels B that are not adjacent to the current block but adjacent to the neighbor pixels A adjacent to the current block, and neighbor pixels D that are not adjacent to the reference block but adjacent to the neighbor pixels C adjacent to the reference block.

A weight prediction parameter of the current block may be derived by applying a difference value between the first weight prediction parameter and the second weight prediction parameter to the first weight prediction parameter. In an embodiment, when a first weight prediction parameter is (59, 4), and a second weight prediction parameter is (59, 5), a difference value between the first weight prediction parameter and the second weight prediction parameter is (0, −1). Accordingly, a weight prediction parameter of a current block may be determined as (59, 3) by applying the difference value to the first weight prediction parameter.

In another embodiment, a weight prediction parameter may be set for each position of a pixel within a prediction block. Assuming that a difference value between a first weight prediction parameter and a second weight prediction parameter is (0, −1), a weight prediction parameter applied to a prediction block may be variable set according to a pixel position within the prediction block. In an embodiment, a weight prediction parameter applied to pixels present in an edge of the prediction block may be determined as (59, 3) obtained by applying the difference value to the first weight prediction parameter. Herein, pixels present at an edge of the prediction block may include pixels adjacent to left boundary and adjacent to upper boundary of the prediction block (for example, pixels at positions marked as "a" in FIG. 14).

For a pixel present at an edge of the prediction block and a pixel adjacent thereto, a weight prediction parameter obtained by applying the difference value to a weight prediction parameter applied to a pixel present in an edge of the prediction block may be applied. In an embodiment, a weight prediction parameter applied to a pixel present in an edge of the prediction block and a pixel adjacent thereto (for example, pixels at position marked as "b" in FIG. 14) may be determined as (59, 2) obtained by applying a difference value to a weight prediction parameter of (59, 3) applied to a pixel positioned in an edge of the prediction block.

As described above, a different weight prediction parameter may be applied for each pixel position by repeatedly applying a difference value between a first weight prediction parameter and a second weight prediction parameter as the pixel position becomes far from the edge of the prediction block. Accordingly, in an example shown in FIG. 14, a weight prediction parameter of (59, 3) may be applied to pixels at "a" position, a weight prediction parameter of (59, 2) may be applied to pixels at "b" position, a weight prediction parameter of (59, 1) may be applied to pixels at "c" position, and a weight prediction parameter of (59, 0) may be applied to pixels at "d" position.

In embodiments described above, a weight prediction parameter is estimated by using two lines adjacent to a current block and a reference block. Different to an example shown above, a weight prediction parameter may be estimated by using at least two lines adjacent to a current block and a reference block. Whether or not to use at least two lines or a number of lines used for estimating a weight prediction parameter may be transmitted to the decoding apparatus by being encoded in a block unit or through an upper layer header.

In an example shown in FIGS. 13 and 14, whether or not a weight prediction parameter of a current block is determined by using a weight prediction parameter of neighbor pixels respectively present in the current block and a reference block or whether or not a weight prediction parameter of a current block is determined by reflecting trend of a weight prediction parameter of pixels adjacent to a current block and a reference block may be encoded in a block unit or through an upper layer header. Alternatively, the encoding apparatus and the decoding apparatus may fixedly use one of the two methods.

In another embodiment, a weight prediction parameter may be derived by using any one of a reconstructed pixel area adjacent to the left of a current block and a reference block, and a reconstructed pixel area adjacent to the upper of the current block and the reference block.

In an embodiment, FIG. 15 is a view showing an example of deriving a weight prediction parameter by using one of a left side reconstructed pixel area and an upper side reconstructed pixel area.

First, the encoding apparatus may derive a first weight prediction parameter by using pixels A and C included in a reconstructed pixel area adjacent to the upper of a current block and a reference block.

Subsequently, the encoding apparatus may derive a second weight prediction parameter by using pixels B and D include in a reconstructed pixel area adjacent to the left of the current block and the reference block.

Subsequently, the encoding apparatus may determine a best weight prediction parameter of the current block by comparing the first weight prediction parameter and the second weight prediction parameter.

Herein, the encoding apparatus may encode information representing which area of the left side reconstructed pixel area and the upper side reconstructed pixel area of the current block and the reference block is used or information representing a best weight prediction parameter of the current block between the first weight prediction parameter and the second weight prediction parameter, and transmit the same to the decoding apparatus.

In another embodiment, the encoding apparatus and the decoding apparatus may estimate a weight prediction parameter by using one of a fixed area between an upper side reconstructed pixel area aid a left side reconstructed pixel area according to a block form. For example, when a block that is currently encoded has a form of a horizontally long rectangle, a weight prediction parameter is estimated by using the upper side reconstructed pixel area, and when a block that is currently encoded has a form of a vertically long rectangle, a weight prediction parameter is estimated by using the left side reconstructed pixel area. Alternatively, when a block that is currently encoded has a square form, a weight prediction parameter is estimated by using both of the left side and upper side reconstructed pixel areas.

The encoding apparatus may configure a weight prediction parameter set including a plurality of weight prediction parameters by using a weight prediction parameter estimated by using a reconstructed pixel area, and determine a best weight prediction parameter of a current block from the weight prediction parameter set.

In an embodiment, FIG. 16 is a view showing a weight prediction parameter set.

The encoding apparatus may derive a weight prediction parameter (w, o) by using a reconstructed pixel area adjacent to a current block and a reference block, and generate an additional weight prediction parameter by applying an offset to the derived weight value.

In an embodiment, in FIG. 16, at least one of offsets α and β is applied to the estimated weight prediction parameter (w, o) to generate five additional weight prediction parameters. Herein, it is assumed that initial values of α and β are respectively set to 1. Different to an example shown above, α and β may tend to gradually increase or decrease. When a candidate order included in a weight prediction parameter set is not limited to an example shown above, an order may be changed by using an arbitrary method.

The encoding apparatus may determine a best weight prediction parameter of a current block from a weight prediction parameter set, and encode information identifying the determined weight prediction parameter (for example, index information). In addition, the encoding apparatus may encode information of an offset for generating a weight prediction parameter set or a number of weight prediction parameters in a block unit or through an upper layer header The decoding apparatus may configure a weight prediction parameter by using the same method used in the encoding apparatus, and obtain a weight prediction parameter of a current block on the basis of received index information.

A range of neighbor pixels adjacent to a current block or reference block and which is used for deriving a weight prediction parameter of the current block may be limited to a part of pixels adjacent to the current block or reference block.

In an embodiment, FIG. 11 is a view showing a position of pixels used for regression analysis. As an example shown in FIG. 17(a), in order to derive a weight prediction parameter of a current block, all neighbor pixels adjacent to a current block or reference block may be used. Alternatively, as an example shown in FIGS. 17(b) and (c), in order to derive a weight prediction parameter of a current block or reference block, a part of neighbor pixels adjacent to a current block or reference block may be used.

Alternatively, the encoding apparatus may encode information indicating a method of sampling neighbor pixels used for estimating a weight prediction parameter. In an embodiment, the encoding apparatus may encode information indicating which method for sampling neighbor samples is used among the examples of FIGS. 17(a) to 17(c).

In examples shown in FIGS. 17(a) to 17(c), neighbor pixels adjacent to a current block or reference block are only used. However, pixels that are not adjacent to the current block or reference block, but adjacent to neighbor pixels adjacent to the current block or reference block may be also used for determining a weight prediction parameter. In an embodiment, for a weight prediction parameter of a current block, pixels included in upper M columns or left N rows of the current block or reference block (herein, M and N are an integer equal to or greater than 2) may be used.

In addition, a range of neighbor pixels used for deriving a weight prediction parameter of a current block may expand to a range in which a width of the current block is expanded into K times or a height of the current block is expanded into L times (K and L are an integer equal to or greater than 1). In an embodiment, when a position of a left upper pixel of the current block or reference block is (0, 0), upper neighbor pixels at position from (−1, −1) to (2K−1, −1) and left neighbor pixels at position from (−1, −1) to (−1, 2L−1) may be used for deriving a weight prediction parameter of the current block.

When a prediction block of a current block is generated for intra-prediction, correction may be performed for the prediction block in consideration of a reconstructed pixel value of the current block. Hereinafter, a method of performing correction for a prediction block generated by intra-prediction will be described in detail.

FIG. 18 is a view of a flowchart showing a method of determining whether or not to use a correction coefficient for a current block.

First, in S1801, the encoding apparatus may determine whether or not a current block is encoded through intra-prediction. When the current block is encoded through intra-prediction, in S1802, a cost (cost A) when using intra-prediction may be calculated.

Meanwhile, when the current block is not encoded through intra-prediction in S1801, the flowchart of FIG. 18 may be ended.

When the current block is encoded through intra-prediction, in S1803, by using a reconstructed pixel area of adjacent to the current block, correction may be performed for a prediction block of a current block which is generated as a result of intra-prediction. Herein, a reconstructed pixel area may include neighbor pixels adjacent to the current block.

Then, in S1804, the encoding apparatus may calculate a cost (cost B) when the correction is performed form the current block.

Subsequently, in S1805, the encoding apparatus may determine whether or not to apply correction to the current block by comparing the cost (cost A) calculated by performing intra-prediction for the current block, and the cost (cost B) calculated by additionally performing correction for the prediction block generated as a result of performing intra-prediction. For example, when the cost A is greater than the cost B, it may be determined not to apply correction using a reconstructed pixel area to the current block. Meanwhile, when the cost B is greater than the cost A, it may be determined to apply correction using a reconstructed pixel area to the current block.

FIG. 19 is a view showing an example of determining a correction coefficient of a current block.

When intra-prediction is used for a current block, the encoding apparatus may calculate a standard deviation $\sqrt{\sigma}_A$ of a reconstructed pixel area adjacent to the current block. In FIG. 19, the reconstructed pixel area includes a neighbor pixel adjacent to the left boundary of the current block, a neighbor pixel adjacent to the upper boundary of the current block, a neighbor pixel adjacent to the upper corner of the current block, etc. A size or form of the reconstructed pixel area is not limited to an example shown above.

In an embodiment, FIG. 20 is a view showing various forms of a reconstructed pixel area.

In an example shown in FIG. 20, M, N, O, P, etc. mean a pixel interval. Assuming that O and P are respectively smaller than a horizontal length and a vertical length of a current block, O and P may have a negative numeral value. An example shown in FIG. 20 shows various examples that may be set as a reconstructed pixel area, but a reconstructed pixel area may be set in a size or form different from the example shown in FIG. 20.

In addition, by performing sub-sampling, a standard deviation of a reconstructed pixel area may be calculated by using partial pixels included in the reconstructed pixel area. In an embodiment, as described with reference to FIG. 11, the encoding apparatus may calculate a standard deviation by using a part of reconstructed pixels adjacent to a current block, or may calculate a standard deviation by using M or more rows or N or more columns adjacent to the boundary of the current block. Alternatively, neighbor pixels within a range in which a width of the current block is expanded into K times or a height of the current block is expanded into L times may be used for calculating a standard deviation.

Subsequently, the encoding apparatus may determine a block having a reconstructed pixel area that is the most similar to a reconstructed pixel area of the current block from blocks that are encoded through intra-prediction and which have an intra-prediction mode identical to the current block among blocks encoded/decoded before the current block. In an embodiment, the encoding apparatus may determine a block adjacent to a reconstructed pixel area having a standard deviation $\sqrt{\sigma}$ identical or similar to a standard deviation of the reconstructed pixel area of the current block. In an embodiment, in an example shown in FIG. 19, when a block 1 uses an intra-prediction mode identical to a current block, and a standard deviation of a reconstructed pixel area B of the block 1 is the most similar to a standard deviation of a reconstructed pixel area A of the current block among blocks encoded by using an intra-prediction mode identical to the current block, the block 1 may be determined to have a feature that is the most similar to the current block. Herein, the encoding apparatus may determine a correction coefficient of the current block by using the reconstructed pixel area A of the current block and the reconstructed pixel area B of the block 1.

Herein, the encoding apparatus may determine a reconstructed pixel area similar to a reconstructed pixel area of a current block from reconstructed pixel areas having a size or form identical to the reconstructed pixel area.

A correction coefficient may include at least one of a multiplication coefficient and an addition coefficient. Herein, the multiplication coefficient and the addition coefficient may be derived on the basis of regression analysis. In an embodiment, the multiplication coefficient and the addition coefficient may be calculated on the basis of Formula 1 described above. When the correction coefficient is calculated by using Formula 1, Y may represent pixels included in the reconstructed pixel area A of the current block, and X may represent pixels included in the reconstructed pixel area B of a block having a feature similar to the current block (that is, block 1). The correction coefficient may be obtained by performing partial differentiation for Formula 1 with respect to w and o. In an embodiment, after performing partial differentiation for Formula 1 with respect to w and o, w and o from which the square value of an error becomes the minimum may be derived, and the derived w may be set as the multiplication coefficient and the derived o may be set as the addition coefficient.

When the correction coefficient is derived, correction may be performed for the current block by applying the correction coefficient to a residual block of the block having a feature similar to the current block (that is, block 1) and to the prediction block of the current block which is generated as a result of performing intra-prediction. In an embodiment, an intra-prediction block of the current block may be corrected by Formula 2 below.

$$P' = P + (w D_{Block1} + o) \quad \text{[Formula 2]}$$

In Formula 2, P' represent a new prediction block of the current block to which correction is applied, and $D_{Block1}$ represents a residual block of a block having a feature similar to the current block (that is, block 1 of FIG. 19). In addition, P represents a prediction block of the current block which is generated as a result of performing intra-prediction, and w and o represent correction coefficients.

In Formula 2, correction is performed for a current block by using a residual block of a block having a feature similar to the current block, a prediction block of the current block, and a correction coefficient of the current block, out another method differing from the above method may be used for performing correction for the current block. In an embodiment, correction for a current block may be performed by using a prediction block of a block having a feature similar to the current block, or may be performed by without using a block having a feature similar to the current block.

In an example described above, correction of a current block is performed by using a multiplication coefficient and an addition coefficient, but correction of a current block may be performed by using any one of a multiplication coefficient and an addition coefficient. In an embodiment, correction of a current block may be performed by using a multiplication coefficient and without using an addition coefficient. Herein, deriving "o" may be omitted in Formula 1, and adding an addition coefficient to a prediction block to which a multiplication coefficient is applied may be omitted in Formula 2.

In an example described above, a block having a feature the most similar to the current block is determined from blocks decoded prior to the current block. Herein, the encoding apparatus may set a plurality of areas for a slice or picture including a current block, and encode information of the area including a block having a feature that is the most similar to the current block and transmit the same to the decoding apparatus. Herein, the decoding apparatus may determine a block having a feature that is the most similar to the current block within the set area.

In addition, the encoding apparatus may determine a single reconstructed pixel area having a standard deviation identical or similar to a standard deviation of a reconstructed pixel area of a current block, or determine a plurality of reconstructed pixel areas having a standard deviation identical or similar to a standard deviation of a reconstructed pixel area of a current block. In an embodiment, the encoding apparatus may determine a plurality (N) of reconstructed pixel areas having a standard deviation identical or similar to a standard deviation of a reconstructed pixel area of a current block. When a plurality (N) of reconstructed pixel areas is determined, a plurality of blocks adjacent to the determined reconstructed pixel areas may be set as a candidate block, and information specifying a block used for determining a correction coefficient of a current block among a plurality of candidate blocks may be encoded. Herein, the information may be index information for specifying any one of the plurality of candidate blocks (or plurality of standard deviations). A number N of candidate blocks may be encoded in a block unit or through an upper layer header.

In an example described above, a standard deviation of a reconstructed pixel area of a current block is calculated, and then a block that is the most similar to the current block is determined by using the calculated standard deviation. Different to an example above, a reconstructed pixel area that is the most similar to a reconstructed pixel area of a current block may be determined by using an average value of pixel values in the reconstructed pixel area, or a reconstructed pixel area that is the most similar to a reconstructed pixel area of a current block may be determined by measuring a similarity using SAD (sun of absolute difference) or SSD (sun of squared difference) between reconstructed pixel areas.

In an example described above, among blocks encoded by using intra-prediction mode identical to an intra-prediction mode of a current block, a candidate block of the current block is determined (that is, a candidate block for determining a correction coefficient of the current block). In another embodiment, the encoding apparatus may use, as a candidate block of a current block, a block having an intra-prediction mode similar to the current block. Herein, a block having an intra-prediction mode similar to a current block may be encoded by using an intra-prediction mode within an intra-prediction mode of a current block and a threshold value (for example, ±N). Alternatively, regardless of whether or not an intra-prediction mode is identical or similar to a current block, a block encoded through intra-prediction may be used as a candidate block of the current block.

FIG. 21 is a view of a flowchart showing a method of encoding information related to a correction coefficient.

In S2101, the encoding apparatus may encode information of whether or not a current block is encoded through intra-prediction. In S2102, when the current block is encoded through intra-prediction, in S2103, the encoding apparatus may encode information of whether or not correction of the current block is performed by using a reconstructed pixel area.

In S2104, when correction of the current block is performed by using the reconstructed pixel area, in S2105, the encoding apparatus may encode information for deriving a correction coefficient of the current block. In an embodiment, when a plurality of candidates are present for deriving the correction coefficient of the current block (for example, when a plurality of candidate blocks for deriving the correction coefficient of the current block is present), the encoding apparatus may encode identification information identifying a block used for deriving the correction coefficient of the current block among the plurality of candidates. Herein, identification information may be index information representing any one of the plurality of candidates. In an embodiment, when N candidates are present, index information may represent any one from 0 to N−1.

FIG. 22 is a view of a flowchart showing determining whether or not to perform correction for a current block in the decoding apparatus.

Referring to FIG. 22, first, in S2201, the decoding apparatus may decode information representing whether or not a current block is encoded through intra-prediction.

In S2202, when the current block is encoded through intra-prediction, in S2203, the decoding apparatus may decode information representing whether or not correction using a reconstructed pixel area is used for the current block. Herein, the information may be a flag of 1 bit, but it is not limited thereto.

In S2204, when it is determined to perform correction for the current block, in S2205, the decoding apparatus may derive a correction coefficient of the current block by using the same method used in the encoding apparatus. In an embodiment, the decoding apparatus may determine a block having a feature that is the most similar to the current block among blocks decoded prior to the current block, and derive the correction coefficient of the current block by using the determined block.

In another embodiment, the decoding apparatus may obtain the correction coefficient of the current block on the basis of information transmitted from the encoding apparatus. Herein, information transmitted from the encoding apparatus may include information identifying an area including a block having a feature that is the most similar to the current block, or identification information identifying a block having a feature that is the most similar to the current block among a plurality of candidate blocks.

The encoding apparatus may directly encode the correction coefficient of the current block, and transmit the same to the decoding apparatus. Herein, the decoding apparatus may decode the correction coefficient from a bitstream, and perform correction for the current block by using the decoded correction coefficient.

When the correction coefficient of the current block is obtained, the decoding apparatus may perform correction for the current block by using the obtained correction coefficient. In an embodiment, correction may be performed oy using Formula 2 described above.

Correction of the current block may be applied among color components. In an embodiment, when a video has a format of Y, Cb, and Cr, Cb and Cr which are chroma signals tend to be similar. Accordingly, when an order of encoding is Y, Cb, and Cr, for a Cr component, a correction coefficient applied to a Cb video may be used as it is, or a reconstructed pixel area similar to a reconstructed pixel area of the current block may be determined in the Cb video.

In an embodiment, the encoding apparatus may set a reconstructed pixel area adjacent to the current block of the Cr component, and determine a reconstructed pixel area that is the most similar to a neighbor pixel area of the current block in the Cb video that has been already decoded by using a method similar to motion estimation shown in FIG. 2. Herein, as a referent of determining a similarity, a standard deviation comparison, an SAD or SSD, etc. may be used. When a reconstructed pixel area that is the most similar to the reconstructed pixel area of the current block of a Cr component is determined from the Cb video, a correction coefficient may be derived by using Formula 1 on the basis of the determined reconstructed pixel area, and correction for the current block may be performed by using Formula 2 on the basis of the derived correction coefficient.

In another embodiment, a correction coefficient of a current block which is a Cr component may be derived by using a reconstructed pixel area of a Cb component block at a preset position rather than using a reconstructed pixel area of a Cr component. In an embodiment, the encoding apparatus may perform correction by using a prediction block that is a Cr component within a Cb video and a residual block of a Cb component present at an identical position.

Subsequently, a method of predicting an intra-prediction mode of a current block will be described in detail.

FIG. 23 is a view of a flowchart showing determining whether or not to perform prediction for an intra-prediction mode of a current block by using a reconstructed pixel area of the current block in the encoding apparatus.

First, in S2301, the encoding apparatus may calculate a cost (cost A) when performing prediction for an intra-prediction mode of a current block by using an intra-prediction mode of a neighbor block adjacent to the current block. Performing prediction for an intra-prediction mode of a current block by using an intra-prediction mode of a neighbor block adjacent to the current block may be called a method of predicting an intra-prediction mode method by using an index. A method of predicting an intra-prediction mode method by using an index will be described in detail with reference to FIG. 24.

In S2302, the encoding apparatus may calculate a cost (hereinafter, referred as cost B) when using a method of not predicting an intra-prediction mode. A method of determining an intra-prediction mode which uses a method of not predicting an intra-prediction mode will be described in detail with reference to FIG. 25.

Then, in S2303, the encoding apparatus may calculate a cost (hereinafter, referred as cost C) when using a method of predicting an intra-prediction mode of a current block by using a reconstructed pixel area of the current block. A method of predicting an intra-prediction mode of a current block by using a reconstructed pixel area of the current block will be described in detail with reference to FIG. 26.

Subsequently, in S2304, the encoding apparatus may determine a best intra-prediction mode of the current block by comparing the cost A, the cost B, and the cost C.

FIG. 24 is a view showing a method of predicting an intra-prediction mode by using an index.

For convenience of description, it is assumed that a current block is encoded through intra-prediction, and an intra-prediction mode of a neighbor block adjacent to the upper of the current block and an intra-prediction mode of a neighbor block adjacent to the left of the current block are A and B, respectively.

In order to predict an intra-prediction mode of a current block, the encoding apparatus may configure a candidate mode by using intra-prediction modes of neighbor blocks adjacent to a current block. A plurality of candidate modes may be present. For convenience of description, in the present embodiment, it is assumed that a number of candidate modes is two, but there may be present more candidate modes (for example, between three and six, or more).

In an embodiment, the encoding apparatus may determine whether or not A and B are identical, and if so, may set A as the first candidate mode, and set an arbitrary intra-prediction mode as the second candidate mode. When at least three candidate modes are used, A may be set as the first candidate mode, and residual candidate modes may be set on the basis of a priority between arbitrary intra-prediction modes. Herein, an arbitrary prediction mode may include intra-prediction modes having high frequency statistically. In an embodiment, an arbitrary prediction mode may include a non-directional prediction mode such as a DC or planar mode, a directional prediction mode similar to a candidate mode, a directional prediction mode such as a vertical, horizontal or diagonal direction, etc.

When A and B are different, A may be set as the first candidate mode, and B may be set as the second candidate mode. When at least three candidate modes are used, based on a priority between arbitrary prediction modes differing from A and B, a residual candidate mode may be set.

Subsequently, the encoding apparatus may encode information identifying a candidate mode identical to an intra-prediction mode of the current block. Herein, the information may be index information representing any one of a plurality of candidate modes.

A number of candidate modes may be a preset value, or may be encoded in a block unit or through an upper layer header and transmitted to the decoding apparatus. An identical method of generating a candidate mode may be used in the encoding apparatus and the decoding apparatus.

When a candidate mode identical to an intra-prediction mode of the current block is not present, the encoding apparatus may set the cost A to a value greater than the cost B and the cost C such that a method of predicting an intra-prediction mode by using an index may not be selected.

FIG. 25 is a view showing an example of determining an intra-prediction mode of a current block without using a method of predicting an intra-prediction mode.

When a candidate mode identical to an intra-prediction mode of a current block is not present, the encoding apparatus may directly encode the intra-prediction mode of the current block by using residual prediction modes excluding the candidate mode among all intra-prediction modes that may be used by the current block.

For example, when a number of intra-prediction modes that may be used by the current block is ten, and a number of candidate modes is two (for example, the first candidate mode A=mode 0, the second candidate mode B=mode 3), residual prediction modes except for the candidate mode become modes 1, 2, 4, 5, 6, 7, 8, and 9. The encoding apparatus may perform numbering for residual prediction modes according to an order. For example, when A is smaller than B, residual prediction modes smaller than A have a conventional index, residual prediction modes between A and B have an index decreased by 1, and residual prediction modes greater than B have an index decreased by 2. As it is assumed that A is mode 0, and B is mode 3, mode 1 and mode 2 may change in index to 0 and 1 by decreasing by 1, and modes 4 to 9 may change in index to 2 to 7 by decreasing by 2. Subsequently, the encoding apparatus may encode identification information representing an intra-prediction mode of the current block among the residual prediction modes to which an index re-assigned.

The decoding apparatus may receive identification information from the encoding apparatus, and determine an intra-prediction mode of a current block on the basis of the received identification information. Herein, when a decoded residual prediction mode is smaller than candidate modes, the residual prediction mode may be determined as a current intra-prediction mode as it is, and when a residual prediction mode is greater than at least one of candidate modes, an index of residual prediction mode may be added by a number of candidate modes that are smaller than the residual prediction mode, and the result thereof may be determined as an intra-prediction mode of the current block. In an embodiment, when a candidate mode, A, and B are 3, and a residual prediction mode is 5, an intra-prediction mode of the current block may be a mode/by adding 5 and 2.

In an example described with reference to FIG. 25, as description with reference to FIG. 24 above, it is assumed that a candidate mode includes an intra-prediction mode of a neighbor block adjacent to a current block. In addition to the example described, a candidate mode may include an intra-prediction mode of a block having a reconstructed pixel area similar to a reconstructed pixel area of a current block as a neighbor pixel which will be described later.

FIG. 26 is a view showing a method of predicting an intra-prediction mode of a current block by using a reconstructed pixel area of the current block.

The encoding apparatus may determine an area that is the most similar to a reconstructed pixel area adjacent to the current block from an area that has been already encoded/decoded. Herein, determining an area may be performed in a block unit.

When an area that is the most similar to a reconstructed pixel area adjacent to the current block is determined, the encoding apparatus may predict an intra-prediction mode of the current block on the basis of an intra-prediction mode of a block having an area that is the most similar to the reconstructed pixel area adjacent to the current block as a reconstructed pixel area.

In an embodiment, in an example shown in FIG. 26, when a reconstructed pixel area that is the most similar to a reconstructed pixel area A of a current block is B, the encoding apparatus may encode a residual value between an intra-prediction mode of a block 1 that is a block having B as a reconstructed pixel area, and an intra-prediction mode of the current block.

The encoding apparatus may determine a plurality of reconstructed pixel areas similar to a reconstructed pixel area of the current block. Herein, as a number P of determined reconstructed pixel areas, a preset number may be used, or may be signaled in a block unit or through an upper layer header.

In an embodiment, in an example shown in FIG. 26, when B and C are determined as a reconstructed pixel area similar to a reconstructed pixel area A of a current block, the encoding apparatus may predict an intra-prediction mode of the current block by using an intra-prediction mode of any one of a block 1 that is a block having B as a reconstructed pixel area and a block 2 that is a block having C as a reconstructed pixel area. Herein, the encoding apparatus may encode an index representing a best block for predicting an intra-prediction mode of the current block between the block 1 and the block 2 (for example, a block through which a residual value with an intra-prediction mode of the current block becomes the minimum), and a difference value between an intra-prediction mode of a block indicated by the index and an intra-prediction mode of the current block.

In an example described above, index information representing any one of a plurality blocks having a feature that is the most similar to the current block is encoded. However, index information representing any one of reconstructed pixel areas similar to a reconstructed pixel area of the current block may be encoded. Herein, the decoding apparatus may select any one that is identified by index information from a plurality of reconstructed pixel areas similar to a reconstructed pixel area of a current block, and decode an intra-prediction mode of the current block by using an intra-prediction mode of a block having the selected reconstructed pixel area as a neighbor pixel.

The encoding apparatus may encode information representing whether or not to determine a single or a plurality of reconstructed pixel areas (P reconstructed pixel areas) similar to a reconstructed pixel area of the current block. Alternatively, in the encoding apparatus and the decoding apparatus, under a preset condition, a number of reconstruct areas to be determined may be adaptively determined.

Subsequently, an example of encoding information related to a method of determining an intra-prediction mode of a current block will be described.

FIG. 27 is a view of a flowchart showing encoding information related to a method of determining an intra-prediction mode of a current block.

First, in S2701, the encoding apparatus may encode information representing whether or not a method of predicting an intra-prediction mode of a current block is used. Herein, the information may be a flag of 1 bit, but it is not limited thereto.

In S2702, when a method of predicting an intra-prediction mode of a current block is used, in S2703, the encoding apparatus may encode information representing whether or not a method of predicting an intra-prediction mode by using a reconstructed pixel area is used. Herein, the information may be a flag of 1 bit, but it is not limited thereto.

In S2104, when a method of predicting an intra-prediction mode by using a reconstructed pixel area is used, in S2705, information required for predicting an intra-prediction mode of the current block may be encoded. In an embodiment, when a plurality of reconstructed pixel areas similar to a reconstructed pixel area of the current block is determined, identification information identifying a block having an intra-prediction mode identical or similar to an intra-prediction mode of the current block among a plurality of blocks having a feature similar to the current block may be encoded. Herein, the identification information may be index information representing any one of a plurality of candidate blocks. In addition, the encoding apparatus may encode a difference value between an intra-prediction mode of a candidate block and an intra-prediction mode of the current block.

In S2704, when it is determined that a method of predicting an intra-prediction mode by using a reconstructed pixel area is not used, an intra-prediction mode of the current block may be encoded by using a method of predicting using an intra-prediction mode of neighbor blocks adjacent to the current block. Accordingly, in S2706, the encoding apparatus may encode identification information identifying a candidate mode having an intra-prediction identical to an intra-prediction mode of the current block among candidate modes generated on the basis of intra-prediction modes of neighbor blocks.

In S2707, when a method of predicting an intra-prediction mode is not used, an intra-prediction mode of the current block may be encoded by using residual modes excluding a candidate mode among intra-prediction modes that may be used by the current block.

FIG. 28 is a view of a flowchart showing decoding an intra-prediction mode of a current block.

First, the decoding apparatus may decode information representing whether or not a current block is encoded through intra-prediction from a bitstream.

When the current block is encoded through intra-prediction, in S2801, the decoding apparatus may decode information representing whether or not a method of predicting an intra-prediction mode of a current block is used. Herein, the information may be a flag of 1 bit, but it is not limited thereto.

In S2802, when a method of predicting an intra-prediction mode of a current block is used, in S2803, the decoding apparatus may decode information representing whether or not an intra-prediction mode of the current block is predicted by using a reconstructed pixel area of the current block. Herein, the information may be a flag of 1 bit, it is not limited thereto.

In S2804, when a method of predicting an intra-prediction mode by using a reconstructed pixel area is used, in S2805, information required for predicting an intra-prediction mode of the current block may be decoded. In an embodiment, when a plurality of reconstructed pixel areas similar to a reconstructed pixel area of the current block is determined, identification information identifying a block having an intra-prediction mode identical or similar to an intra-prediction mode of the current block among a plurality of blocks having a feature similar to the current block may be decoded. Herein, the identification information may be index information representing any one of a plurality of candidate blocks. In addition, the decoding apparatus may decode a difference value between an intra-prediction mode of a candidate block identified from identification information and an intra-prediction mode of the current block. The encoding apparatus may determine an intra-prediction mode of the current block on the basis of decoded information.

In S2804, when it is determined that a method of predicting an intra-prediction mode by using a reconstructed pixel area is not used, the decoding apparatus may determine an intra-prediction mode of the current block by using a method of predicting using an intra-prediction mode of neighbor blocks adjacent to the current block. For the same, in S2806, the decoding apparatus may configure candidate modes by using intra-prediction modes of neighbor blocks adjacent to the current block, and decode identification information identifying a candidate mode having an intra-prediction mode identical to an intra-prediction mode of the current block among candidate modes. The decoding apparatus may set a candidate mode represented by identification information as an intra-prediction mode of the current block.

When a method of predicting an intra-prediction mode is not used, in S2807, the decoding apparatus may decode residual mode information of the current block. Then, the decoding apparatus may determine an intra-prediction mode of the current block on the basis of a candidate mode of the current block and residual mode information.

In an embodiment described above, a method of predicting an intra-prediction mode of a current block by using an intra-prediction mode of a neighbor block adjacent to the current block, and a method of predicting an intra-prediction mode of a current block by using an intra-prediction mode of a reconstructed pixel area identical or similar to a reconstructed pixel area of the current block have been described, and the two methods are different prediction methods. In another embodiment, two prediction methods may be integrated and used as one prediction method. In an embodiment, when it is set to use a method of predicting an intra-prediction mode of a current block, the encoding apparatus may configure a candidate mode on the basis of an intra-prediction mode adjacent to the current block and an intra-predict ion mode of a block having a reconstructed pixel area similar to a reconstructed pixel area of the current block as a neighbor pixel. Herein, a candidate mode may include an intra-prediction mode of a neighbor block and an intra-prediction mode of a block having a feature similar to the current block, and may further include an arbitrary intra-prediction mode. Herein, encoding a method of predicting an intra-prediction mode of a current block (that is, S2703), and decoding the same (S2803) may be omitted.

Subsequently, a method of performing intra-prediction oy using a reconstructed pixel area will be described.

FIG. 29 is a view showing a method of performing intra-prediction by using a reconstructed pixel area.

In order to derive a prediction block of a current block, a reconstructed pixel area that is the most similar to a reconstructed pixel area adjacent to the current block may be determined. In an embodiment, when B is a reconstructed pixel area that is the most similar to a block reconstructed pixel area A adjacent to the current block, a block having B as a reconstructed pixel area may be used as a prediction block of the current block.

When a reconstructed pixel area is used, a reconstructed pixel area that is the most similar to a reconstructed pixel area of the current block may be determined within a current video, and a block to be used as a prediction block of the current block may be determined according to the determination result. Accordingly, an intra-prediction mode is not required in comparison to general intra-prediction. Therefore, intra-prediction may be performed without encoding an intra-prediction mode.

Herein, in order to reduce complexity of encoding/decoding, an area used for determining a similar reconstructed pixel area may be limited. Information representing a range of determining may be transmitted to the decoding apparatus by being encoded in a block unit or through an upper layer header. In an embodiment, the encoding apparatus may set Q blocks based on the current block and which are reconstructed before the current block as a range of determining an area. Alternatively, the encoding apparatus may include a size of a range of determining an area in a pixel unit, and encode information represent in the size in a block unit or through an upper layer header.

FIG. 30 is a view of a flowchart showing a method of determining a method of performing intra-prediction for a current block by using a reconstructed pixel area.

First, in S3001, the encoding apparatus may calculate a cost (cost A) when performing intra-prediction using a reconstructed pixel area, and in S3002, calculate a cost (cost B) when performing intra-prediction without using a reconstructed pixel area.

In S3003, the encoding apparatus may compare the cost A with the cost B, and determine whether or not to perform intra-prediction using a reconstructed pixel area.

FIG. 31 is a view of a flowchart showing a method of encoding information related to whether or not to perform intra-prediction using a reconstructed pixel area.

First, in S3101, the encoding apparatus may encode information representing whether or not to perform intra-prediction using a reconstructed pixel area. The information may be a flag of 1 bit, but it is not limited thereto.

In S3102, when intra-prediction using a reconstructed pixel area is performed, the encoding apparatus may not encode information related to an intra-prediction mode of the current block, and end performing the method.

Meanwhile, in S3102, when intra-prediction without using a reconstructed pixel area is performed, in S3103, the encoding apparatus may encode information related to an intra-prediction mode of the current block. Herein, information related to an intra-prediction mode may include information representing whether or not an intra-prediction mode of the current block is identical to an MPM candidate, an MPM index, residual mode information, etc.

FIG. 32 is a view of a flowchart showing a method of decoding information related to whether or not to perform intra-prediction by using a reconstructed pixel area.

First, in S3201, the decoding apparatus may decode information representing whether or not to perform intra-prediction by using a reconstructed pixel area. The information may be a flag of 1 bit, but it is not limited thereto.

In S3202, when intra-prediction is performed by using a reconstructed pixel area, the decoding apparatus may perform intra-prediction by not decoding information related to an intra-prediction mode of a current block, and determine a reconstructed pixel area similar to a reconstructed pixel area of the current block within a current video.

Meanwhile, in S3202, when intra-prediction is performed by not using a reconstructed pixel area, in S3203, the decoding apparatus may decode information related to an intra-prediction mode of the current block. Herein, information related to an intra-prediction mode may include information representing whether or not an intra-prediction mode of the current block is identical to an MPM candidate, an MPM index, residual mode information, etc. When an intra-prediction mode of the current block is obtained, the decoding apparatus may perform intra-prediction for the current block by using the obtained intra-prediction mode.

In an embodiment above, a method of determining a reconstructed pixel area that is the most similar within a current video by using a reconstructed pixel area adjacent to a current block, and setting the corresponding block as a prediction block has been described. However, rather than using the block as a prediction block of a current block, a method of setting the block as a reconstructed block of the current block may be also used. Herein, information representing whether or not a block having a reconstructed pixel area that is the most similar to a reconstructed pixel area adjacent to the current block is used as a reconstructed block of the current block may be encoded. When a block having a reconstructed pixel area that is the most similar to a reconstructed pixel area adjacent to the current block is used as a reconstructed block of the current block, transform, quantization and entropy encoding of a transform coefficient may be omitted, and thus video encoding may be performed efficiently.

Subsequently, a method of performing inter-prediction for a current block by using a reconstructed pixel area will be described in detail.

A method of performing inter-prediction for a current block by using a reconstructed pixel adjacent to the current block will be described with reference to FIG. 33.

When coding a current block, reconstructed pixels that have been already encoded/decoded may be present adjacent to the current block. Herein, the encoding apparatus may start notion estimation of the current block on the basis of a pixel included in an arbitrary area among reconstruct pixels adjacent to the current block.

In an embodiment, in an example shown in FIG. 33, the encoding apparatus may start notion estimation from an area at a position identical to a reconstructed pixel area A adjacent to the current block within a reference video. When a reconstructed pixel area B similar to the reconstructed pixel area A adjacent to the current block is determined, the encoding apparatus may set a distance between A and B as a notion vector. Then, a prediction block of the current block (that is, a reference block indicated by a motion vector within a reference video) may be determined by applying the notion vector estimated by using the reconstructed pixel area to the current block.

Herein, sizes or forms of the reconstructed pixel area adjacent to the current block and the determined reconstructed pixel area have to be identical. In FIG. 33, a reconstructed pixel area of a current block is an area including a pixel adjacent to the upper boundary of the current block, a pixel positioned at the left boundary of the current block, and a pixel adjacent to the corner of the current block (for example, left upper corner of the current block, right upper corner of the current block, left lower corner of the current block, etc.), but a form of the reconstructed pixel area is not limited thereto. In an embodiment, a reconstructed pixel area may have various sizes or forms as described with reference to FIG. 18.

In addition, by performing sub-sampling, a reconstructed pixel area similar to a reconstructed pixel area of the current block may be determined by using partial pixels included in the reconstructed pixel area. In an embodiment, as described with reference to FIG. 15 above, the encoding apparatus may determine a reconstructed pixel area similar to a reconstructed pixel area of the current block by using a part of reconstructed pixels included in the reconstructed pixel area, or by using M or more rows or N or more columns adjacent to the current block. Alternatively, the encoding apparatus may determine a reconstructed pixel area similar to a reconstructed pixel area of the current block by using neighbor pixels within a range in which a width of the current block is expanded into K times or a height of the current block is expanded into L times.

Determining a reconstructed pixel area similar to a reconstructed pixel area of the current block within a reference video may be performed by comparing similarities within the reconstructed pixel area. As an example related to intra-prediction described above, for determining a similarity, similarity measuring may be used such as a standard deviation of a reconstructed pixel area, an average value of reconstruct pixels, SAD (sum of absolute difference) or SSD (sum of squared difference) between reconstructed pixel areas.

When notion estimation is performed by using a reconstructed pixel area of a current block, notion information is derived by using information of a block that has been already encoded/decoded adjacent to the current block, and thus transmission of notion information (for example, motion vector) from the encoding apparatus to the decoding apparatus is not required.

The encoding apparatus may determine a reference video of a current block, a prediction direction (for example, previously-used, afterwardly-used or bi-directional prediction, etc.) of the current block or motion information such as a notion vector by performing notion estimation using a reconstructed pixel area, and by using a case with minimum cost. The decoding apparatus may also determine notion information of a current block by performing notion estimation by using a reconstructed pixel area adjacent to the current block, and selecting a case with minimum cost by using the same method used in the encoding apparatus.

However, when notion estimation is performed for the entire reference video in the decoding apparatus, complexity in the decoding apparatus may remarkably increase. In order to solve the same, information representing an area used for determining a similar reconstructed pixel area may be encoded in a block unit or through an upper layer header, and the above information may be transmitted to the decoding apparatus. By limiting an area for determining a similar reconstructed pixel area, complexity in the decoding apparatus may decrease. In an embodiment, the encoding apparatus may encode information specifying a reference video (for example, reference video index) or information representing a position in which a reference block is included within a reference video (for example, slice or tile index). By transmitting information of a reference video and a reference block position to the decoding apparatus, a calculation amount in the decoding apparatus and complexity in the decoding apparatus may be reduced.

In addition, the encoding apparatus may encode information specifying any one type of a plurality of motion estimation methods in a block unit or through an upper layer header. Herein, the decoding apparatus may determine whether or not to perform motion estimation using a reconstructed pixel area of a current block on the basis of information transmitted from the encoding apparatus.

FIG. 34 is a view showing an example of notion estimation that may be performed in the encoding apparatus or the decoding apparatus. In the preset figure, it is assumed that a start position of motion estimation is A. In addition, in an example shown, it is assumed that ① is an integer positional pixel (integer pel), ② is a ½ positional pixel (half pel), and ③ is a ¼ positional pixel (quarter pel). In the preset figure, nine integer pixels are shown, but more integer pixels may be used for notion estimation.

When a best motion vector indicates to select a best motion vector among a number of inter positional pixels, motion estimation is additionally performed in a ½ positional pixel unit at a position to an adjacent based on a (a and eight of ②). When a best notion vector indicates to select a b position among a number of ½ positional pixels, notion estimation is additionally performed in a ¼ positional pixel unit at an adjacent position based on b (b and eight of ③). When a best notion vector that is a result of notion estimation in a ¼ positional pixel unit indicates to select a c position, a final notion vector is represented as (A→c). Herein, coordinates may become negative going to the left direction and to the upper direction based on A, and become positive going to the right direction and to the lower direction, or vice versa. In FIG. 34, notion estimation is performed up to a ¼ positional pixel, but motion estimation may be performed in a $½^K$ positional pixel unit. Herein, K is an integer equal to or greater than 0, and K may be identically set in the encoding apparatus and the decoding apparatus. In addition, K may be also transmitted in a block unit or through an upper layer header. Herein, when a notion vector obtained at a ① position is mv_1, a notion vector obtained at a ② position is mv_2, and a notion vector obtained at a ③ position is mv_3, a motion vector mv finally determined may be calculated as (mv_1<<(K))+(mv_2<<(K−1))+mv_3<<(K−2). This is to convert the notion vector mv to an integer unit rather than a real number unit. In an example shown in FIG. 34, a notion vector mv_1 from A to a is (−1, −1), a notion vector mv_2 from a to b is (0, −1), and a notion vector mv_3 from b to c is (1, 1). In FIG. 34, notion estimation is performed a ¼ positional pixel unit and by assuming K to be 2, and thus a final notion vector mv is determined as ((−1, −1)<<2)+((0, −1)<<1)+((1, 1)<<0)=(−4, −4)+(0, −2)+(1, 1)=(−3, −5).

When notion estimation is performed up to a ⅛ positional pixel, a final notion vector mv may be determined as (mv_1<<3)+(mv_2<2)+mv_3<<1+mv_4. Herein, mv_4 means a notion vector estimated in a ⅛ positional pixel unit.

FIG. 3b is a view showing determining a prediction block of a 4×4 size by using a notion vector estimated in a ¼ positional pixel unit.

In the present figure, a circular figure represents an integer positional pixel, a triangle figure represents a fractional number positional pixel. When it is assumed that a final notion vector mv is (7, −10), a prediction block of a current block may include a position that has moved in an X axis by 7, in a Y axis by −10 in a ¼ position unit from a block at a position identical to a current video within a reference video.

FIG. 36 is a view of a flowchart showing determining whether or not to perform inter-prediction by using a reconstructed pixel area.

First, in S3601, the encoding apparatus may calculate a cost (cost A) when inter-prediction is performed without using a reconstructed pixel area. Inter-prediction is performed without using a reconstructed pixel area means performing inter-prediction by using a merge mode, an AMVP mode, etc.

Subsequently, in S3602, the encoding apparatus may calculate a cost (cost B) when inter-prediction is performed by using a reconstructed pixel area.

Then, in S3603, the encoding apparatus may compare the cost A with the cost B, and select a best inter-prediction method for the current block. When the cost A is smaller than the cost B, the current block may be encoded through inter-prediction without using a reconstructed pixel area, and when the cost A is greater than the cost B, the current block may be encoded through inter-prediction using a reconstructed pixel area.

FIG. 37 is a view of a flowchart showing encoding a method of performing inter-prediction for a current block.

First, in S3701, the encoding apparatus may encode information specifying an inter-prediction method of a current block. The information may include a flag of 1 bit which represents whether or not inter-prediction using a reconstructed pixel area is performed for a current block. Alternatively, the information may be index information specifying any one of a plurality of inter-prediction modes that may be used by the current block (for example, a merge mode, an AMVP mode, a skip mode, or a method of using a reconstructed pixel area).

When it is determined that inter-prediction using a reconstructed pixel area is performed for the current block in S3702, the encoding apparatus may omit encoding notion information of the current block. Alternatively, information representing a range for determining an area similar to a reconstructed pixel area of the current block may be encoded in a block unit or an upper layer header. By limiting a range for determining the area, complexity in the decoding apparatus may be reduced.

Meanwhile, when it is determined that inter-prediction using a reconstructed pixel area is not performed in S3702, in S3703, the encoding apparatus may encode information determining motion information of the current block (for example, information specifying a block having notion information identical to the current block under a merge mode or information specifying a reference video index among notion vector prediction candidates under an AMVP mode, notion vector difference value, etc.).

FIG. 38 is a view of a flowchart showing decoding a method of performing inter-prediction for a current block.

First, in S3801, the decoding apparatus may decode information specifying an inter-prediction method of a current block. The information may include a flag of 1 bit which represents whether or not inter-prediction using a reconstructed pixel area is performed for the current block. Alternatively, the information may be index information specifying any one of a plurality of inter-prediction modes that may be used by the current block (for example a merge mode, an AMVP mode, a skip mode, or a method of using a reconstructed pixel area).

Based on the information, the decoding apparatus may determine an inter-prediction method of the current block. Herein, when it is determined that inter-prediction using a reconstructed pixel area is performed for the current block in S3802, in S3803, the decoding apparatus may obtain notion information of the current block through notion estimation rather than decoding notion information of the current block from a bitstream. Herein, motion information of the current block may be obtained by determining a reconstructed pixel area that is the most similar to a reconstructed pixel area of the current block within a reference video.

Alternatively, the decoding apparatus may decode information representing a range for determining an area similar to a reconstructed pixel area of the current block in a block unit or an upper layer header. The decoding apparatus may determine a reconstructed pixel area that is the most similar to a reconstructed pixel area of the current block within the limited range.

Meanwhile, when it is determined that inter-prediction using a reconstructed pixel area is not performed in S3802, in S3804, the decoding apparatus may decode information determining notion information of the current block (for example, information specifying a block having notion information identical to the current block under a merge mode or information specifying any one reference picture index among notion vector prediction candidates under an AMVP mode, a notion vector difference value, etc.), and determine notion information of the current block on the basis of decoded information.

In an embodiment described above, the encoding apparatus and the decoding apparatus determine an area that is the most similar to a reconstructed pixel area of a current block within a reference video. However, different to an example described above, the encoding apparatus and the decoding apparatus may determine a plurality of areas similar to a reconstructed pixel area of a current block within a reference video. Herein, the encoding apparatus may encode information specifying an area used for inter-prediction of the current block among a plurality of determined candidate areas. The decoding apparatus may determine notion information of a current block by using an area specified by the information, and perform inter-prediction for the current block by using the determined notion information.

Subsequently, a method of improving notion information by using a reconstructed pixel area will be described.

When determining a motion vector of a current block, a notion vector may be improved by using the same method in the encoding apparatus and the decoding apparatus. In an embodiment, in the encoding apparatus, motion estimation using a block in a ½ positional pixel unit may be performed, and a notion estimation result may be improved in a $\frac{1}{2}^{K-L}$ position unit by using a reconstructed pixel area. Herein, K means a precision of a notion vector used when performing inter-prediction (that is, a motion vector derived without using a reconstructed pixel area), and L means a precision of a notion vector that may be improved by using a reconstructed pixel area.

K and L may be encoded in an upper layer header and transmitted to the decoding apparatus or may be also identically preset in the encoding apparatus and the decoding apparatus. For example, when K and L are preset as 2 and 1, respectively, even though motion information estimated in the encoding apparatus in a ¼ positional pixel unit is transmitted to the decoder, notion information may be additionally improved in a ⅛ positional pixel unit in the decoding apparatus in addition to a ¼ positional pixel unit.

When L representing a degree of improvement in notion information is set to 0, notion estimation is performed on the basis of a notion vector of a $\frac{1}{2}K$ pixel unit, and notion estimation may be additionally performed in a $\frac{1}{2}K$ pixel unit by using a reconstructed pixel area. Alternatively, when L is 0, notion estimation is performed only for a current block, and notion estimation for a reconstructed pixel area may not be performed.

A motion vector may be improved in the encoding apparatus and the decoding apparatus by using the same method, and even though the estimated motion vector is encoded in a $\frac{1}{2}^{K}$ positional pixel unit, a notion vector may be used in a $\frac{1}{2}^{K-L}$ positional pixel unit, and the encoding apparatus and the decoding apparatus may store the motion vector in a $\frac{1}{2}^{K-L}$ positional pixel unit.

Herein, the encoded notion vector has a $\frac{1}{2}^{K}$ positional pixel unit, and thus a precision of a notion vector of a neighbor block may have a $\frac{1}{2}^{K}$ positional pixel unit when a motion vector of the current block is determined by using a notion vector of a neighbor block adjacent to the current block.

In an embodiment, FIG. 39 is a view showing an example of improving a motion vector of a current block by using a reconstructed pixel area. For convenience of description, it is assumed that an encoding precision K of a notion vector is 2, and an improved precision L of the notion vector is 1.

As the encoding precision of the notion vector is 2, a notion vector to be encoded represents a ¼ pixel position.

As the improved precision of the motion vector is 1, an improved motion vector represents a ⅛ pixel position.

Herein, a reconstructed pixel area may be identically used in the encoding apparatus and the decoding apparatus, and thus a notion vector may be improved without using additional piece of information. In an embodiment, when the motion vector to be encode is (7, −10), the motion vector to be encoded is a ¼ pixel position, and thus a reference block represented by the encoded notion vector (that is, original prediction block) is identical to an example shown in FIG. 39.

When encoding/decoding, motion estimation may be performed for a ⅛ position pixel unit in eight directions from a position identical to a pixel included in a reconstructed pixel area of a current block within a reference video based on a pixel spaced apart by as much as indicated by a motion vector. In order to generate a ⅛ positional pixel, additional interpolation has to be performed. In FIG. 39, pixels used for performing motion estimation so as to generate a ⅛ positional pixel among pixels included in a reconstructed pixel area is marked are as a rectangle.

When a ⅛ positional pixel that is the most similar to a pixel included in a reconstructed pixel area is detected, a motion vector of the current block may be improved on the basis of a motion vector between a ¼ positional pixel and a ⅛ positional pixel.

In an embodiment, in an example shown in FIG. 39, when assuming that a pixel at a position of an asterisk mark and included in a reconstructed pixel area B is a ⅛ positional pixel that is the most similar to a pixel included in a reconstructed pixel area, a notion vector of the ⅛ positional pixel is (−1, −1). Accordingly, a notion vector of a current block may be improved in consideration of the motion vector (−1, −1) of the ⅛ position pixel. In order to match a precision of a motion vector of an encoded ¼ positional pixel with the ⅛ positional pixel, shift operation (<<1) may be performed for a notion vector (7, −10) of the ¼ positional pixel. The notion vector of the current block may be improved by adding the calculation result and the notion vector of the ⅛ positional pixel. Accordingly, the motion vector of the current block may become ((7, −10)<<1+(−1, −1))=(13, −21).

K and L are respectively set to 2 and 1, and thus a precision of the improved notion vector becomes a ⅛ position, and a precision of a motion vector stored in the encoding apparatus and the decoding apparatus becomes also ⅛ position.

A notion vector of a current block may be derived by using a notion vector of a previous block using inter-prediction as a notion vector candidate. Herein, when a motion vector of a previous block is used as a motion vector candidate, scaling for the notion vector of the previous block may be performed so as to match a basis precision K of the current block.

In an embodiment, it is assumed that a basis precision K of all blocks is 2, an additional precision L of all blocks is 1, a notion vector obtained for a basis precision K of a previous block is (7, −10), and a notion vector additionally derived by an additional precision L is (3, −3). Herein, an improved notion vector of the previous block may become (17, −23) by ((7, −10)<<1)+(3, −3).

However, since the basis precision K of the current block is 2, rather than using the improved notion vector of the previous block, a motion vector of the previous block calculated on the basis of a basis precision may be used as a motion vector candidate of the current block. In other words, (7, −10) may be used as a notion vector candidate of the current block rather than using (17, −23).

When K and L are differently set for each block, a motion vector precision of a previous block may be commonly used as an arbitrary precision when deriving a motion vector candidate of a current block. In an embodiment, a notion vector of a previous block may be used as a notion vector candidate of a current block by performing scaling for the same to a basis precision K of the current block.

FIG. 40 is a view of a flowchart determining a motion vector in the encoding apparatus.

First, in S4001, the encoding apparatus may perform notion estimation n a $\frac{1}{2}^{K}$ pixel unit, and calculate a cost (hereinafter, referred as cost A) according to the same. Then, in S4002, the encoding apparatus may perform motion estimation in a $\frac{1}{2}^{K-L}$ pixel unit (or improvement), and calculate a cost (hereinafter, referred as cost B) according to the same.

Subsequently, in S4003, the encoding apparatus may compare the cost A with the cost B, and determine whether or not to improve a notion vector of a current block. In an embodiment, when the cost A is smaller than the cost B, in S4004, it is set not to use an improved notion vector, and when the cost B is smaller than the cost A, in S4005, it is set to use an improved notion vector.

The encoding apparatus may encode information representing whether or not to use an improved notion vector in a block unit or through an upper layer header. Herein, the information may be a flag of 1 bit, but it is not limited thereto. The decoding apparatus may determine whether or not to improve a motion vector on the basis of information received from the encoding apparatus.

Alternatively, without encoding the information, the encoding apparatus and the decoding apparatus may set to improve all motion vectors.

FIG. 41 is a view of a flowchart of selecting a best motion vector in the encoding apparatus when values of a basis precision K and an additional precision L is adaptively selected in a block unit.

First, in S4101, initial values of parameters used for selecting a best motion vector are shown.

In FIG. 41, K represents a basis accuracy, L represents an additional accuracy, END_K represents a maximum value of K, and END_L represents a maximum value of L. K, END_K, L, and END_L may be initialized to Val1, Val2, Val3, and Val4, respectively. Val1 to Val4 represent an arbitrary integer, and may be encoded through an upper layer header.

BEST_K represents a best K, and BEST_L represents the best L. BEST_K and BEST_L may be initialized to Val1, and Val3, respectively.

MV_K represents a motion vector in a ½K pixel unit, and MV_L represents a notion vector in a ½K+L unit. In addition, BESTMV_K represents the best MV_K, and BESTMV_L represents the best MV_L. Each of notion vector parameters may be initialized to (0, 0).

COST represents a cost when performing prediction by using MV_K and MV_L, and BEST_COST represents the best COST. COST may be initialized to 0, and BEST_COST may be initialized to a maximum value (MAX) that may be stored.

After initialization, the encoding apparatus may update MV_K by performing motion estimation in a $½^K$ positional pixel unit. In addition, MV_L may be updated by additionally performing notion estimation up to a $½^{K+L}$ unit on the basis of the determined MV_K. When MV_K and MV_L are derived, in S4102, the encoding apparatus may select a final MV by using the derived MV_K and MV_L, and update COST by calculating a cost by using the selected MV.

The final MV may be obtained by matching a precision between MV_K and MV_L. In an embodiment, when K and L are respectively 2, MV_K is a notion vector in a ¼ pixel unit, and MV_L is a notion vector of a 1/16 pixel unit. When MV_K is (5, 7), and MV_L is (3, 7), a final MV may be derived as ((5, 7)<<2)+(3, 7)=(25, 35) by matching a precision of the two notion vectors.

In S4103, the encoding apparatus may compare a cost (that is, COST) calculated by using the final MV with BEST_COST, and S4104, when COST is equal to or smaller than best_COST, BEST_COST may be updated to COST, and BESTMV_K and BESTMV_L may be respectively updated to MV_K and MV_L. Meanwhile, BEST_K and BEST_L may be respectively updated to K and L.

When updating of a parameter is performed in S4104, or COST is greater than best_COST in S4103, in S4105, K may be updated to K+a. Herein, a may be encoded in a block unit or through an upper layer header, the encoding apparatus and decoding apparatus may identically preset to an arbitrary value and use the same.

In S4106, the updated K and END_K may be compared, and when K is not greater than END_K, returning to S4102 may be performed so that calculating of MV and COST may be performed again.

Alternatively, when K is greater than END_K, in S4107, K may be initialized to Val1, and L may be updated to L+b. Herein, b may be encoded in a block unit or through an upper layer header, or the encoding apparatus and the decoding apparatus may identically preset to an arbitrary value and use the same.

In S4108, the updated L and END_L may be compared, and when L is not greater than END_L, returning to S1302 is performed so that calculating of MV and COST may be performed again.

When L is greater than END_L in S4108, motion vector estimation algorithm may be ended.

As described above, by updating values of K and L by a and b, calculating MV and COST for all selectable K and L may be performed, and thus the best notion vector may be selected.

The encoding apparatus may encode a best basis precision (value of final BEST_K), a best additional precision (value of final BEST_L), and notion vector information (value of final BESTMV_K) derived in a basis precision unit, and transmit the same to the decoding apparatus. Herein, the decoding apparatus may derive basis precision information and motion vector information derived in a basis precision unit, and improve a motion vector by using additional precision information.

In another embodiment, the encoding apparatus may encode a best basis precision (value of final BEST_K) and notion vector information (value of final BESTMV_K) derived in a basis precision unit, and transmit the same to the decoding apparatus. Herein, the decoding apparatus may derive a best additional precision by using the same method used in the encoding apparatus, and improve a motion vector on the basis of the derived additional accuracy.

In an embodiment that will be described later, the encoding apparatus encodes a best basis precision information and notion vector information derived in a basis precision unit, and transmit the same to the decoding apparatus.

FIG. 42 is a view showing encoding a best motion vector of a current block.

In S4201, when a current block is encoded through inter-prediction, the encoding apparatus may encode information representing whether or not to use improvement of a motion vector. Herein, information representing whether or not to improve a motion vector by using a reconstructed pixel area may be encoded in a block unit or through an upper layer header.

When it is determined to improve a notion vector by using a reconstructed pixel area, in S4202, the encoding apparatus may encode information related to a basis precision of the current block.

Herein, information related to a basis precision may include at least one of information representing a best basis precision of the current block (for example, value of final BEST_K in FIG. 41) and a offset unit for determining the best basis precision (for example, offset a added to K in FIG. 41). When an offset unit is encoded, the encoding apparatus may additionally encode information representing which of selectable K is used.

In an embodiment, when an offset a is 2, an initial value of K that is Val1 is −2, and an initial value of END_K that is Val2 is 2, K that may be selected by encoding apparatus becomes −2, 0, and 2 in a flowchart of FIG. 41. Herein, the encoding apparatus may encode information representing which value of −2, 0, and 2 is used (for example, index information).

In S4203, the encoding apparatus may encode a best notion vector of a best K (for example, final BESTMV_K in FIG. 40).

The encoding apparatus may encode a best motion vector of a current block on the basis of a notion vector of a neighbor block adjacent to the current block. Herein, a notion vector of a neighbor block adjacent to the current block may be scaled to be matched with a basis precision of the current block.

For example, when a basis precision K of a current block is 0, a notion vector of neighbor blocks adjacent to the current block may be scaled to be matched with 1/20, and the scaled notion vector may be used when encoding BESTMV_K. In an embodiment, the encoding apparatus may encode a difference value between the scaled notion vector and BESTMV_K.

FIG. 43 is a view showing decoding a best notion vector of a current block.

In S4301, when a current block is decoded through inter-prediction, the decoding apparatus may decode information representing whether or not to use improvement of a notion vector. Herein, information representing whether or not a notion vector is improved by using a reconstructed pixel area may be decoded in a block unit or through an upper layer header.

When it is determined to improve a notion vector by using a reconstructed pixel area, in S4302, the decoding apparatus may decode information related to a basis precision of the current block.

Subsequently, in S4303, the decoding apparatus may decode a best motion vector of a best K (for example, final BESTM_K in FIG. 41). Using a notion vector of a neighbor block when decoding a best notion vector of the current block is as described above.

FIG. 44 is a view of a flowchart showing obtaining an improved notion vector in the decoding apparatus.

S4401 represents an initial value of each parameter.

In FIG. 44, L and END_L may be initialized to Val3 and Val4, respectively. Herein, initial values of L and END_L may be decoded through an upper layer header. BEST_L may be initialized to Val3.

BEST_K may represent a best K, and may be set to a value decoded as in the flowchart of FIG. 43 above.

MV_L and BESTMV_L may be respectively initialized to (0, 0). In addition, COST may be initialized to 0, and BEST_COST_L may be initialized to a maximum value (MAX) that may be stored.

In S4402, the decoding apparatus may set MV_L by performing notion estimation up to a ½ BEST_K+L unit, and calculate a cost when using the set MV_L.

In S4403, COST and BEST_COST_L may be compared, and in S4404, when COST is not greater than best_COST_L, BEST_COST_L may be updated to COST, and BESTMV_L may be updated to MV_L.

When COST is greater than best_COST_L in S4403 or updating of a parameter in S4404 is completed, in S4405 L may be updated by adding an offset b to L.

In S4406, the updated L may be compared with END_L, and when L is not greater than END_L, returning to S4402 may be performed so as to estimate a motion vector according to BEST_K and L.

When MV_L is determined by the above steps, the encoding apparatus may derive a final motion vector by performing scaling for MV_K to be matched with MV_L by using BEST_L and BEST_K.

Subsequently, a method of using improved intra-prediction for a current block will be described.

A coding block may be divided into at least two sub-blocks, and each of sub-block may be divided at least two sub-blocks. When a coding block is not divided, a prediction block identical to a size of the coding block may be generated, and when the coding block is divided into at least two sub-blocks, a prediction block matching to a size of a sub-block may be generated for each sub-block. Herein, a prediction block may mean prediction samples of a block unit generated through inter-prediction or intra-prediction.

For convenience of description, in embodiments described below, a block before being divided into sub-blocks may be called an upper layer block. In an embodiment, when a coding block is divided into at least two sub-blocks, an upper layer block of the sub-block may be a coding block. Alternatively, when the sub-block is divided into at least two sub-blocks, an upper layer block of the divided sub-block may be a sub-block.

FIG. 4b is a view of a flowchart showing encoding intra-prediction information of each sub-block when a current block is divided into a plurality of sub-blocks. Herein, the current block may represent a coding block, or may represent a sub-block. Accordingly, the current block means a current block to be encoded regardless of a coding block, and a sub-block.

First, in S4501, the encoding apparatus may encode information representing whether or not a current block is divided into at least two sub-blocks. The information may be a flag of 1 bit, but it is not limited thereto.

In S4502, when it is determined that the current block is divided into at least two sub-blocks, in S4503, the encoding apparatus may encode information representing whether the current block is divided in a horizontal or vertical direction. The information may be a flag of 1 bit, but it is not limited thereto. In an embodiment, when the information is a flag of 1 bit, when a value of the flag is TRUE, it may represent that the current block is divided into N in a horizontal (or vertical) direction (N is an integer equal to or greater than 2), and when the value of the flag is FALSE, it may represent that the current block is into N in a vertical (or horizontal) direction.

In S4505 and S4006, the encoding apparatus, according to a division form of the current block in S4504, may generate N sub-blocks by performing division for the current block in a horizontal or vertical direction at least one time.

A number N of sub-blocks generated by dividing a current block may be set to use a value preset in the encoding apparatus and the decoding apparatus, or may be encoded in a block unit or through an upper layer header. N may be an integer represented by an exponent of 2 such as 1, 2, 4, 8, 15, 16, etc., or may be encoded by being converted to a log value ($Log_2$ N). For example, when N is 8, the encoding apparatus may encode a value of 3 obtained by applying a log to 8 ($Log_2$ 8). Herein, the decoding apparatus may decode 3, and set N to 8 (2). Herein, when N is 1, it means that a current block is not divided into at least two sub-blocks. Accordingly, when N is 1, encoding information presenting whether or not the current block is divided into sub-blocks may be omitted. When N is 1, a prediction block having a size identical to the current block may be generated.

Alternatively, N may have a value of an integer not represented by an exponent of 2.

In another embodiment, the encoding apparatus may generate a number sub-blocks which is smaller than N by merging a part of a plurality of sub-blocks generated by dividing a current block. Herein, the encoding apparatus may generate one sub-block by merging at least two sub-blocks that are consecutively positioned. In an embodiment, when N is set to 4, the encoding apparatus may generate four sub-blocks by dividing a current block three times, but may merge blocks at an arbitrary position among four sub-blocks according to a preset condition. For example, the encoding apparatus may merge blocks positioned in the middle of a current block into one block. Herein, although N is 4, three sub-blocks having a ratio of 1:2:1 may be generated by dividing a current block.

As a merge condition of sub-blocks, the same condition may be identically used in the encoding apparatus and the decoding apparatus, or the encoding apparatus may encode a merge condition of sub-blocks and transmit the same to the decoding apparatus. In an embodiment, the encoding apparatus may encode information representing an index of sub-blocks that become a merge target among a plurality of sub-blocks generated by dividing a current block, and transmit the same to the decoding apparatus. In other words, the encoding apparatus may generate N−1 (or N−M, herein, M is a number of merging times) sub-blocks by merging a part of N sub-blocks generated by dividing a current block.

Subsequently, in S4507, the encoding apparatus may repeatedly perform the above step by using the first sub-block as a current block among a plurality of sub-blocks included in a current block.

When the current block is not divided into at least two sub-blocks in S4502, in S4508, the encoding apparatus may perform intra-prediction encoding for the current block.

Subsequently, in S4509, whether or not encoding of all sub-blocks is completed may be determined, if not, in S4510, the above steps may be repeatedly performed by using the following sub-block as a current block.

Herein, an encoding/decoding order of among sub-blocks may be determined according to an encoding/decoding order such as raster scanning, zigzag scanning, Z scanning, etc.

FIGS. 46 and 47 are view of an example of dividing a current block into a plurality of sub-blocks.

For convenience of description, in the present embodiment, it is assumed that a number of sub-blocks generated by dividing a current block is four (that is, N is 4). In addition, it is assumed that information representing whether or not a current block is divided into at least two sub-blocks is a flag of 1 bit. In an embodiment, when a flag is 1, it represents that a current block is divided into a plurality of sub-blocks, and when the flag is 0, it represent that a current block is not divided further.

In addition, it is assumed that information representing a division direction of a current block is also a flag of 1 bit. In an embodiment, when a flag is 1, it represent that a current block is divided in a vertical direction, and when the flag is 0, it represent that a current block is divided in a horizontal direction.

In addition, an example of encoding only information related to a block division will be described.

FIG. 46 is a view of an example of dividing (a) into (c). Referring to (a) and (b), a block may be divided into a plurality of sub-blocks. Herein, a division direction is a horizontal direction, and a flag representing whether or not a block is divided may be set to 1, and a flag representing a division direction may be set to 0. Accordingly, the block may include four sub-blocks. A sub-block A among four sub-blocks included in the block is additionally divided, and a division direction is a horizontal direction. A flag representing whether or not the sub-block A is divided may be set to 1, and a flag representing a division direction may be set to 0. Sub-blocks 1 to 4 generated by diving the sub-block A are not additionally divided, and thus flags thereof may be respectively set to 0.

As a sub-block B is not additionally divided, and thus a flag representing whether or not the sub-block B is divided may be set to 0.

A sub-block C is additionally divided and a division direction is a horizontal direction, and thus a flag representing whether or not the sub-block C is divided may be set to 1, and a flag representing a division direction may be set to 0. Sub-blocks 6 to 9 generated by dividing the sub-block C are not additionally divided, and thus flags thereof may be respectively set to 0.

A sub-block D is not additionally divided, and thus a flag representing whether or not the sub-block D is divided may be set to 0.

Finally, ten sub-blocks may be present in the block.

Accordingly, information required for dividing the block from a (a) form to a (c) form becomes 10 10 0000 0 10 0000 0.

FIG. 47 is a view of an example where a part of sub-blocks generated by dividing a block is merged into one sub-block.

Referring to (a) and (b) of FIG. 47, a block may be divided into a plurality of sub-blocks, herein, a division direction is a horizontal direction. Thus, a flag representing whether or not the block is divided may be set to 1, and a flag representing a division direction may be set to 0.

When the block is divided into four sub-blocks, two sub-blocks that are not in contact with an upper boundary and a lower boundary of the block are present in the middle of the block. Herein, the encoding apparatus may merge two blocks positioned in the middle of the block into one sub-block.

Accordingly, the block may include three sub-blocks. A sub-block A of the three sub-blocks included in the block is not additionally divided, thus a flag representing whether or not the sub-block A is divided may be set to 0.

A sub-block B is additionally divided and a division direction is a vertical direction, thus a flag representing whether or not the sub-block B is divided may be set to 1, and a flag representing a division direction may be also set to 1. Two sub-blocks positioned in the middle among four sub-block generated by dividing the sub-block B may be merged into one sub-block. Accordingly, three sub-blocks may be additionally generated by dividing the sub-block B. Sub-blocks generated by dividing the sub-block B are not divided further, thus flags representing whether or not the sub-blocks included in the sub-block B are divided may be respectively set to 0.

A sub-block C is not additionally divided, thus a flag representing whether or not the sub-block C is divided may be set to 0.

Finally, five sub-blocks may be present in the block.

Accordingly, information required for dividing a block (a) to a form of a block (c) is 10 0 11 000 0.

Dividing a sub-block may be limited according to a maximum depth or minimum size of the sub-block. Herein, a maximum depth of a sub-block or a minimum size of a sub-block may be encoding in a block unit or through an upper layer header.

Each sub-block may have a different intra-prediction mode. Accordingly, the encoding apparatus may encode intra-prediction information for each sub-block. Herein, intra-prediction information may include, in addition to an intra-prediction mode of a sub-block, information related to a weight in consideration of a feature of a previous sub-block. Hereinafter, an example of encoding intra-prediction information of a sub-block will be described in detail.

FIG. 48 is a view showing an example of determining a weight for a sub-block. For convenience of description, it is assumed that a number of intra-prediction modes that may be used by a block is 35 as shown in FIG. 5. In addition, based on an intra-prediction mode (number 18) of a left upper diagonal direction, modes close to an intra-prediction mode (mode 10) of a horizontal direction are called a horizontal directional mode, and modes close to an intra-prediction mode (mode 26) of a vertical direction are called a vertical directional mode. In addition, it is assumed that the intra-prediction mode of the left upper diagonal direction may be included in a horizontal directional mode or may be included in a vertical directional mode. For a case where a number of intra-prediction modes that may be used by a block is greater or smaller than 35, the present embodiment may be applied.

In addition, it is assumed that intra-prediction using a weight is performed in an upper layer block unit. In other words, when it is determined to perform intra-prediction using a weight for an upper layer block, intra-prediction using a weight may be performed for all of a plurality of sub-blocks generated by dividing the upper layer block.

In addition, it is assumed that a size of an upper layer block is 8×8, and the upper layer block is divided into four sub-blocks in a horizontal direction. When sub-blocks positioned in the center among sub-blocks generated by dividing the upper layer block are merged, three sub-blocks may be generated. Herein, sizes of three sub-blocks may respectively be 8×2, 8×4, and 8×2 as an example shown in FIG. 48. In FIG. 48, partial sub-blocks are merged, but the present embodiment may be applied to a case where sub-blocks are not merged.

When a directional feature of any one of intra-prediction modes of sub-blocks is identical to a directional feature of an intra-prediction mode of a previous sub-block, the corresponding sub-block may be encoded by reflecting change in pixel values among rows or change in pixel values among row in the previous sub-block.

In an embodiment, when an intra-prediction mode of a sub-block 1 having an 8×2 size is a vertical directional mode, and an intra-prediction mode to be used when encoding a sub-block 2 having an 8×4 size is a vertical directional mode as the previous sub-block (that is, sub-block 1), a weight to be applied to the sub-block 2 may be derived by using changes in average value of pixels included in the first column of the sub-block 1 and changes in average value of pixels included in the last column of the sub-block 1, and the derived weight may be applied to the sub-block 2. Herein, a pixel value of the sub-block 1 used for calculating the weight to be applied to the sub-block 2 may be a prediction pixel generated by performing intra-prediction for the sub-block 1, or may be a reconstructed pixel reconstructed on the basis of the prediction pixel.

For example, when a vertical direction mode is applied to the sub-block 2, an average value of pixels included in the top column of the sub-block 1 is 80, and an average value of pixels included in the last column is 90, it may be determined that a pixel average value has increased by 10 for each ling in the sub-block 1. Accordingly, the encoding apparatus may generate a prediction block of the sub-block 2, and apply an increase amount a of the pixel average value according to a position of each column. In an embodiment, the encoding apparatus may gradually apply a weight according to a position of each 3) column in the sub-block 2 such as adding a to the first column of the sub-block 2 (that is, line 3), adding 24 to the second column (that is, line 4), etc. In an example shown in FIG. 48, a prediction pixel means prediction pixels generated by performing intra-prediction for the sub-block 2.

Although it is not shown, when a sub-block 3 also uses a vertical directional mode as the sub-block 2, a weight to be applied to the sub-block 3 may be determined in consideration of changes in pixel average values of the first column of the sub-block 2 (that is, area C) and of the last column (that is, area D). Herein, pixels included in the first column and the last column of the sub-block 2 which are used for calculating the weight of the sub-block 3 may mean a prediction pixel or prediction pixels generated by applying the weight to the prediction pixel.

When determining a weight to be applied to a sub-block that is currently encoded (that is, current block), a pixel value of a previous sub-block may be used. Herein, a previous sub-block may mean a sub-block encoded before the current block. For example, an upper sub-block adjacent to the upper of the current block or a left sub-block adjacent to the left of the current block may be used when determining a weight of the current block. When an upper sub-block and a left sub-block are present for a current block, the encoding apparatus may determine a weight to be applied to the current block by using N consecutive columns within the upper sub-block or M consecutive rows within the left sub-block. In an embodiment, the encoding apparatus may compare a weight obtained by using N consecutive columns within the upper sub-block with a weight obtained by using M consecutive rows within the left sub-block, and determine a method of generating a best weight of the current block.

In addition, in an embodiment described above, change in pixel average value is calculated by using the first column (or first row) and the last column (or last row) included in a previous sub-block. However, a method differing from the example described above may be used for calculating change in pixel average value. In an embodiment, change in pixel average value may be calculated by using the last line and a line adjacent to the last line. For example, in an example shown in FIG. 48, in order to calculate a weight for a sub-block 3, line 5 and line 6 may be used. Alternatively, change in pixel average value may be calculated by using an average value of changes in each line.

In addition to a sub-block, intra-prediction using a weight may be applied among arbitrary blocks such as a coding block, an upper layer block, etc.

FIG. 49 is a view of a flowchart snowing encoding information related to a weight to be applied to each sub-block. First, in S4901, information representing whether or not a weight is applied in an upper layer block unit may be encoded.

Herein, the information may be a flag of 1 bit, but it is not limited thereto. In addition, the information may be encoded in a coding block unit, an upper layer block unit or a sub-block unit. In an embodiment, the information may be encoded for the first sub-block among a plurality of sub-blocks generated by dividing an upper layer block.

When a sub-block to be encoded among a plurality of sub-blocks generated by dividing the upper layer block is called a current block, in S4902, the encoding apparatus may encode an intra-prediction mode of the current block. Subsequently, in S4903, whether or not encoding of an intra-prediction mode is completed for all sub-blocks present in the upper layer block may be determined, and when encoding of an intra-prediction mode for all sub-block is not completed, in S4904, moving to a following sub-block may be performed and the corresponding sub-block may be set as the current block so that an intra-prediction mode of the current block may be encoded.

FIG. 50 is a view showing encoding an intra-prediction mode of a sub-block that is currently encoded. For convenience of description, a sub-block that is currently encoded is called "current block".

In order to encode an intra-prediction mode of a current block, the encoding apparatus may predict the intra-prediction mode of the current block. Herein, prediction of an intra-prediction mode may be performed by using intra-prediction modes of neighbor blocks adjacent to the current block or an upper layer block (or coding block).

In detail, the encoding apparatus may configure candidate modes for predicting the intra-prediction mode of the current block by using intra-prediction modes of neighbor blocks adjacent to the current block or the upper layer block. A number N of candidate modes may be encoded in a block unit or through an upper layer header, or an identical value may be set and used in the encoding apparatus and the decoding apparatus. In the present embodiment, it is assumed that N is 2, and a candidate mode is determined by using determine intra-prediction modes of neighbor blocks adjacent to an upper layer block.

The encoding apparatus may configure candidate modes by using an upper neighbor block adjacent to the upper of the upper layer block, a left neighbor block adjacent to the left of the upper layer block. In an embodiment, the encoding apparatus may configure candidate modes by using intra-prediction modes of blocks at a specific position among upper neighbor blocks of the upper layer block, and an intra-prediction mode of a block at a specific position among left neighbor blocks of the upper layer block.

Alternatively, the encoding apparatus may configure candidate modes by using a mode having the highest frequency among intra-prediction modes of upper neighbor blocks of the upper layer block, and a mode having the highest frequency among intra-prediction modes of left neighbor blocks of the upper layer block.

Alternatively, the encoding apparatus may configure candidate modes by using a predetermined number of modes that have the highest frequency among intra-prediction modes of upper neighbor blocks and left neighbor blocks of the upper layer block.

In an embodiment, in an example shown in FIG. 50, when an numerical value within a block represents an intra-prediction mode of a neighbor block, the mode having the highest frequency among intra-prediction modes of upper neighbor blocks and left neighbor block adjacent to an upper layer block is a mode number 1 (used four times), and the next one is a mode number 0 (used three times). Accordingly, the encoding apparatus may configure candidate modes by using the mode number 1 and the mode number 0.

When candidate modes are configured, the encoding apparatus may determine whether or not a candidate mode identical to an intra-prediction mode of the current block is present. When it is determined that an identical mode is present, the encoding apparatus may encode information representing the candidate mode identical to the intra-prediction mode of the current block among a plurality of candidate modes.

Alternatively, when a candidate mode identical to the intra-prediction mode of the current block is not present, numbering is performed for residual intra-prediction modes excluding a candidate mode among intra-prediction modes that may be used by the current block, and information specifying the intra-prediction mode of the current block among the residual intra-prediction modes for which numbering is performed may be encoded.

In an embodiment, FIG. 51 is a view of an example of performing numbering for residual intra-prediction modes.

When a residual intra-prediction mode is greater than a candidate mode, the encoding apparatus may assign a number obtained by subtracting a number of candidate modes from the residual intra-prediction mode for the residual intra-prediction mode having a value greater than the candidate mode.

In an embodiment, when a candidate mode includes a mode 0 and a mode 1, for a residual intra-prediction mode greater than the mode 0 and the mode 1, a number by subtracting 2 from the residual intra-prediction mode may be assigned. In an embodiment, when an intra-prediction mode of the current block is 5, the encoding apparatus may encode 3 by subtracting 2 from 5.

In an example described above, a candidate mode is configured by using intra-predict ion modes of neighbor blocks adjacent to a current block or an upper layer block. However, a block that is not adjacent to the current block or the upper layer block may be used for configuring a candidate mode when the block is encoded through intra-prediction. In an embodiment, a candidate mode of a current block may be configured by using an intra-prediction mode of a block that is not adjacent to the current block or an upper layer block, but is adjacent to a block adjacent to the current block or the upper layer bloc.

FIG. 52 is a view of a flowchart snowing encoding an intra-prediction mode of a current block.

In S5201, the encoding apparatus may configure candidate modes of a current block, and in S5202, encode information representing whether or not a candidate mode identical to an intra-prediction mode of the current block is present among candidate modes.

In S5203, when a candidate mode identical to the intra-prediction mode of the current block is present, in S5204, the encoding apparatus may encode index information representing the candidate mode identical to the intra-prediction mode of the current block. Meanwhile, in S5203, when a candidate mode identical to the intra-prediction mode of the current block is not present, in S5205, the encoding apparatus may encode residual mode information specifying the intra-prediction mode of the current block among usable residual intra-prediction modes excluding the candidate modes.

In an embodiment described above, in a sub-block unit, information whether or not an intra-prediction mode of a sub-block is identical to a candidate mode or information specifying a candidate mode identical to the intra-prediction mode of the sub-block, or residual mode information may be encoded/decoded. In another embodiment, the encoding apparatus may encode a difference value with an intra-prediction mode of a previous block. Hereinafter, referring to the figure below, an embodiment of encoding an intra-prediction mode of a will be described in detail.

FIG. 53 is a view showing an example of determining an intra-prediction mode in a sub-block unit.

For convenience of description, it is assumed that an upper layer block is divided into four sub-blocks, and each sub-block may use 35 intra-prediction modes.

The encoding apparatus may determine an intra-prediction mode of the first sub-block (sub-block 1), and determine an intra-prediction mode of a sub-block 2 by using the intra-prediction mode used in the sub-block 1 and an offset a. In detail, the encoding apparatus may determine an intra-prediction mode of a sub-block that is currently encoded within an "intra-prediction mode±a of a previous sub-block".

In an embodiment, when an intra-prediction mode of the sub-block 1 is 26, and an offset a is 4, the encoding apparatus may determine an intra-prediction mode of the sub-block 2 from one of intra-prediction modes from 22 to 30.

When an intra-prediction mode of the sub-block 2 is determined as 25, an intra-prediction mode of a sub-block 3 may be determined as one of intra-prediction modes from 21 to 29 present within the offset range based on the intra-prediction mode of the sub-block 2.

When an intra-prediction mode of the sub-block 3 is determined as 27, an intra-prediction mode of a sub-block 4 may be determined as one of intra-prediction modes from 23 to 31 present within the offset range based on the intra-prediction mode of the sub-block 4.

As described above, when an intra-prediction mode of a sub-block is determined within an offset range, intra-prediction modes of sub-blocks may have a similar direction. Considering that an intra-prediction mode of each sub-block has a similar direction, a difference value of intra-prediction modes between a sub-block that is currently encoded and a previous sub-block may be encoded.

In an embodiment described above, an intra-prediction mode of a sub-block is determined within an offset range based on an intra-prediction mode of a previous sub-block, but the present invention is not limited thereto. The encoding apparatus may determine a best intra-prediction mode of each sub-block, and encode information whether or not an intra-prediction mode of each sub-block is present within an offset based on an intra-prediction mode of a previous sub-block. When an intra-prediction mode of each sub-block is present within an offset range based on an intra-prediction mode of a previous sub-block, the encoding apparatus may encode an intra-prediction mode of a sub-block by using a difference value of intra-prediction modes with a previous sub-block.

The encoding apparatus and the decoding apparatus may use a predefined value as an offset a, or the offset a may be encoded in a block unit or an upper layer header unit.

FIG. 54 is a view of a flowchart showing encoding an intra-prediction mode of a sub-block.

In S5401, when a sub-block that is currently encoded is the first sub-block, in S5402, the encoding apparatus may encode an intra-prediction mode of the first sub-block. Herein, for an intra-prediction mode of the first sub-block, a value of the intra-prediction mode may be encoded as it is, or may be encoded by using a candidate mode described above. In an embodiment, the encoding apparatus may encode information representing whether or not a candidate mode identical to the intra-prediction mode of the first sub-block is present, and encode residual mode information specifying a candidate mode according to whether or not a candidate mode identical to the intra-prediction mode of the first sub-block is present.

When a sub-block that is currently encoded is not the first sub-block in S5401, in S5403, the encoding apparatus may encode a difference value between an intra-prediction mode of a previous sub-block and an intra-prediction mode of the current sub-block.

In an embodiment, in FIG. 53, when intra-prediction modes of a sub-block 1, a sub-block 2, a sub-block 3, and a sub-block 4 are respectively 26, 25, 27, and 29, −1 that is a difference value with the first sub-block may be encoded for the second sub-block, +2 that is a difference value with the second sub-block may be encoded for the third sub-block, and +2 that is difference value with the third sub-block may be encoded for the fourth sub-block.

Although it is not shown, the encoding apparatus may further encode information of whether or not each intra-prediction mode of residual sub-blocks excluding the first sub-block is present within an offset range based on an intra-prediction mode of a previous sub-block. Herein, the information may be a flag of 1 bit, but it is not limited thereto. When each intra-prediction mode of residual sub-blocks excluding the first sub-block is present within an offset range based on an intra-prediction mode of a previous sub-block, as an example described above, a difference value with a precious sub-block may be encoded. Meanwhile, when each intra-prediction mode of residual sub-blocks excluding the first sub-block exceeds an offset range based on an intra-prediction mode of a previous sub-block, the encoding apparatus may encode an intra-prediction mode of each sub-block as it is, or encode an intra-prediction mode of each sub-block by using a candidate mode.

Alternatively, encoding information informing whether or not intra-prediction modes of all sub-blocks included in an upper layer block are encoded by using an offset is also available. The information may be encoded for the first sub-block among a plurality of sub-blocks generated by dividing the upper layer block.

When intra-prediction modes of all sub-blocks included in an upper layer block are encoded by using an offset, for remaining sub-blocks excluding the first sub-block, a number of usable intra-prediction modes may decrease from 35 to a×2+1.

When it is determined that sub-blocks included in an upper layer block do not use an offset, intra-prediction modes of the sub-blocks may be encoded without using an offset.

FIG. 55 is a view showing an example of encoding an intra-prediction mode for each sub-block.

In an example shown in FIG. 55', it is assumed that a block ① is not divided and thus one sun-block is present, a block ② is divided into four sub-blocks s2 to s5, a block ③ is divided into four sub-blocks S6 to s9, and a block ④ is divided into four sub-blocks H, s11 to s13. In case of the block ④, for example, H is the first sub-block with an upper layer sub-block, and thus a determined intra-prediction mode may be encoded by predicting the same. Herein, in order to predict an intra-prediction mode of H, a candidate mode may be configured by using an intra-prediction mode of a neighbor block. The encoding apparatus may encode whether or not a candidate mode identical to an intra-prediction mode of H is present among candidate modes, and when a candidate mode identical to an intra-prediction mode of H is present, the encoding apparatus may encode information specifying a candidate mode identical to an intra-prediction mode of H, and transmit the same.

Subsequently, in the encoding apparatus, intra-prediction modes of s11 to s13 may encoded by using a difference value with a previous sub-block. In an embodiment, an intra-prediction mode of s11 may be encoded as a difference value with the intra-prediction mode of H, an intra-prediction mode of s12 may be encoded as a difference value with then intra-prediction mode of s11, and an intra-prediction mode of s13 may be encoded as a difference value with the intra-prediction mode of s12.

In an embodiment described above, each intra-prediction mode of a residual sub-block excluding the first sub-block is encoded as a difference value with a previous sub-block. Different to an example described above, each intra-prediction mode of a residual sub-block excluding the first sub-block may be encoded as a difference value with a sub-block at a specific position. In an embodiment, an intra-prediction mode of a residual sub-block excluding the first sub-block may be encoded as a difference value with the first sub-block. Alternatively, an intra-prediction mode of the second sub-block may be encoded as a difference value with the first sub-block. Meanwhile, a residual sub-block excluding the first and the second sub-blocks may be encoded by calculating a difference value with the second sub-block.

FIG. 56 is a view of a flowchart showing decoding intra-prediction information of a sub-block in the decoding apparatus.

First, in S5601, the decoding apparatus may decode information representing whether or not a current block is divided into sub-blocks. In S5602, when it is determined that the current block is divided into sub-blocks, in S5603, the decoding apparatus may decode information representing a division direction of the current block.

According to the information in S5604, in S5605 and S5606, the decoding apparatus may divide the current block in a horizontal direction or vertical direction, and generate a plurality of sub-blocks.

Herein, when a number of division time of the current block is greater than 2, the decoding apparatus may merge a plurality of consecutive sub-blocks within the current block into one block by using a preset method.

Subsequently, in S5607, the decoding apparatus may repeatedly perform the above steps by using the first sub-block included in the current block as a current block.

When the current block is not divided into at least two sub-blocks in S5602, in S5608, the decoding apparatus may perform intra-prediction decoding for the current block.

Subsequently, in S5609 whether or not decoding of all sub-blocks is completed may be determined, and when decoding is not completed for all sub-blocks, the above steps may be repeatedly performed by using a following sub-block as a current block in S5610.

FIG. 57 is a view of a flowchart showing decoding information related to a weight.

First, in S5701, the decoding apparatus may decode information of whether or not to apply a weight in an upper layer block unit. Herein, the information may be a flag of 1 bit, it is not limited thereto. In addition, the information may be decoded through the first sub-block generated by dividing the upper layer block, or may be decode through an upper layer block (for example, coding block) rather than a sub-block.

Subsequently, in S5702, the decoding apparatus may decode an intra-prediction mode of a sub-block to be decoded (hereinafter, called "current block"). Subsequently, in S5703, whether or not decoding intra-prediction modes of all sub-blocks included in an upper layer block may be determined, and when decoding of intra-predictions is not completed for all sub-blocks, in S5704, moving to a following sub-block may be performed so as to set the corresponding sub-block as a current block, and in S5704, an intra-prediction mode of the current block may be decoded.

When it is determined to apply a weight to all sub-blocks present in the upper layer block, when the intra-prediction mode of the current block is decoded, the decoding apparatus may determine a weight of the current block in consideration of whether or not directional features of prediction modes of the current block and a previous block are similar and in consideration of change in average pixel value among columns or rows of a previous block. Subsequently, the decoding apparatus may apply a weight to an obtained prediction sample by using the intra-prediction mode of the current block.

FIG. 58 is a view of a flowchart showing decoding an intra-prediction mode of a sub-block that is currently decoded. For convenience of description, a sub-block that is currently decoded is called "current block".

In S5801, the decoding apparatus may configure candidate modes of a current block. An example of configuring candidate modes has been described with reference to FIG. 50, and thus detailed description thereof will be omitted.

Subsequently, in S5802, the decoding apparatus may decode information representing whether or not a candidate mode identical to an intra-prediction mode of the current block is present among candidate modes.

In S5803, when a candidate mode identical to an intra-prediction mode of the current block is present, in S5804, the decoding apparatus may decode index information representing a candidate mode identical to an intra-prediction mode of the current block.

Meanwhile, when a candidate mode identical to an intra-prediction mode of the current block is not present in S5803, in S5805, the decoding apparatus may decode residual mode information, and obtain an intra-prediction mode of the current block by using a candidate mode and decoded residual mode information.

FIG. 59 is a view showing another embodiment of decoding an intra-prediction mode of a sub-block.

In S5901, when a sub-block that is currently decoded is the first sub-block, in S5902, the decoding apparatus may decode an intra-prediction mode of the first sub-block. Herein, decoded information may represent an intra-prediction mode value of the first sub-block, or include information related to a candidate mode. Herein, information related to a candidate mode may include information representing whether or not a candidate mode identical to an intra-prediction mode of the first sub-block is present, and information specifying a candidate mode according to whether or not a candidate mode identical to an intra-prediction mode of the first sub-block is present or residual mode information.

When a sub-block that is currently decoded is not the first sub-block in S5901, in S5903, the decoding apparatus may decode a difference value between an intra-prediction mode of a previous sub-block and an intra-prediction mode of the current sub-block. Subsequently, the decoding apparatus ay obtain an intra-prediction mode of the current sub-block on the basis of a difference value between the previous sub-block and the current sub-block.

In an embodiment, when an intra-prediction mode of a sub-block 1 is 26, and difference values with a sub-block 2, a sub-block 3, and a sub-block 4 are respectively −1, +2, and +2, an intra-prediction mode of the sub-block 2 may be determined as 25 by applying the difference value to the intra-prediction mode of the sub-block 1, an intra-prediction mode of the sub-block 3 may be determined as 27 by applying the difference value to the intra-prediction mode of the sub-block 2, and an intra-prediction mode of the sub-block 4 may be determined as 29 by applying the difference value to the intra-prediction mode of the sub-block 3.

Although it is not shown, the decoding apparatus may further decode information of whether or not each intra-prediction mode of a residual sub-block excluding the first sub-block is present within an offset range based on an intra-prediction mode of a previous sub-block. Herein, the information may be a flag of 1 bit, but it is not limited thereto. When each intra-prediction mode of a residual sub-block excluding the first sub-block is present within an offset range based on an intra-prediction mode of a previous sub-block, as an example described above, a difference value with a previous sub-block may be decoded. Meanwhile, when each intra-prediction mode of a residual sub-block excluding the first sub-block exceeds an offset range based on an intra-prediction mode of a previous sub-block, the decoding apparatus may decode an intra-prediction mode of each sub-block as it is, or decode an intra-prediction mode of each sub-block by using a candidate mode.

Alternatively, information informing whether or not intra-prediction using an offset is performed for all sub-blocks included in an upper layer block may be also decoded. Herein, the information may be decoded through the first sub-block generated by dividing the upper layer block, or may be encoded in an arbitrary block unit.

When intra-prediction using an offset is performed for all sub-blocks included in the upper layer block, a number of intra-prediction modes that may be used by remaining sub-blocks excluding the first sub-block may decrease from 35 to a×2+1.

When it is determined that all sub-blocks present in an upper layer sub-block do not use an offset, intra-prediction modes of sub-blocks may be decoded without using the offset.

Subsequently, an example of encoding/decoding a sub-block by using a curve mode will be described.

A curve mode means that a slope of intra-prediction modes of sub-blocks belonging to an upper layer block unit has a form of gradually increasing or decreasing. In an embodiment, when intra-prediction modes among sub-block gradually (for example, in a uniform difference or uniform ratio) increases or decease, it may be determined that a curve mode is used for sub-blocks grouped in an upper layer block unit.

FIG. 60 is a view showing an example of determining whether or not to use a curve mode.

For convenience of description, it is assumed that an upper layer block is divided into four sub-blocks as shown in FIG. 60.

First, the encoding apparatus may encode information representing whether or not to use a curve intra-prediction mode (hereinafter, called curve mode) for a sub-block 1.

When it is determined to use a curve mode, for an intra-prediction mode of a residual sub-block excluding the first sub-block, a value obtained by adding an offset 8 to an intra-prediction mode of a previous sub-block may be assigned.

In an embodiment, when a number of usable intra-prediction modes is 35, an intra-prediction mode of the sub-block 1 is a number 10, and an offset 8 is 2, a number 12 may be assigned to a sub-block 2, a number 14 may be assigned to a sub-block 3, and a number 16 may be assigned to a sub-block 4 as an intra-prediction mode.

FIG. 61 is a view of a flowchart showing encoding an intra-prediction mode of each sub-block by using information of a curve mode.

In S6101, when a sub-block to be encoded is the first sub-block in an upper layer sub-block, in S6102, the encoding apparatus may encode information representing whether or not to use a curve mode. In S6103, when a curve mode is used, in S6104, the encoding apparatus may encode information related to an offset 3. Herein, information related to an offset may include information of an absolute value and a sign. Herein, information of an offset and a sign may be encoded in the same layer, or may be encoded in different layers. In an embodiment, an absolute value of the offset related information may be encoded through an upper layer header. Meanwhile, a sign may be encoded in a block unit (for example, sub-block unit or prediction block unit). In addition, in S6105, the encoding apparatus may encode information of an intra-prediction mode of the first sub-block.

When a sub-block that is currently encoded is not the sub-block in S6101, in S6106, the encoding apparatus may determine whether or not a curve mode is used in the first sub-block. When a curve mode is not used, in S6105, the encoding apparatus may encode an intra-prediction mode of a current sub-block. Herein, an intra-prediction mode of the current sub-block may be encoded by using a candidate mode or a difference value with a previous sub-block which is described above.

Meanwhile, when it is determined that a curve mode is used in the first sub-block, encoding an intra-prediction mode of the current sub-block may not be performed.

In S6107, when encoding intra-prediction modes of all sub-blocks is completed, performing the method is ended, otherwise in S6108, encoding a following sub-block starts.

FIG. 62 is a view of a flowchart showing decoding an intra-prediction mode of each sub-block by using information of a curve mode.

In S6201, when a sub-block that is currently decoded is the first sub-block in an upper layer sub-block, in S6202, the decoding apparatus may decode information representing whether or not to use a curve mode. In S6203, when a curve mode is used, in S6204, the decoding apparatus may decode offset related information. Herein, offset related information may include information of an absolute value and a sign. Herein, information of an offset and a sign may be decoded in the same layer, or may be decoded in different layers. In an embodiment, an absolute value of offset related information may be decoded through an upper layer header. Meanwhile, a sign may be decoded in a block unit (for example, sub-block unit or prediction block unit). Subsequently, in S6205, the decoding apparatus may decode an intra-prediction mode of the first sub-block.

When a sub-block that is currently decoded is not the first sub-block in S6201, in S6206, the decoding apparatus may determine whether or not a curve mode is used in the first sub-block. When a curve mode is not used, in S6207, the decoding apparatus may decode an intra-prediction mode of a current sub-block. Herein, an intra-prediction mode of the current sub-block may be decoded by using a candidate mode or a difference value with a previous sub-block which is described above.

Meanwhile, when it is determined that a curve mode is used in the first sub-block, an intra-prediction mode of the current sub-block may be decoded by using an intra-prediction mode of a previous sub-block and an offset value.

In 36207, when decoding intra-prediction modes of all sub-blocks is completed, performing of the method is ended, otherwise in S6208, decoding a following sub-block starts.

Hereinafter, a method of performing intra-prediction when a curve mode is used will be described in detail.

When intra-prediction is performed for each sub-block, according to whether transform is performed in a sub-block unit or transform is performed in an upper layer block unit, a feature of a reference sample that may be used for performing intra-prediction of a sub-block may vary. In an embodiment, when transform is performed in a sub-block unit, intra-prediction for a sub-block may be performed on the basis of a reconstructed sample included in a neighbor sub-block adjacent to the sub-block, and a reconstructed sample included in a neighbor block adjacent to an upper layer block including the sub-block. Meanwhile, when transform is performed in an upper layer block unit, intra-prediction for a sub-block may be performed on the basis of a prediction sample included in a neighbor sub-block adjacent to the sub-block, and a reconstructed sample included in a neighbor block adjacent to an upper layer block including the sub-block.

Hereinafter, referring to the figure, a method of performing intra-prediction for a sub-block by using a neighbor sub-block will be described in detail.

Figure 63:
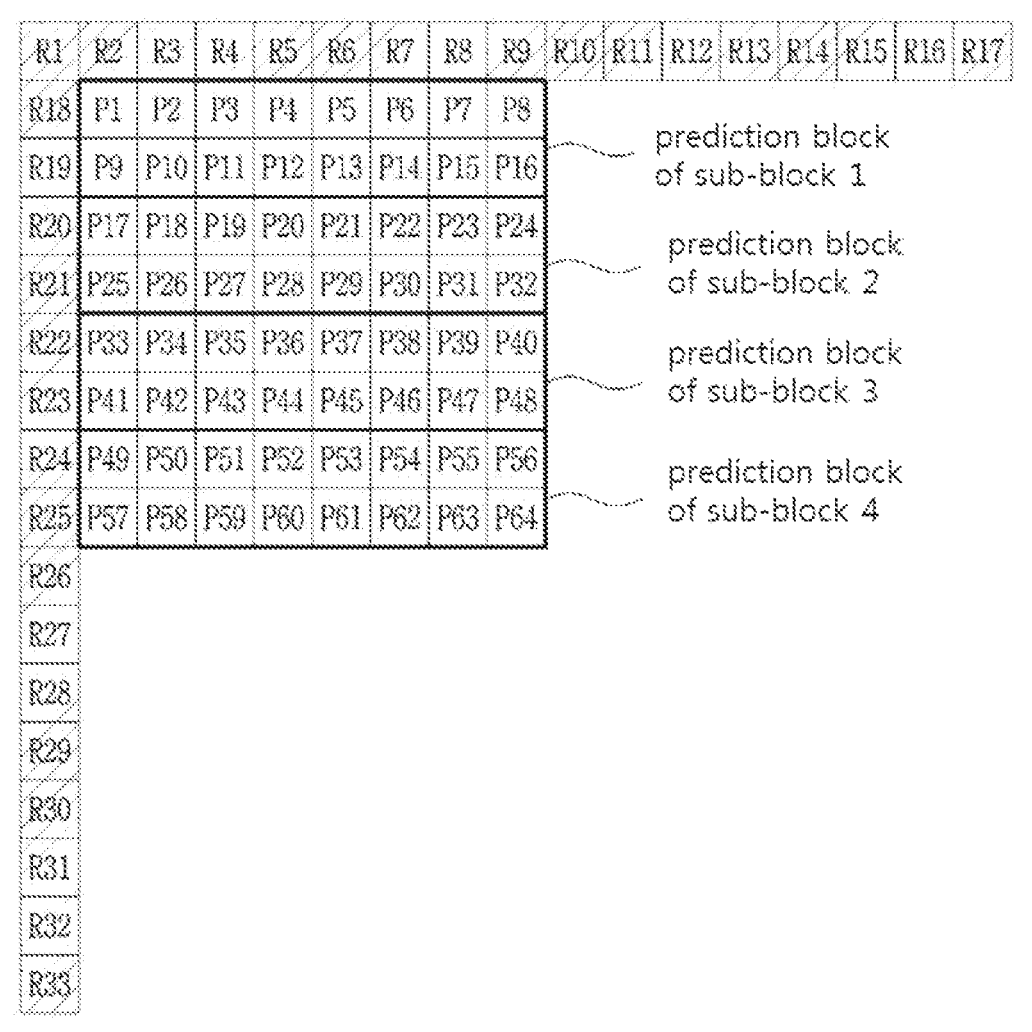
Figure 64:
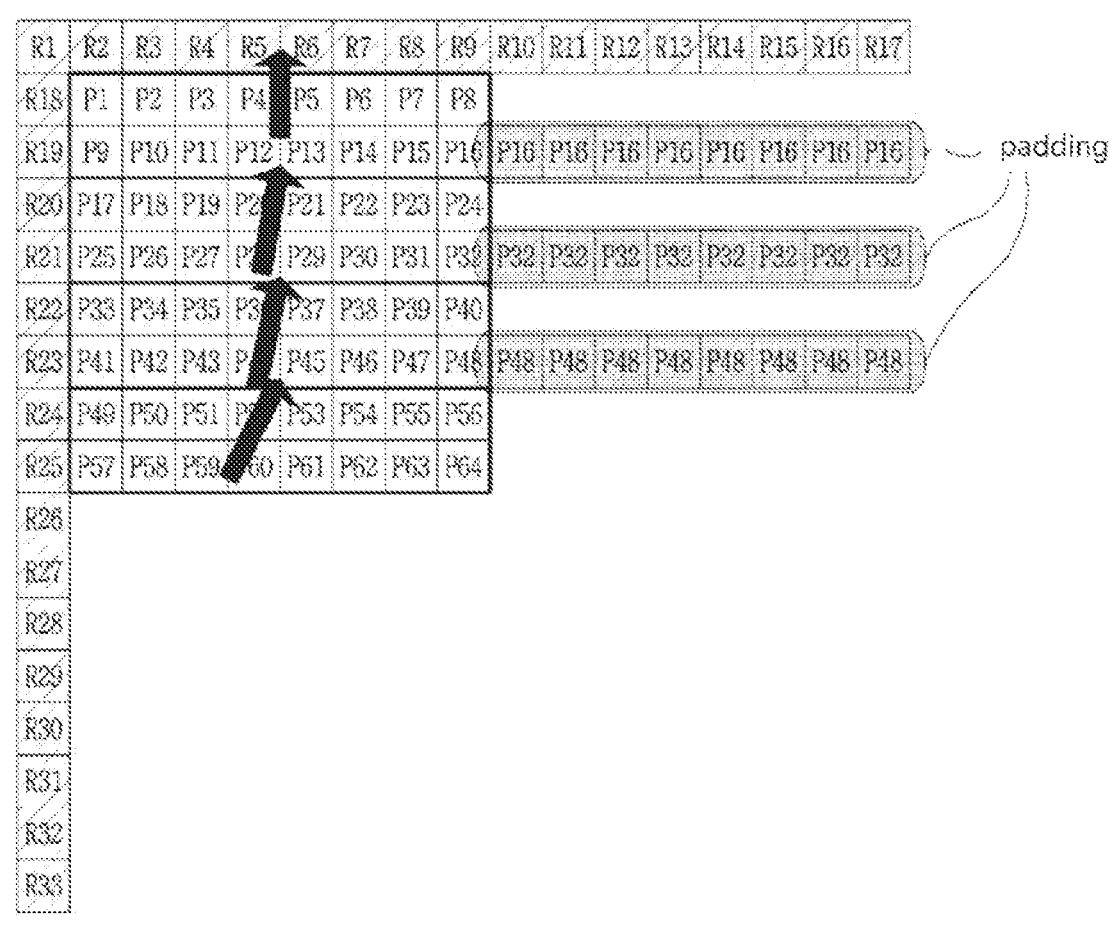
Figure 65:
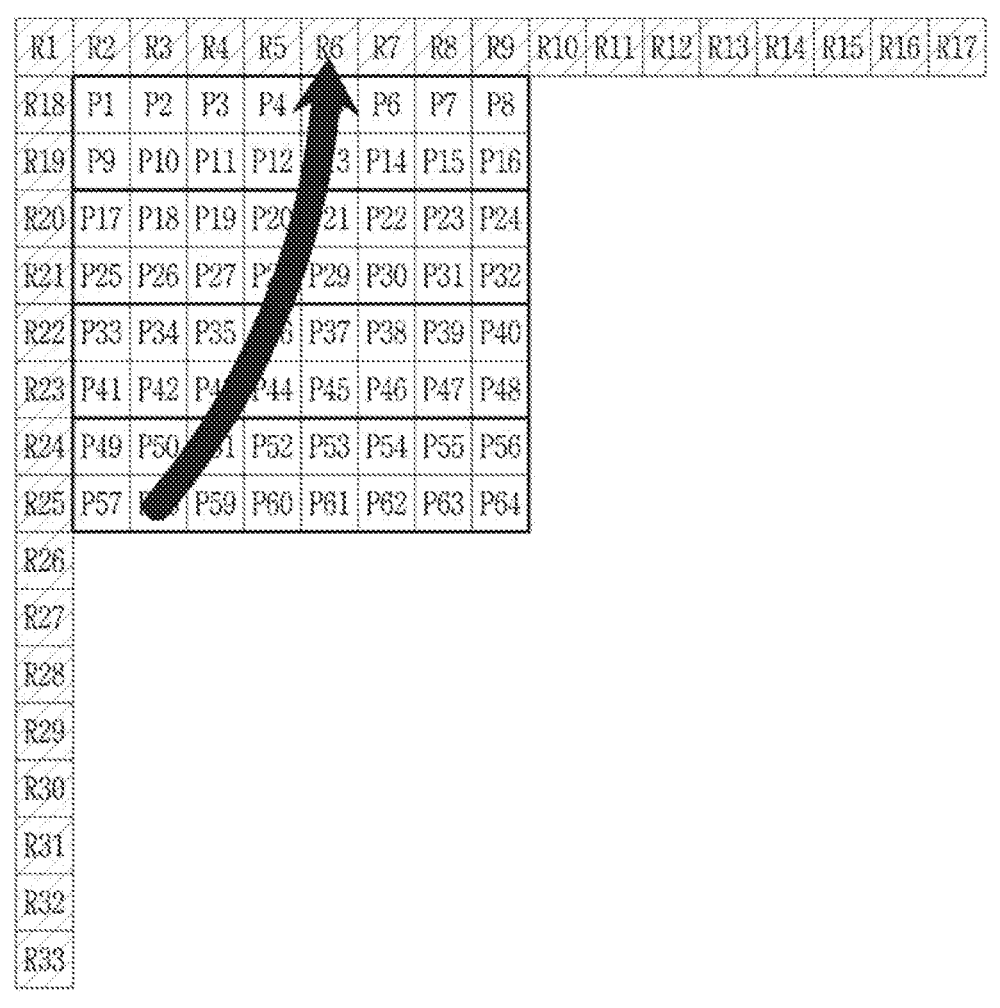

FIGS. 63 to 65 are views showing a method of performing intra-prediction for a sub-block when transform is performed in an upper layer block unit.

In an example shown in FIGS. 63 to 65, P1 to P64 mean a prediction pixel. In other words, each prediction block of sub-blocks 1 to 4 may include a prediction pixel from P1 to P16, from P17 to P32, from P33 to P48, and from P49 to P64. From R1 to R33 mean a reconstructed pixel adjacent to an upper layer block.

In an example shown in FIG. 63, an upper layer block is divided into four sub-blocks. Herein, when a curve mode is applied to an upper layer block, an intra-prediction mode of the first sub-block is a number 27, and an offset R is 1, intra-prediction modes of a sub-block 1 to a sub-block 4 may set to be respectively a number 27, a number 28, a number 29, and a number 30.

Intra-prediction for the sub-block 1 may be performed by using a reconstructed pixel adjacent to the sub-block 1. In an embodiment, intra-prediction for the sub-block 1 may be performed by using a reference pixel of R1 to R33.

When intra-prediction for the sub-block 2 is performed, a reconstructed pixel is not present in the sub-block 1. Accordingly, intra-prediction for the sub-block 2 may be performed by using a prediction pixel included in the sub-block 1. In an embodiment, intra-prediction for the sub-block 2 may be performed by using a reconstructed pixel present to the left of the sub-block and a prediction pixel present at the upper of the sub-block 2. In an embodiment, intra-prediction for the sub-block 2 may be performed by using R19 to R33, and P9 to P16.

When intra-prediction for the sub-block 3 is performed, a reconstructed pixel is not present in the sub-block 2 adjacent to the sub-block 3. Accordingly, intra-prediction for the sub-block 3 may be performed by using a prediction pixel included in the sub-block 2. In an embodiment, intra-prediction for the sub-block 3 may be performed by using a reconstructed pixel present to the left of the sub-block 3 and a prediction pixel present at the upper of the sub-block 3. In an embodiment, intra-prediction for the sub-block 3 may be performed by using R21 to R33, and P25 to P32.

Similarly, when intra-prediction for the sub-block 4 is performed, a reconstructed pixel is not present in the sub-block 3 adjacent to the sub-block 4. Accordingly, intra-prediction for the sub-block 4 may be performed by using a prediction pixel included in the sub-block 3. In an embodiment, intra-prediction for the sub-block 4 may be performed by using R23 to R33, and P41 to P48.

When intra-prediction for the sub-block 2 to sub-block 4 is performed, different to the sub-block 1, a reconstructed pixel is not present at upper right of the block. Accordingly, when intra-prediction for the sub-block 2 to sub-block 4 is performed, an additional reference pixel may be generated by padding a prediction pixel included in a neighbor sub-block adjacent to each sub-block.

In an example shown in FIG. 64, in FIG. 64, an additional reference pixel is generated by copying a value of the rightmost pixel among reconstructed samples included in a neighbor sub-block, but a method of generating an additional reference pixel is not limited thereto.

When intra-prediction mode of sub-blocks have a form of gradually increasing, intra-prediction performed where transform is performed in an upper layer block may have a form similar to a curve as shown in an example of FIG. 65.

While the exemplary method of the present invention is described as a series of operations, for clarity of description, this does not limit the order of steps. When needed, the steps may be performed at the same time or in a different order. In order to implement the method according to the present invention, the exemplary method may further include additional steps, include the remaining steps except for some steps, or may include additional steps other than some steps.

Various embodiments of the present invention are intended to illustrate representative aspects of the present invention rather than listing all possible combinations, and those described in the various embodiments may be applied independently or in a combination of two or more.

In addition, the methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), general processors, controllers, micro-controllers, microprocessors, electronic devices, other electronic units designed to perform the functions described herein, or a combination thereof.

The scope of the present invention includes a software or machine executable instructions (for example, operating system, application, firmware, program, etc.) for enabling to implement operations according to the methods of the various embodiments, and a device or a non-transitory computer-readable medium executable on a computer storing such a software or instructions.

INDUSTRIAL APPLICABILITY

The present disclosure may be used when encoding/decoding a video.

The invention claimed is:

1. A method of decoding a video, the method comprising:
deriving a first prediction block of a current block;
deriving a second prediction block of the current block; and
deriving a prediction block of the current block by applying a weight prediction parameter to the first prediction block and the second prediction block,
wherein the weight prediction parameter is derived based on a sample value of the first prediction block and a sample value of the second prediction block, and
wherein the weight prediction parameter is applied to the first prediction block and the second prediction block when information obtained from a bitstream specifies that the weight prediction parameter is used and a cost of applying the weight prediction parameter is not greater than a cost of not applying the weight prediction parameter.

2. A method of encoding a video, the method comprising:
deriving a first prediction block of a current block;
deriving a second prediction block of the current block; and
deriving a prediction block of the current block by applying a weight prediction parameter to the first prediction block and the second prediction block,
wherein the weight prediction parameter is derived based on a sample value of the first prediction block and a sample value of the second prediction block, and
wherein the weight prediction parameter is applied to the first prediction block and the second prediction block when information encoded into a bitstream specifies that the weight prediction parameter is used and a cost of applying the weight prediction parameter is not greater than a cost of not applying the weight prediction parameter.

3. A method of transmitting a bitstream generated by an encoding method, the encoding method comprising:

deriving a first prediction block of a current block;
deriving a second prediction block of the current block; and
deriving a prediction block of the current block by applying a weight prediction parameter to the first prediction block and the second prediction block,
wherein the weight prediction parameter is derived based on the first prediction block and the second prediction block, and
wherein the weight prediction parameter is applied to a sample value of the first prediction block and a sample value of the second prediction block when information encoded into a bitstream specifies that the weight prediction parameter is used and a cost of applying the weight prediction parameter is not greater than a cost of not applying the weight prediction parameter.

* * * * *